United States Patent [19]

Bollinger et al.

[11] 3,969,700

[45] July 13, 1976

[54] REGIONAL CONTEXT MAXIMUM LIKELIHOOD ERROR CORRECTION FOR OCR, KEYBOARD, AND THE LIKE

[75] Inventors: Ellen Willis Bollinger, Poughkeepsie, N.Y.; Anne Marie Chaires, Lanham, Md.; Jean Marie Ciconte, Rockville, Md.; Allen Harold Ett, Bethesda, Md.; John Joseph Hilliard, Potomac, Md.; Walter Steven Rosenbaum, Silver Spring, Md.

[73] Assignee: International Business Machines Corporation, Armonk, N.Y.

[22] Filed: July 30, 1975

[21] Appl. No.: 600,743

Related U.S. Application Data

[63] Continuation-in-part of Ser. No. 459,820, April 10, 1974, abandoned.

[52] U.S. Cl. .................... 340/146.3 WD; 179/1 SB; 340/146.3 SG; 340/146.3 ED

[51] Int. Cl.² .......................................... G06K 9/00

[58] Field of Search ........ 340/146.3 WD, 146.3 SG, 340/146.3 ED, 146.3 S, 172.5; 179/1 SA, 1 SB; 444/1

[56] References Cited

UNITED STATES PATENTS

| | | | |
|---|---|---|---|
| 3,188,609 | 6/1965 | Harmon et al. | 340/146.3 WD |
| 3,651,459 | 3/1972 | Hahn | 340/146.3 WD |

*Primary Examiner*—Leo H. Boudreau
*Attorney, Agent, or Firm*—John E. Hoel; John W. Henderson, Jr.

[57] ABSTRACT

A data processing system is disclosed for selecting the correct form of a garbled input word misread by an optical character reader so as to change the number of characters in the word by character splitting or concatenation. Dictionary words are stored in the system, having characters which are flagged for segmentation or concatenation OCR misread propensity. The OCR word and a dictionary word are loaded into a pair of associated shift registers, aligning their letters on one end. The dictionary word characters are inspected for error propensity flags. When a splitting propensity, for example, is found for a character, special conductional probability values are accessed from a storage and a calculation is performed of the probability that the first character of the dictionary word was split by the OCR into the first and second characters of the OCR word. This regional context probability is compared with the probability of a simple substitution error for the characters. If the probability of segmentation is larger, the OCR characters in the first shift register are shifted one space with respect to the dictionary word characters in the second shift register so that subsequent character pairs to be compared are properly matched. The greater calculated probability is combined in a running product. The dictionary word with the largest running product is output by the system as the most likely correct form of the garbled OCR input word.

In addition to optical character recognition, the system disclosed may be applied to correcting segmentation errors in phoneme-characters output from a speech analyzer.

In addition to optical character recognition, the system disclosed may be applied to correcting character substitutions, transpositions, additions, and omissions inadvertently typed on a keyboard.

38 Claims, 10 Drawing Figures

FIG. 1
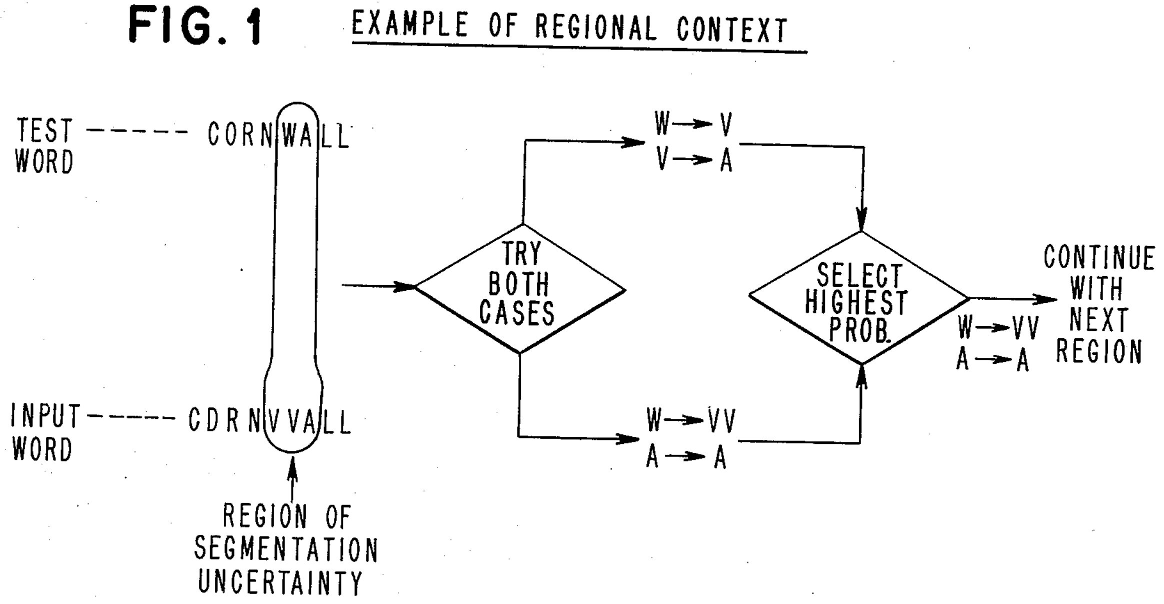
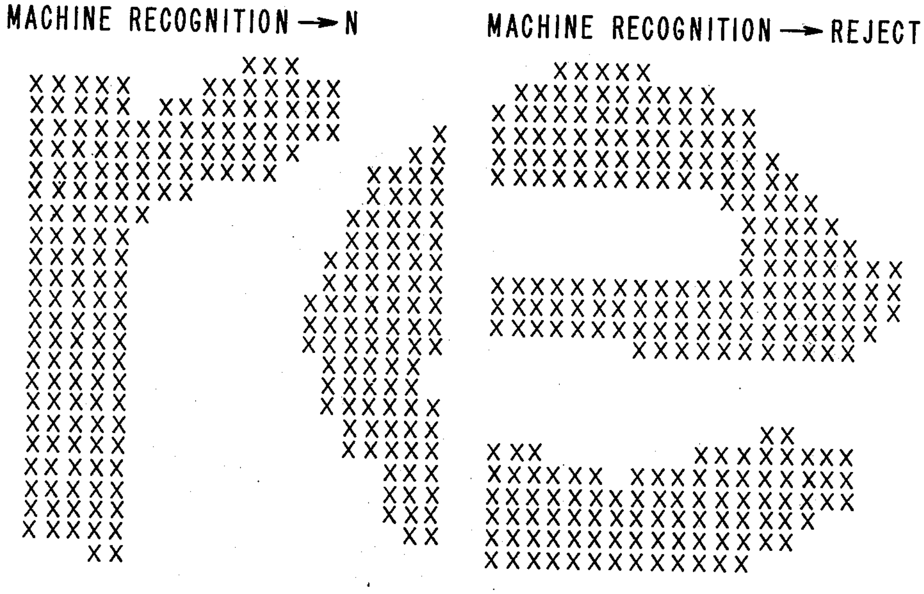
VIDEO SCAN OF A CHARACTER PAIR THAT RESULTED IN A "CROWDING SEGMENTATION"
FIG. 2

DETAIL OF SHIFT CONTROL (20)

FIG. 5 DETAIL OF MULTIPLEX (94)

FIG. 6 DETAIL OF MULTIPLEX (96)

DETAIL OF MULTIPLEX TIMING (108)

DETAIL OF MULTIPLEX (128)

FIG. 9 DETAIL OF SHIFT COMMAND (162)
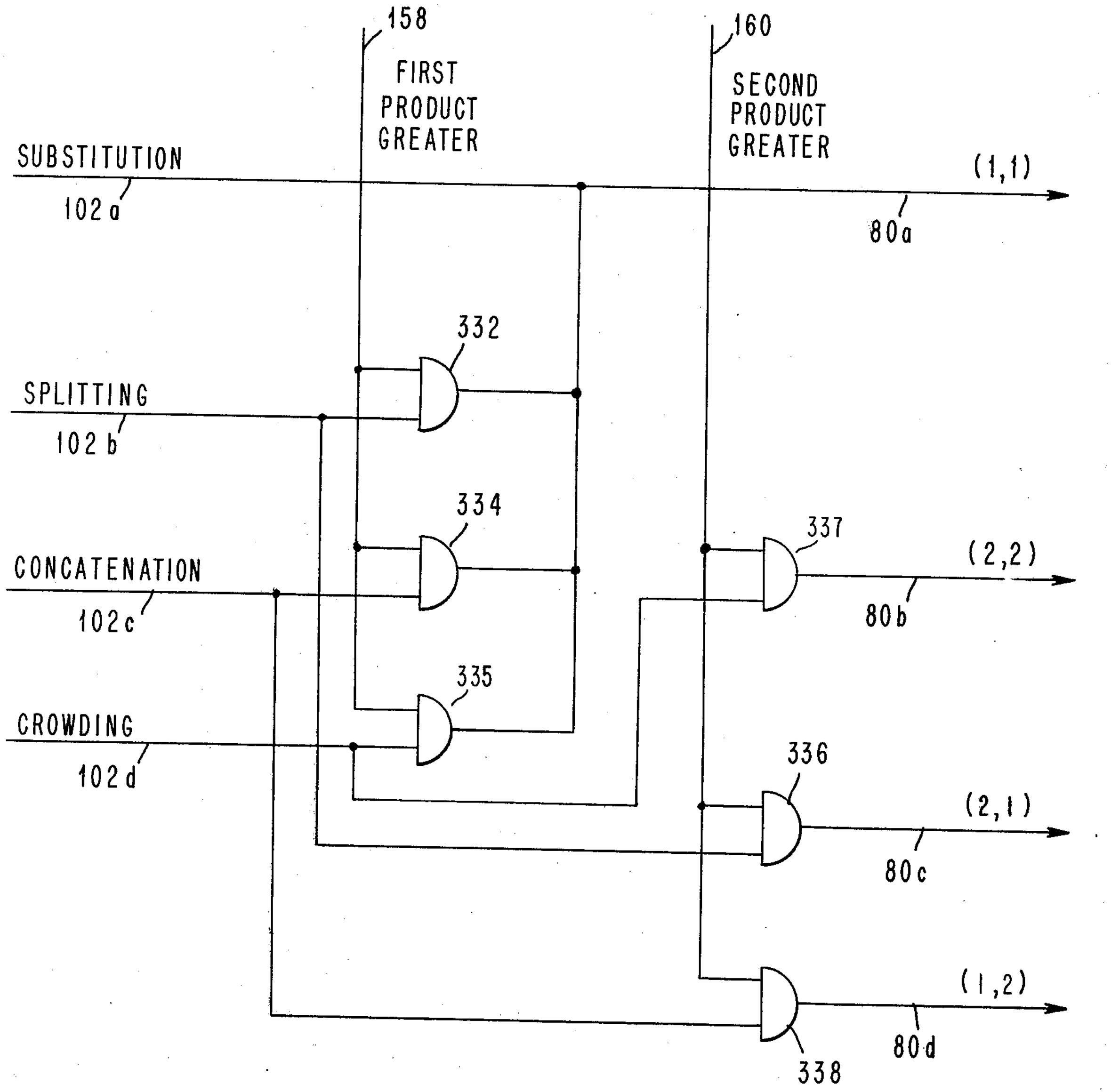

REGIONAL CONTEXT MAXIMUM LIKELIHOOD ERROR CORRECTION FOR OCR, KEYBOARD, AND THE LIKE

CROSS-REFERENCE TO RELATED APPLICATION

This is a continuation-in-part of application Ser. No. 459,820, filed Apr. 10, 1974, now abandoned.

FIELD OF THE INVENTION

The invention disclosed herein relates to data processing devices and more particularly relates to post processing devices for optical character recognition machines, speech analyzers, and keyboards.

BACKGROUND OF THE INVENTION

State of the art optical character recognition machines, typically have two principal types of character misrecognition modes: Substitution and segmentation. Substitution manifests itself in two ways. The first is character substitution, where the recognition unit has captured the video information of a single character, but the features required for alphabetical determination are aliased as another character. Logically this can only occur if there if some degree of similarity in the shape of the respective alphabetic characters involved. Examples of such character combinations are: B, D; D, O; O, C; *l*, *i*; etc. The second form of substitution manifestation is the character reject. As in character substitution, the recognition unit captures a single character. However, rejection occurs because of the inability of the recognition logic to relate to any character or because more than one set of alpha determination criteria are satisfied by the character features isolated. This condition is referred to as a character reject. In the prior art, apparatus for selecting the correct form of a garbled input word misread by an OCR has been limited to correcting errors in the substitution misrecognition mode. For improving the performance of an optical character reader, the prior art discloses the use of conditional probabilities for simple substitution of one character for another or of character rejection, for calculating a total conditional probability that its input OCR word was misread, given that a predetermined dictionary word was actually scanned by the OCR. But the prior art deals only with the simple substitution of confusion pairs occupying the same corresponding location in the OCR word and in the directory word. The OCR word and the directory word must be of the same length. The prior art neither recognizes nor addresses the problem of the optical character reader's segmentation misrecognition mode.

Segmentation misrecognition differs from that of simple substitution in that its independent events correspond to groupings of at least two characters. Nominally there are three types of segmentation errors. They are: horizontal splitting segmentation, concatenation segmentation, and crowding segmentation. The underlying mechanical factor which all the above segmentation types have in common is that they are generated by the improper delineation of the character beginning and end points. Segmentation errors occur quite frequently in OCR output streams and constitute a substantial impediment to accuracy in text processing applications.

OBJECTS OF THE INVENTION

It is an object of the invention to select the correct form of a garbled input word misread by an OCR, in an improved manner.

It is an additional object of the invention to select the correct form of a spoken input word misread by a speech analyzer, in an improved manner.

It is another object of the invention to select the correct form of a typewritten word mistyped by a typist, in an improved manner.

It is another object of the invention to select the correct form of a garbled input word misread by an OCR, employing an apparatus for executing a conditional probability analysis, in an improved manner.

It is still a further object of the invention to select the correct form of a garbled word output by an optical character reader, the word having undergone a change in the number of characters therein by character splitting or a character concatenation.

SUMMARY OF THE INVENTION

A data processing system is disclosed, for selecting the correct form of a garbled input word misread by an optical character reader so as to change the number of characters in the word by character splitting or concatenation. A dictionary of the words expected to be read by the OCR, is maintained in the system. In association with selected characters in the stored dictionary words, are error flags indicating the propensity for their associated characters to undergo splitting or concatenation segmentation during an OCR read operation. A set of conditional probabilities that the selected characters will undergo splitting or concatenation into OCR misread characters, is also stored in the system. When a garbled OCR word is input to the system, it is compared with each stored dictionary word by loading the two words in a pair of associated shift registers and aligning their letters on one end. The system then calculates the total conditional probability that the OCR in the first shift register was misread given that the dictionary word in the second shift register was actually scanned by the OCR. The total conditional probability calculation involves inspecting the characters in the dictionary word for segmentation error propensity flags. The system storage is accessed for the conditional probability of a segmentation or concatenation error when indicated. Means are provided for calculating the probability product that, for example, a segmentation of the first dictionary word character into the first and second OCR word characters occurred in conjunction with the simple substitution of the third OCR character for the second dictionary word character. This probability must be compared in a comparator, with the probability that the first and second OCR word characters were simply substituted for the first and second OCR word characters, respectively. If the comparator determines that the probability of segmentation, which involves an increase in the misread OCR word length, is greater than the probability of a simple character substitution, a shift control causes the contents of the shift register containing the OCR word, to be shifted the extra space with respect to the contents of the shift register containing the dictionary word. This is done to realign the characters therein so that subsequent character pairs to be compared are properly matched. The converse differential shifting operation is employed when a concatenation error is suspected by the system.

The conditional probability contained in the probability product which the comparator finds to be greater, is multiplied by the running product of conditional probabilities previously determined for the dictionary word. The running products for matching all the dictionary words with the OCR words, are calculated and the dictionary word having the maximum value for its running product is output by the system as the most likely correct form for the garbled input OCR word.

The apparatus may also be applied to the correction of character substitutions, transpositions, additions, and omissions inadvertently mistyped on a keyboard by an operator.

The apparatus may also be applied to the correction of segmentation errors in phoneme-characters output from a speech analyzer.

DESCRIPTION OF THE DRAWINGS

The foregoing and other objects, features and advantages of the invention will be apparent from the following more particular description of the preferred embodiments of the invention, as illustrated in the accompanying drawings.

FIG. 1 shows schematically the basic mechanism for segmentation manipulation.

FIG. 2 is a video scan of a character pair that can result in a crowding segmentation.

FIG. 9 is a detailed logic diagram of the shift command 162.

DISCUSSION OF THE PREFERRED EMBODIMENT

Figure 3:
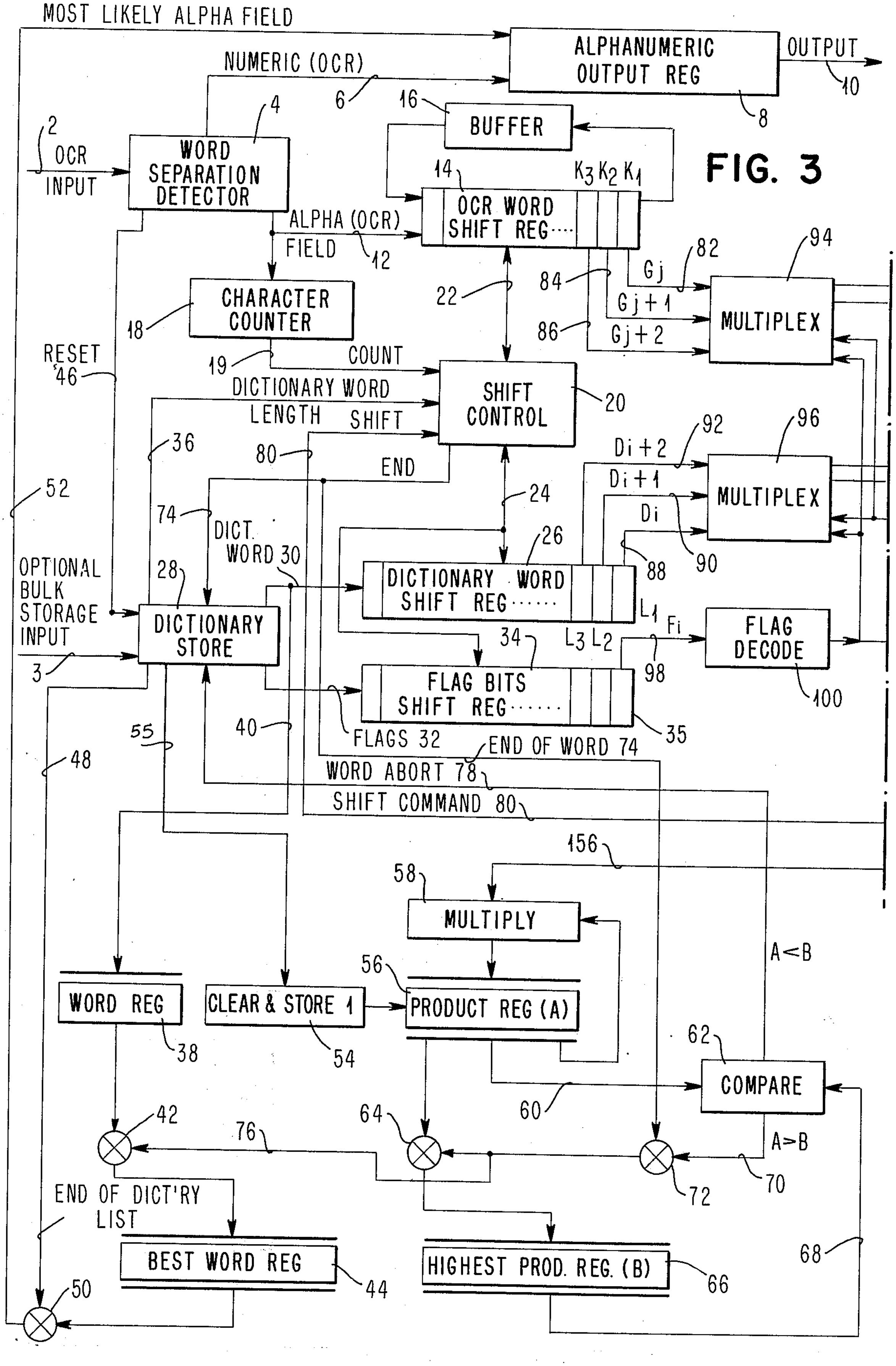
FIGS. 3 and 3A provide a detailed logic diagram of the regional context maximum likilihood OCR error correction apparatus.
Figure 3A:
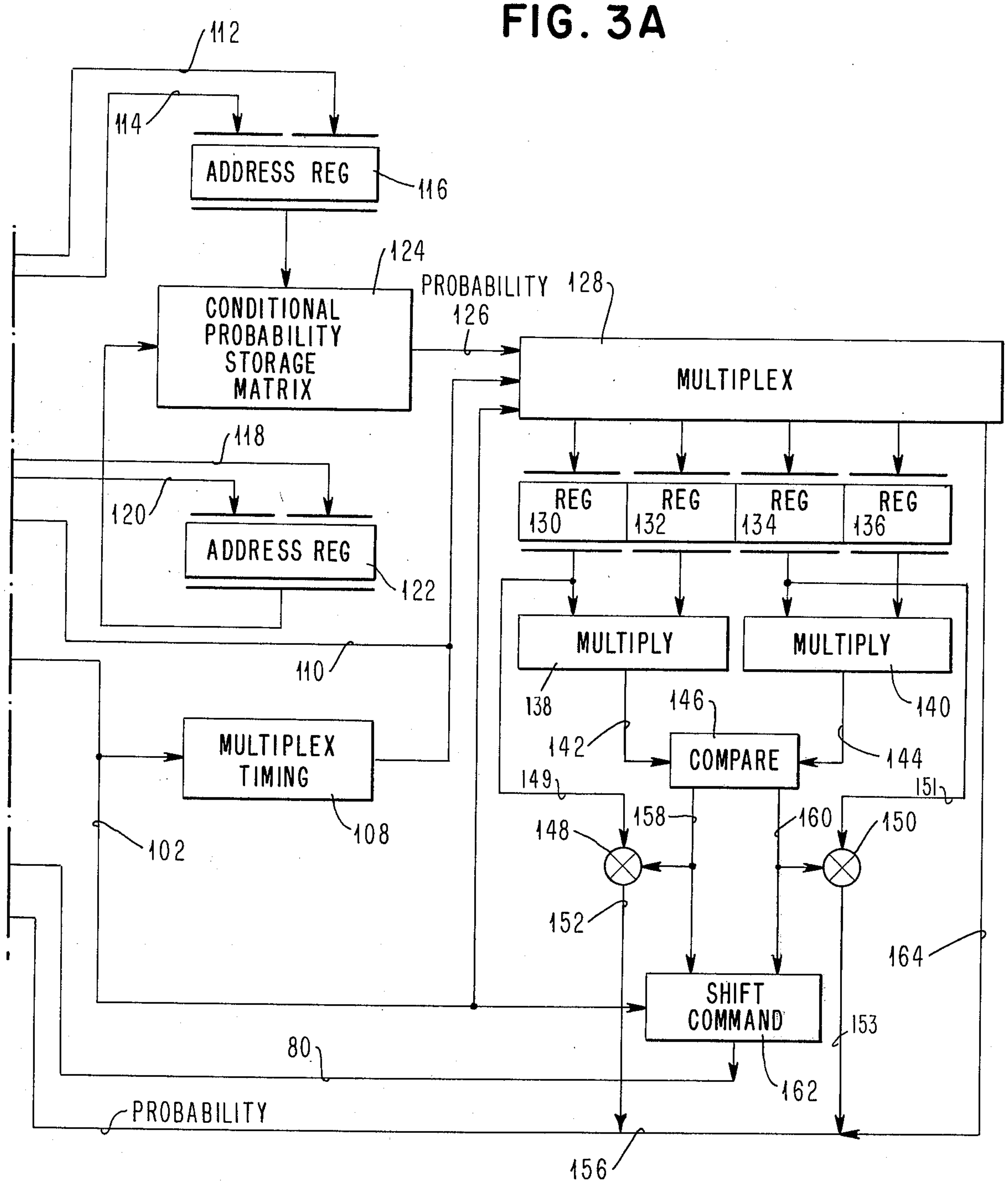

Theory: Error correction by the Regional Context Maximum Likelihood technique is performed by means of a conditional probabilistic analysis. This approach evaluates the likelihood that each member of a predetermined class of reference words being considered, could have been mapped into the garbled character string by means of the OCR segmentation error propensities. The substance of the likelihood analysis physically means the computation of an analog distance between a reference word and the garbled data, weighted by the a priori probability that the reference word would have occurred in the alpha fields being OCR scanned. Mathematically this analysis is formulated by the conditional probabilistic statement $$P(\text{reference word} \mid \text{garbled alpha string}) = \frac{P(\text{reference word, garbled alpha string})}{P(\text{garbled alpha string})} \qquad (1)$$

The denominator of equation (1) is essentially a scaling factor and has the same value for all the entries being compared to the garbled alpha string. Hence, the relative ranking of each entry (i.e., the probability of each reference word mapping into the garbled alpha string) is based on the numerator yielded in equation (2). Therefore, for the rest of our error correction analysis, we only have to focus on what maximizes the numerator. Applying Bayes theorem, the numerator in equation (1) can be restated as:

$$P(\text{reference word, garbled alpha string}) = P(\text{garbled alpha string} \mid \text{reference word}).\ P(\text{reference word}) \qquad (2)$$

The probability factor: P(reference word) is called the a priori probability of the event. In this case, it is the probability that the reference word being compared to the garbled character string would appear in the textual data being scanned. The a priori probabilities related to the occurrence of a word in textual data being scanned is a function of the generic form of subject matter to which it pertains. Although these a priori probabilities are empirically determined, for general text processing applications, their value is considered uniform over all words, as a first approximation. Thus, for general text processing, the a priori term in equation (2) is dropped. In mail processing applications, the a priori probabilities related to each entry in the directory can be its occurrence rate in the National Zip Code Directory. A more accurate and correct computation would follow by using a data base where the reference word occurrence probability depends on actual mailpiece volume.

The probability factor:

$$P(\text{directory entry, garbled alpha string}) \qquad (3)$$

is called the likelihood. The major computational effort of the Regional Context Maximum Likelihood Error Correction procedure centers around the evaluation of this expression.

In the evaluation of the likilihood factor there must be captured in a probabilistic form, the misread propensities of the OCR. The conditional format of equation (3) poses the likelihood as: "Given a reference word, what is the probability of the OCR misread propensities having mapped it into the garbled alpha string." Since the OCR recognizes an alpha field on a character-by-character basis, (i.e., it does not directly recognize words as single entities), equation (3) is really the product of a series of independent probabilistic events. In this perspective, there are two categories of OCR misrecognition that must be addressed. They are:

a. Substitution b. Segmentation.

Substitution Maximum Likelihood Analysis

OCR substitution manifests itself in two ways. The first is character substitution. This implies the recognition unit has captured the video of a single character, but the features required for alpha determination are aliased as another character. Logically, this can only occur if there is some degree of similarity in shapes of the respective alpha characters involved. Examples of such letter combinations are: B, D; D, O; O, C; *l*, *i*; etc. The second form of the substitution manifestation is character reject. As with character substitution, the recognition unit captures a single character. However, rejection occurs because of the inability of the recognition logic to relate to any character or because more than one set of alpha determination logic is satisfied by the character features isolated. This general situation is referred to as character reject. In this discussion, all rejects are denoted by asterisk (*).

From a probability standpoint, both of the proceeding misread effects can be posed as simple independent conditional probabilities. Respectively, character substitution and reject substitution would enter equation (3) as:

$$P_c(L_j|L_i) \quad (4)$$

$$P_c(*|L_i) \quad (5)$$

They represent the probability that the alpha character $L_i$ is scanned by the OCR and $L_i$ or * are output. This probability data is derived from a character confusion matrix and is prestored in storage, requiring no computation time. The character confusion statistics may be compiled separately relative to upper and lower alpha characters.

Example 1 indicates how equations of the form (4) and (5) can be applied in the Bayesian decision process used in the invention. The garbled word is CDRNWA*L and the entry form the predetermined class of reference words that is being tested is CORNWALL. The likelihood factor is given by the probabilistic series of independent events as shown in Example 1.

The likelihood factor hence is the product of a number of independent character confusion probabilities that results in a relative value which can be compared with that generated by each of the other words under test. The reference word which has the highest probability of being the original word is chosen, provided it meets certain reasonableness criteria.

Example 1:

Garbled Word = CDRNWL*L
Reference Word = CORNWALL
Likelihood Factor = P(CORNWALL|CDRNWA*L $\alpha$
$P_c(C|C)P_c(D|O)P_c(R|R)P_c(N|N) \ldots P_c(*|L)P_c(L|L)$

Segmentation Maximum Likelihood Analysis

Segmentation differs from substitution in that its independent events correspond to groupings of at least two characters. Nominally, there are three types of segmentation errors. They are:

a. Horizontal Splitting Segmentation
b. Concatenation Segmentation
c. Crowding Segmentation The underlying mechanical factor which all the above segmentation types have in common is that they are generated by the improper discernment of character beginning and end points.

Horizontal Splitting Segmentation (HSS)

Horizontal Splitting Segmentation (HSS) is prone to broad (wide) upper-case characters such as W, M, N, U, O, and C. The HSS effect evolves when the recognition unit is misled into cutting one of these characters into two portions. Each portion is in turn reviewed by the recognition logic as if it were a legitimate character. This results in several patterns of characters and/or asterisk misrecognitions. Several of the more common forms are indicated in Table I.

TABLE I

| Horizontal Splitting Segmentation | |
|---|---|
| IH | OD |
| PL | OE |

TABLE I-continued

| Horizontal Splitting Segmentation | | | |
|---|---|---|---|
| H | PI | | OK |
| | *I | O | OS |
| | | | O* |
| | I* | | *I |
| | ME | | OY |
| | MR | | |
| | NN | | LI |
| | N* | U | TI |
| M | *C | | I* |
| | *L | | |
| | *M | W | IW |
| | *N | | ** |
| | ** | | |
| | IL | | |
| | NO | | |
| | NT | | |
| N | R* | | |
| | RI | | |
| | TN | | |
| | *I | | |

From a probabilistic standpoint, the preceding misread effect can be passed as a dual aliasing effect conditional upon the occurrence of one of the set of upper-case letters noted above. Functionally, this is indicated as:

$$P_c(L_jL_{j+1}|L_i)$$

Obviously the evaluation of equation (1) becomes more complicated when the HSS effect must be taken into account. The control logic of the calculation must consider three possible conditions when one of the segmentation prone characters —$L_{i_{seg}}$— is encountered. They are:

a. $L_{i_{seg}}$ has given rise to a simple substitution effect of the form:

$$P_c(L_j|L_{i_{seg}}) \quad (6)$$

$$P_c(*|L_{i_{seg}}) \quad (7)$$

b. $L_i$ has been improperly segmented given rise to the HSS effect of the form:

$$P_c(L_jL_{j+1}|L_{i_{seg}}) \quad (8)$$

c. $L_{i_{seg}}$ has been properly recognized and output giving rise to:

$$P_c(L_{i_{seg}}|L_{i_{seg}}). \quad (9)$$

The presence of this last possibility is especially difficult to correctly discern since the most common type of character HSS recreates itself and an additional spurious character.

The analytic details of the inclusion of HSS in the evaluation of the likelihood factor (equation 3), will be delayed until it can be elaborated in conjunction with the concatenation segmentation error to be discussed next.

Concatenation Segmentation (CS)

Concatenation segmentation (CS) is nearly the mirror image of HSS. It mainly occurs among closely spaced lower case characters. Mechanically, CS evolves when the recognition unit is unable to discern in the scan, the presence to two individual characters. Hence, the OCR recognition logic proceeds to process the characters in a logically concatenated manner.

This effect occurs mainly due to address data being printed in a stylized manner or by crowded typewriter slugs. Table II contains several of the most CS prone letter combinations.

In a probabilistic format the CS event can be posed as:

$$P_c(L_j | L_i L_{i+1}) \quad (10)$$

$$P_c\,(= | L_l L_{l+1}) \quad (11)$$

TABLE II

| Concatenation Segmentation |
|---|
| br do en ff fr gu la ok or rv sa tn |
| * |
| fr ir la mr or ra rg ro rs sa |
| r |
| el en er es ne ue |
| e |
| ja sa ta |
| a |
| ck ch ci |
| c |
| el kl la |
| e |
| kl ra rt |
| m |
| io jo or |
| o |
| mr ok |
| k |
| ne |
| n |
| ry |
| y |
| re |
| v |
| dy |
| d |
| em |
| p |

The latter event (11) may be particularly difficult to isolate while evaluating equation (3). This follows, since $L_l$ itself may have a high propensity for mapping into a reject character (*), and therefore be suggestive of a plain substitution instead of a CS.

Further Evaluation of the Likelihood Factor

To structure an effective and efficient evaluation methodology for the likelihood factor equation (3), the commonality of its possible constituents must be stressed. Essentially each of the candidate aliasing effects described above is constituted as a confusion probability. The only additional factor that must be accommodated in the analysis is, that unlike the treatment of simple substitution shown in Example 1, a one-to-one correspondence between characters in a reference word and the garbled data field no longer strictly holds. This, of course, follows since the occurrence of an HSS error in one character of a directory word will create two characters in its garbled representation. The direct converse holds for CS error. Implicit in each of the above segmentation possibilities is the requirement to realign the remainder of the garbled error word to compensate for the character misalignment effect incurred due to the presence of a segmentation error.

To configure an efficient and reliable method and apparatus which accommodates the proceding segmentation oriented considerations, when evaluating the Likelihood Factor, three innovations are appended to the procedures as applied in the evaluation of equation (3). The innovations are:

a. Exception Character and Character Pair Flagging.
b. Right to Left Structuring of the Likelihood Evaluation.
c. Use of Regional Context.

Exception Character and Character Pair Flagging

There are about half a dozen HSS prone characters and about a dozen CS prone character pairs. By themselves they constitute only a small part of the alpha composition of the class of reference words. Unless a flag is encountered, the likelihood factor analysis proceeds as if simple character substitution was the only garbling factor to be considered. Only when a flag is encountered does the invention execute the logic for treating possible segmentation occurrences.

Special characters can be inserted into each word where its segmentation prone characters or character pairs exist. This, however, has the drawback of increasing average word length and destroying the compactness of the reference word dictionary that is important for I/O efficiency. Hence, to accommodate the flagging and storage requirements, a special alpha character storage convention is adopted. Each alpha character is stored using only five of the eight bits usually used to store a character. The only three bits will then be used as eight flag code combinations, two of which are respectively delegated for HSS character and CS character pairs.

If for illustrative purposes we denote the HSS code by "!" and the CS code by "?" then for example the word "Walston", which contains both HSS and CS occurrences, would be stored in the dictionary as:

|W!| |A| |L| |S| |T?| |O| |N!|

Right to Left Structuring of Likelihood Evaluation

The likelihood factor is multiplicative expression and hence is associative. Its evaluation can proceed from right to left as well as from left to right. In example 1, the progression was from left to right, the viewpoint of a human reader. The OCR, on the other hand, usually recognizes and processes characters from right to left. It appears the stability of the likelihood factor analysis is enhanced if its evaluation proceeds from right to left. This is not intended to preclude other formats of progression through the word but rather to indicate a mode which offers promise in present applications. This follows since it allows the delineation of independent events to be evolved in the same sequence of analysis, and creates a perspective that is better suited for analyzing series of segmentation prone characters. In addition, accurate initial alignment of the garbled data and the dictionary entry tends to be more readily achieved when the pairing starts from the right and proceeds to the left. The misleading effect of an added character at the beginning of the address field due to strong left edge effects of a first position upper case letter, is circumvented. This increases the possibility of isolating such spurious characters and addressing their error correction in an ad hoc manner.

Use of Regional Context

The unifying factor for allowing HSS and CS to be effectively accommodated in the likelihood factor computation is "regional context."

Unless an alpha character in a directroy entry is preceded by a flag, it is assumed that it enters into the likelihood factor analysis as an event of the form $P_c(L_i|L_j)$, where $i$–$j$ is among the possibilities. This implies that only the possibility of simple substitution is being assumed. If a flag is encountered in the directory entry, then the analysis associated with the likelihood factor must address, in addition to simple substitution, the possibility of segmentation. The use of regional context now enters as follows:

Assume that the flag indicates the possibility of HSS. At this point, as indicated previously, three possibilities exist. They are:

(1 and 2): $P_c(L_j|L_{i_{Seg}})$ where $j = i_{Seg}$ is included (3): $P_c(L_jL_{j+1}|L_{i_{Seg}})$ To proceed with the evaluation of the likelihood factor a decision must be made between events 1 and 2 and the HSS event posed by 3. The decision mechanism rest on the use of Regional Context.

If condition 3 is true then the remainder of the garbled character string must be right adjusted one position. This changes the existing correspondence relationship between the characters of the garbled alpha string and the reference word.

The change or shift in "adjacent context" is reflected in terms of the likelihood factor constituents as:

$$P_c(L_jL_{j+1}|L_{i_{Seg}}) \cdot P_c(L_{j+2}|L_{i+1}) \quad (12)$$

If condition 1 or 2 is correct, then the "adjacent context" is not distributed and the likelihood factor constituents corresponding to those in equation (12) are:

$$P_c(L_j|L_{i_{Seg}}) \cdot P_c(L_{j+1}|L_{i+1}) \quad (13)$$

TABLE III

| P(WAI*CL*\|W!ALST?ON!)<br>Exception Logic | Likelihood Factor Evaluation |
|---|---|
| Decision 1:<br>Determine if a possible HSS occurred to "N"<br>A — $P_c(1^*|N)P_c(C|O)$<br>versus<br>B — $P_c(^*|N)P_c(1|0)$<br>Assume A accepted (i.e., $P_c(1|0)$ is an impossible event) | $P_c(1^*|N)P_c(C|O)$ |
| Decision 2:<br>Determine if a possible CS occurred to "ST"<br>A — $P_c(^*|ST)P_c(1|L)$<br>versus<br>B — $P_c(^*|T)P(1|S)$<br>Assume A accepted: (i.e., $P_c(1|S)$ is an impossible event) | $P_c(1^*|N)P_c(C|O)P_c(^*|ST)$<br>$P_c(1|L)P_c(A|A)$ |
| Decision 3:<br>Determine if a possible HSS occurred to "W"<br>$P_c(Space,W|W)$ is an impossible event<br>$P_c(W|W)$ accepted | $P_c(^*|N)P_c(C|O)P_c(^*|ST)$<br>$P_c(1|L)P_c(A|A)P_c(W|W)$ |

The decision concerning the presence or absence of HSS then follows by which formulation, equation (12) or (13), yields the larger probability value.

Similarly if a flag denoted the presence of a character pair which is prone to CS then:

$$P_c(L_j|L_iL_{i+1}) \cdot P_c(L_{j+1}|L_{i+2}) \quad (14)$$

would pose the related constituents of the likelihood factor under that supposition. This expression would be evaluated relative to:

$$P_c(L_j|L_i) \cdot P_c(L_{j+1}|L_{i+1}) \quad (15)$$

which is the likelihood factor evaluation progression that would exist in the absence of a CS mis-read. The decision criterion, as with HSS mis-read, would be based on the relative magnitudes of the respective products in equations (14) and (15).

FIG. 1 and Table III further illustrate the implementation of "Regional Context" in segmentation type error correction. FIG. 1 shows schematically the basic mechanism for splitting segmentation manipulation for the word CORNWALL. Table III shows the step-by-step evaluation of the likelihood factor corresponding to the directory entry "Walston" where OCR garbled word has the form "WAL*CI*."

Crowding Segmentation

Crowding segmentation (CRS) differs from HSS and CS error types by not effecting word length. The causative factors related to CRS are character spacing and juxtaposition. A potential CRS event occurs when the recognition unit isolates two characters whose close proximity induces the OCR to misassign their segmentation point. This effectively mixes portions of one character into the video representation of the other. A mis-read results if the addition of the neighboring character segment:

a. Creates a composite that triggers the recognition logic of a different character b. Interferes with the recognition analysis and leads to a reject (*) output.

The preceding decision related to the video mechanics which evolve a CRS segmentation event. The overriding typographical factor behind CRD is the character geometry. Only a relative few of the 676 possible diagrams are prone to snowballing a print crowding effect into a character misread as described above. An example of such a character pair and the evolution of a CRS event is shown in FIG. 2 where the *re* diagram maps into a *n** combination. It should be noted that the observed video would not have evolved if the subject diagram was *er* or *ri*.

The appropriate confusion data related to the CRS events can be respectively quantified in the form:

$$P_c(L_jL_{j+1}|L_iL_{i+1}) \quad (16)$$

The evaluation of the likelihood factor in equation (3) follows, by first denoting the possible CRS prone letter diagrams in the directory entries by a special character. The evaluation progression at this point then considers the two possibilities:

$$P_c(L_{j+1}|L_{i+1})P_c(L_j|L_i) \quad (17)$$

versus $$P_c(L_{j+1}L_j|L_iL_{i+1}) \quad (18)$$

Since unlike the HSS and CS evaluation, no changes in character string length must be taken into account, the choice of how to treat and include the diagrams $L_{i+1}L_i$, in the likelihood calculation, follows from a determination of which of the expressions equations (17) or (18) yields the larger probability.

Expediencies for Decreasing Apparatus Requirements

The Regional Context procedure must be accomplished under real time constraints. A further substantial decrease in computational requirements will accrue by appending to the basic error correction method, a dictionary candidate screening process.

The package of logical screening processes includes:
a. Go/No Go Thresholding
b. Premature Termination Threshold.

Go/No Go Thresholding

Go/No Go Thresholding accomplishes a substantial decrease in computation to be performed by the error correction function by terminating the consideration of a directory entry as soon as its likelihood factor drops below a fixed tolerance, of the largest likelihood factor yielded as yet in the analysis. It will be recalled, the likelihood factor, equation (3) measures in a probabilistic fashion, the degree of match or mismatch present between a garbled word and fetched directory entry. The evaluation format of the likelihood naturally lends itself to this type of thresholding. It is evaluated as a series of multiplications of confusion probabilities (values between 0 and less than 1).

As with any multiplicative series of terms less than one, such successive multiplication decreases the value of the existing product.

The normal tolerance level is taken to be the largest likelihood computed so far in the analysis. Use of this threshold criterion will markedly decrease computation.

Following is an example of the Go/No Go Thresholding implementation. If we assume an 80 percent likelihood factor has been yielded so far in the analysis, then the tolerance level, assuming a 10 percent factor will be 16 percent. Hence, for the error correction routine to continue, consideration of any forthcoming entries requires it maintain a likelihood value of at least 72 percent. Most directory entries show a sufficient incompatibility within one of two characters to drop below the tolerance and are therefor terminated.

Premature Termination Threshold

This thresholding operation is related to the Go/No Go Threshold, focusing, however, on the other end of the probability spectrum. It allows termination of a candidate directory word as soon as it drops below a minimum acceptable probability threshold. Its value follows from the fact that no matter how dissimilar a garbled word and a directory entry are a likelihood factor is computable. Such a likelihood computation however quickly converges toward zero. By placing a lower limit on the acceptable likelihood value, the term by term comparison of an only casually related directory entry can be terminated prematurely as soon as it drops below the threshold.

Although the discussion and analysis related to the evaluation of the likelihood factor has been posed in terms of a series of multiplication operations, they may alternately perform as an addition of prestored logarithmic values (logs) of probabilities.

The Apparatus

A data processing system is disclosed for selecting the correct form of a garbled input word misread by an optical character reader so as to change the number of characters in the word by character splitting or concatenation. Dictionary words are stored in the system, having characters which are flagged for segmentation or concatenation OCR misread propensity. The OCR word and a dictionary word are loaded into a pair of associated shift registers, aligning their letters on one end. The dictionary word characters are inspected for error propensity flags. When a splitting propensity, for example, is found for a character, special conditional probability values are accessed from storage and a calculation is performed of the probability that the first character of the dictionary word was split by the OCR into the first and second characters of the OCR word. This regional context probability is compared with the probability of a simple substitution error for the characters. If the probability of segmentation is larger, the OCR characters in the first shift register are shifted one space with respect to the dictionary word characters in the second shift register so that subsequent character pairs to be compared are properly matched. The greater calculated probability is combined in a running product. The dictionary word with the largest running product is output by the system as the most likely correct form of the garbled OCR input word.

Figure 4:
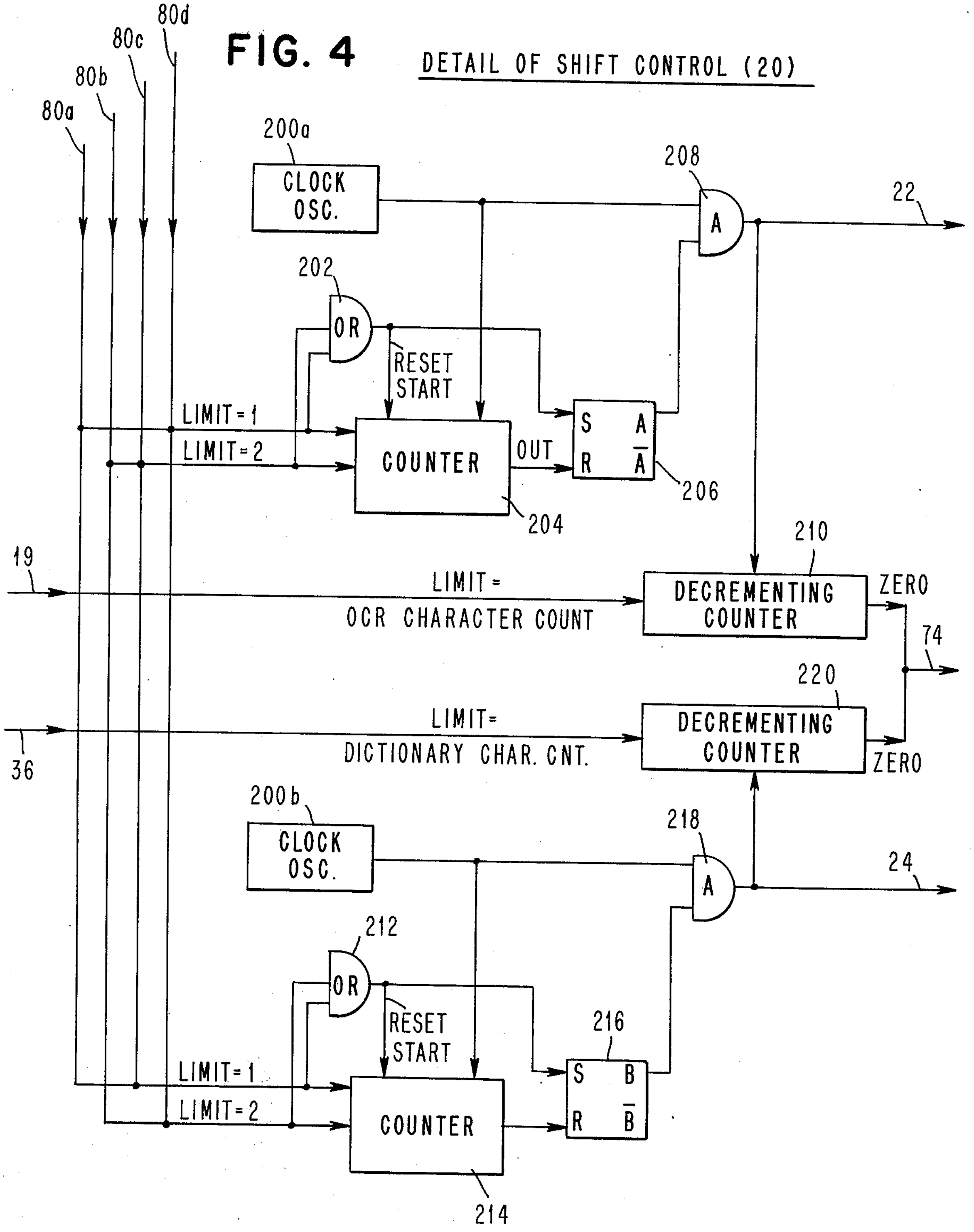
FIG. 4 is a detailed logic diagram of the shift control 20.

FIG. 3 is a detailed block diagram of the regional context maximum likelihood OCR error correction apparatus. An optical character recognition machine outputs on line 2 a sequence of alphabetic fields and numeric fields which have been scanned from a text under examination. Line 2 constitutes the OCR input to the inventive apparatus shown in FIG. 3. The OCR input line 2 inputs the sequences of alphabetic and numeric character fields to the word separation detector 4 which detects separation markers between character fields and identifies the fields as alphabetic or numeric. Numeric fields are outputted from the word separation detector 4 onto line 6 and are directed to the alphanumeric output register 8 and then to the system output line 10. Alphabetic character fields are directed by the word separation detector 4 over line 12 to the OCR word shift register 14. The character counter 18, connected to the alpha field output line 12, counts the number of characters input to the OCR word shift register 14, and transmits the count over line 19 to the shift control 20. A detailed logic diagram of shift control 20, is shown in FIG. 4. Shift register 14 stores the characters of the input OCR word in an arrangement ordered in the sequence of which the characters are received over input line 2. Shift register 14 has three adjacent storage cells $K_1$, $K_2$, and $K_3$ and the end character of the input word is initially stored in cell $K_1$.

A dictionary storage 28 is shown in FIG. 3 which stores the predetermined class of reference words as a dictionary. For general English text processing applications, the words appearing in conventional dictionary such as *Webster's Third International*, may be stored in storage 28. For specialized text processing applications, more limited and vocabularies may be employed. In mail processing applications a national street name directory may be employed. Selected characters composing selected ones of the dictionary words stored in storage 28 have in association therewith an error propensity indicium or flag for indicating the propensity of the character to being misread by the optical character reader, through an error mode which changes the number of characters in the misread word. The dictionary store 28 has a control input line 46 connected to an output of the word separation detector for indicating when a new alphabetic character field has been received from the OCR over line 2. If the analysis of the most likely correct form for the next previously received OCR word has been completed, the receipt of a signal over line 46 causes the dictionary store to reset its list of words so that the analysis of the new OCR input word may commence. The dictionary store 28 may optionally have a bulk storage input 3 which could for example supply selected categories of reference words which are most likely to match with the particular type of OCR word received on the OCR input line 2.

A dictionary word shift register 26 is shown in FIG. 3 having an input connected to the output of the dictionary storage 28. The shift register 26 stores the characters of a dictionary word input from the dictionary storage 28, in an arrangement ordered in the sequence in which the characters are received. The dictionary word shift register 26 has three adjacent storage cells $L_1$, $L_2$, and $L_3$ and the end character of the dictionary word loaded into shift register 26 is initially stored in cell $L_1$. The character in the $L_1$ cell of shift register 26 should correspond with the character in the $K_1$ cell of the shift register 14. To accommodate the flagging of segmentation misread propensities for the reference words, a special alpha character storage convention can be adopted. Each alpha character is stored using only five of the eight bits usually used to represent a character. The other three bits are used as the flag code. There are therefore eight flag code combinations, two of which are respectively assigned for horizontal splitting segmentations of a character and concatenation segmentation of character pairs. However, to more clearly illustrate the apparatus of the invention, FIG. 3 shows an alternate configuration with a flag bit shift register 34 having an input connected to the output of the dictionary storage 28 for storing the flag bit indicating the OCR misread propensity for selected characters stored in the dictionary shift register 26. It is recognized that a completely separate flag bit shift register 34 connected by means of line 32 to the dictionary storage 28 and holding flag bits distinct from the alphabetic characters stored in the dictionary word shift register 26, would be an equally feasible embodiment, to the preferred one disclosed. The shift control 20 controls the shifting of the contents of the OCR shift register 14 over line 22, and controls the shifting of the contents of the dictionary shift register 26 over line 24. The shifting of the contents of the flag bit shift register 34 is also controlled by line 24 so that shifting operations for the dictionary shift register 26 and the flag bit shift register 34 are always in unison. The shift control 20 accepts over line 24 from the dictionary store 28 the dictionary word length for the dictionary word stored in the dictionary shift register 26. A detailed logic diagram of the shift control 20 is shown in FIG. 4.

Figure 5:
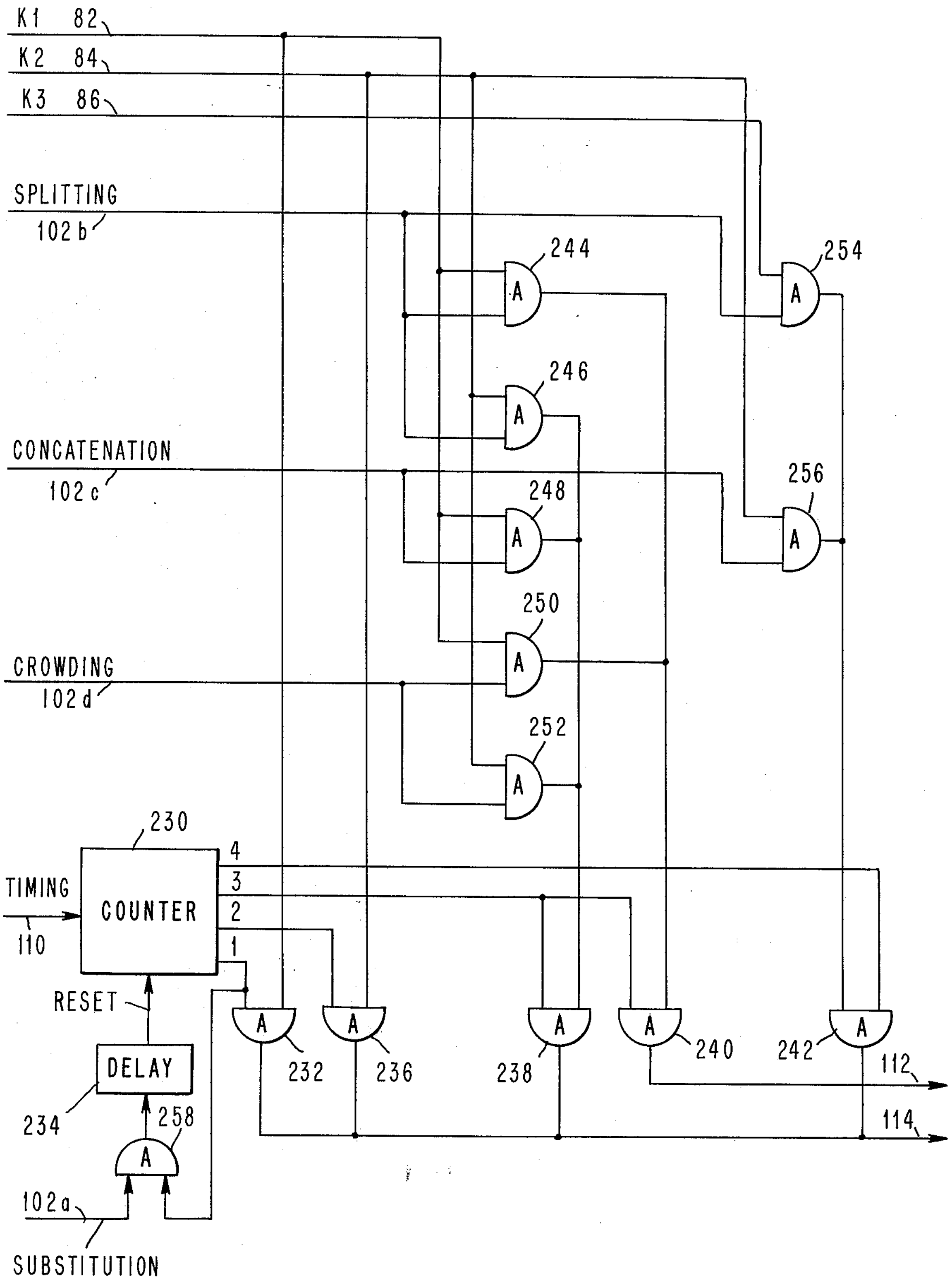
FIG. 5 is a detailed logic diagram of the multiplexor 94.

The multiplexor 94 has three input lines connected to the OCR word shift register 14, line 82 connecting to the $K_1$ cell, line 84 connecting to the $K_2$ cell, and line 86 connected to the $K_3$ cell. A detailed illustration of the multiplexor 94 is shown in FIG. 5.

Figure 6:
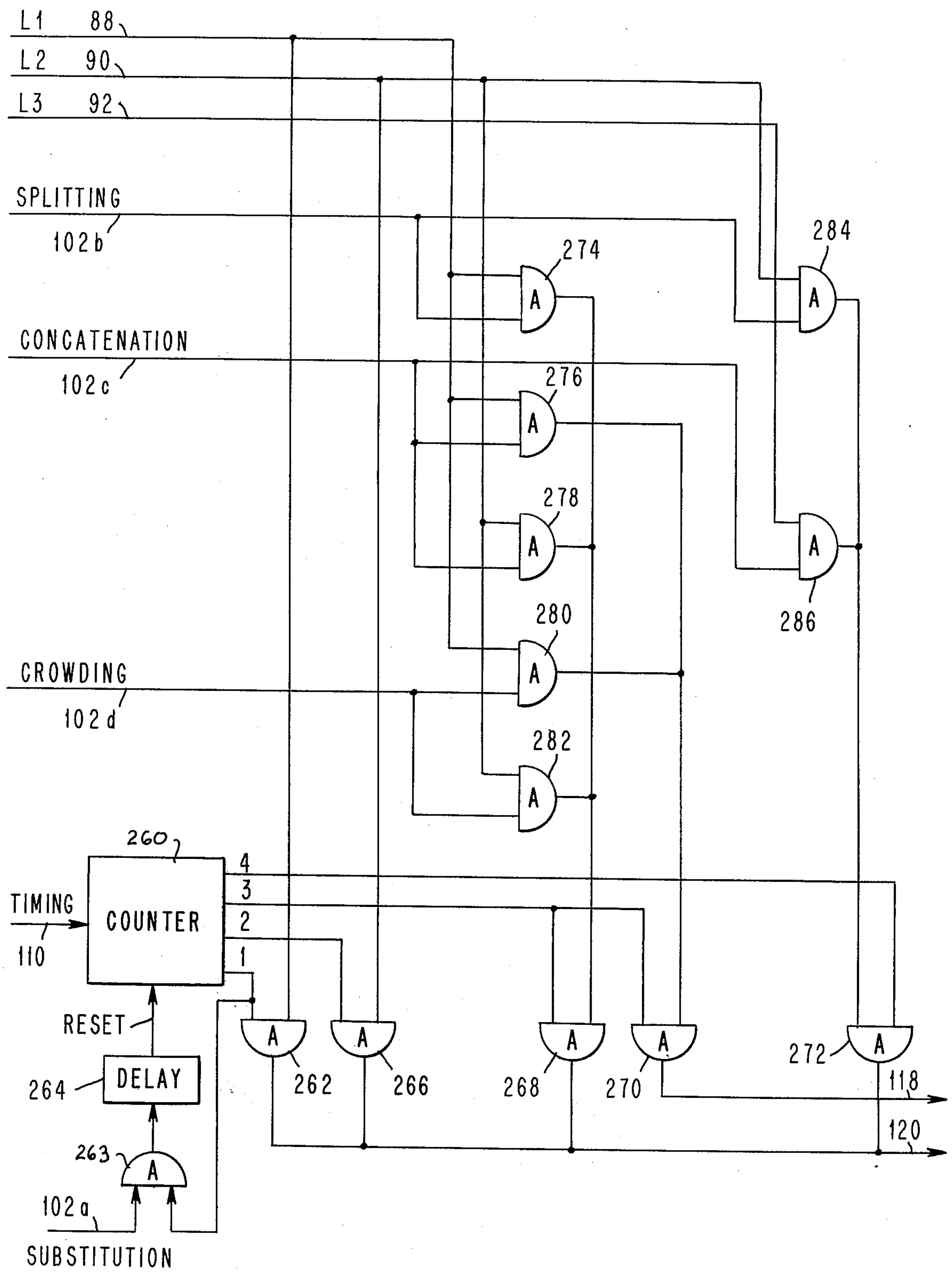
FIG. 6 is a detailed logic diagram of the multiplexor 96.

The multiplexor 96 has three inputs connected to the dictionary word shift register 26, line 88 connected to the $L_1$ cell, line 90 connected to the $L_2$ cell and line 92 connected to the $L_3$ cell. A detailed illustration of the multiplexor 96 is shown in FIG. 6.

The flag decoder 100 in FIG. 3 has an input connected to the last cell 35 in the flag bit shift register 34, corresponding to the $L_1$ cell in the dictionary word shift register 26. The flag decoder has four output lines; **102*a* indicating a probable simple substitution, 102*b* indicating a probable character splitting, 102*c* indicating a probable character pair concatenation and 102*d* indicating a probable character pair crowding. The flag decoder output lines are collectively denoted as line 102.**

Figure 7:
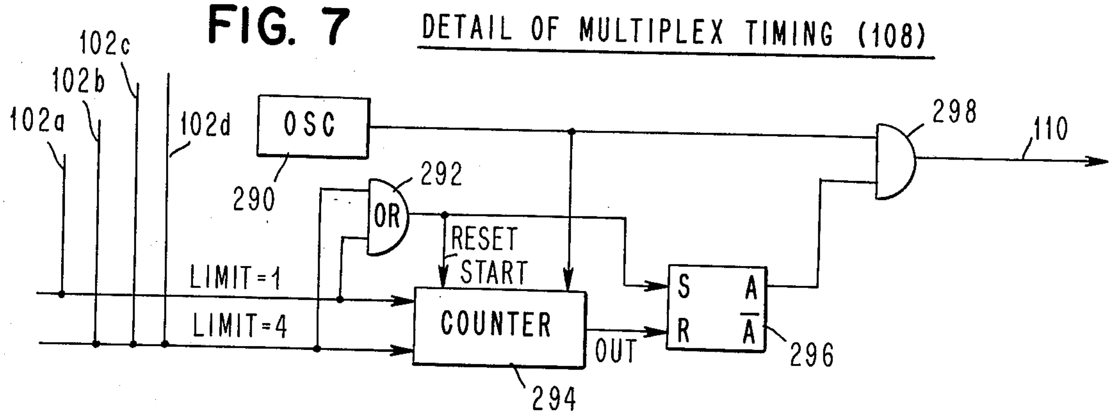
FIG. 7 is a detailed logic diagram of the multiplex timing 108.

The multiplex timing 108, shown in FIG. 3, has an input line 102 connected to the flag decoder 100, and an output line 110 connected to multipliors 94, 96 and 128. A detailed logic diagram of the multiplex timing 108 is shown in FIG. 7.

The address register 116 is connected by input lines 112 and 114 to the multiplexor 94. The address register 122 is connected by input lines 118 and 120 to the multiplexor 96.

The conditional probability storage matrix 124 has a first and second input connected to the address registers 116 and 122, respectively. The conditional probability storage matrix stores a first type conditional probability $P(K_n/L_m)$ that the OCR word character stored in cell $K_n$ of said first shift register was misread by character substitution given that the dictionary word character stored in cell $L_m$ of said second shift register was actually scanned, for $n=1$, $m=1$; $n=2$, $m=2$; $n=2$, $m=3$; and $n=3$, $m=2$. The conditional probability storage matrix also stores a second type conditional probability $P(K_1K_2\ L_1)$ that the OCR word character stored in the cells $K_1$ and $K_2$ of the OCR word shift register 14 were misread by character splitting, given that the dictionary word character stored in cell $L_1$ of said dictionary word shift register 26 was actually scanned. The conditional probability storage matrix 124 also stores a third type conditional probability $P(K_1|L_1L_2)$ that the OCR word character stored in cell $K_1$ of the OCR word shift register 14 was misread by character concatenation, given that the dictionary word character stored in cell $L_1$ and $L_2$ of said dictionary word shift register 26 were actually scanned. The conditional probability storage matrix 124 contains still a fourth type conditional probability $P(K_1K_2|L_1L_2)$ that the OCR word characters stored in cells $K_1$ and $K_2$ of the OCR word shift register 14 were misread by character crowding, given that the dictionary word characters stored in cells $L_1$ and $L_2$ of the dictionary word shift register 26 were actually scanned.

Table IV shows some sample values for the probabilities stored in the probability storage 124 for the first, second, third and fourth type conditional probabilities. In theory, the combinations of upper and lower case letters considered could be exhausted with conditional probabilities being stored for $P(A_i|A_j)$ $P(A_iA_j|A_k)$ $P(A_i|A_jA_k)$ and $P(A_iA_j|A_kA_l)$, $i$, $j$, $k$ and $l$ taking all possible values. However, many of these conditional probabilities are found to be vanishingly small, and thus only those letter combinations having a probability greater than a selected threshold, are stored, in practical applications. This threshold is empirically determined and depends upon the particular OCR characterized.

TABLE IV

| | | | SUBSTITUTION CHARACTERS | | | | | | | | | SEGMENTATION CHARACTERS | | | | | | |
|---|---|---|---|---|---|---|---|---|---|---|---|---|---|---|---|---|---|---|
| | | | A | B | C | D | E | F | | Y | Z | IH | IL | IW | | OD | | VV |
| I | | | | | | | | | | | | | | | | | | |
| N | A | * | .93 | .00001 | .00001 | .00001 | .00002 | .00001 | - | .00001 | .00001 | .00001 | .00001 | .00001 | - | .00001 | - | .00001 |
| P | B | | .00001 | .90 | .00001 | .00001 | .0068 | .0017 | - | .00001 | .00001 | .00001 | .00001 | .00001 | - | .00001 | - | .00001 |
| U | C | | .00001 | .00001 | .93 | .00001 | .00001 | .00001 | - | .00001 | .00001 | .00001 | .00001 | .00001 | - | .00001 | - | .00001 |
| T | | | ⋮ | ⋮ | ⋮ | ⋮ | ⋮ | ⋮ | | ⋮ | ⋮ | ⋮ | ⋮ | ⋮ | | ⋮ | | ⋮ |
| | N | | .00001 | .00001 | .00001 | .00001 | .00001 | .00001 | - | .00001 | .00001 | .00001 | .0357 | .00001 | - | .00001 | - | .00001 |
| C | O | | .00001 | .00001 | .00001 | .00001 | .00001 | .00001 | - | .00001 | .00001 | .00001 | .00001 | .00001 | - | .0269 | - | .00001 |
| H | | | ⋮ | ⋮ | ⋮ | ⋮ | ⋮ | ⋮ | | ⋮ | ⋮ | ⋮ | ⋮ | ⋮ | | ⋮ | | ⋮ |
| A | Y | | .00001 | .00001 | .00001 | .00001 | .00001 | .00001 | - | .90 | .00001 | .00001 | .00001 | .00001 | - | .00001 | - | .00001 |
| R | Z | | .00001 | .00001 | .00001 | .00001 | .00001 | .00001 | - | .00001 | .90 | .00001 | .00001 | .00001 | - | .00001 | - | .00001 |
| A | BR | .018 | .00001 | .00001 | .00001 | .00001 | .00001 | .00001 | - | .00001 | .00001 | | | | - | | - | |
| C | CH | | .00001 | .00001 | .017 | .00001 | .00001 | .00001 | - | .00001 | .00001 | | | | - | | - | |
| T | | | ⋮ | ⋮ | ⋮ | ⋮ | ⋮ | ⋮ | | ⋮ | ⋮ | ⋮ | ⋮ | ⋮ | | ⋮ | | ⋮ |
| E | RT | | .00001 | .00001 | .00001 | .00001 | .00001 | .00001 | - | .00001 | .00001 | | | | - | | - | |
| R | | | ⋮ | ⋮ | ⋮ | ⋮ | ⋮ | ⋮ | | ⋮ | ⋮ | ⋮ | ⋮ | ⋮ | | ⋮ | | ⋮ |
| S | UE | | .00001 | .00001 | .00001 | .00001 | .020 | .00001 | - | .00001 | .00001 | | | | - | | - | |

The aforesaid probabilites are accessed by the component OCR word characters and dictionary word characters which are selectively switched by the multiplexors 94 and 96 under the control of the flag decoder 100, into the address registers 116 and 122, respectively. The operation of the multiplex timing 108 is shown in Table V. The operation of the multiplex 94 and the multiplex 96 is shown in Table VI.

TABLE V

Multiplex Timing (108)

| FLAG | NUMBER PULSES |
|---|---|
| Substitution | 1 |
| Splitting | 4 |
| Concatenation | 4 |
| Crowding | 4 |

TABLE VIa

Multiplex Switching
Flag bit = Character Substitution
Timing Pulse (108)

| | 1 | 2 | 3 | 4 |
|---|---|---|---|---|
| Multiplex (94) | $K_1$ | NONE | NONE | NONE |
| Multiplex (96 | $L_1$ | | | |
| Multiplex (128) | line (164) | | | |

TABLE VIb

Multiplex Switching
Flag bit = Character Splitting
Timing Pulse (108)

| | 1 | 2 | 3 | 4 |
|---|---|---|---|---|
| Multiplex (94) | $K_1$ | $K_2$ | $K_1,K_2$ | $K_3$ |
| Multiplex (96) | $L_1$ | $L_2$ | $L_1$ | $L_2$ |
| Multiplex (128) | Reg. (130) | Reg. (132) | Reg. (134) | Reg. (136) |

TABLE VIc

Multiplex Switching
Flag Bit = Character Concatenation
Timing Pulse (108)

| | 1 | 2 | 3 | 4 |
|---|---|---|---|---|
| Multiplex (94) | $K_1$ | $K_2$ | $K_1$ | $K_2$ |
| Multiplex (96) | $L_1$ | $L_2$ | $L_1L_2$ | $L_3$ |
| Multiplex (128) | Reg. (130) | Reg. (132) | Reg. (134) | Reg. (136) |

TABLE VId

Multiplex Switching
Flag Bit = Character Crowding
Timing Pulse (108)

| | 1 | 2 | 3 | 4 |
|---|---|---|---|---|
| Multiplex (94) | $K_1$ | $K_2$ | $K_1,K_2$ | OPEN |
| Multiplex (96) | $L_1$ | $L_2$ | $L_1,L_2$ | OPEN |
| Multiplex (128) | Reg. (130) | Reg. (132) | Reg. (134) | Load 1 into Reg. (136) |

Figure 8:
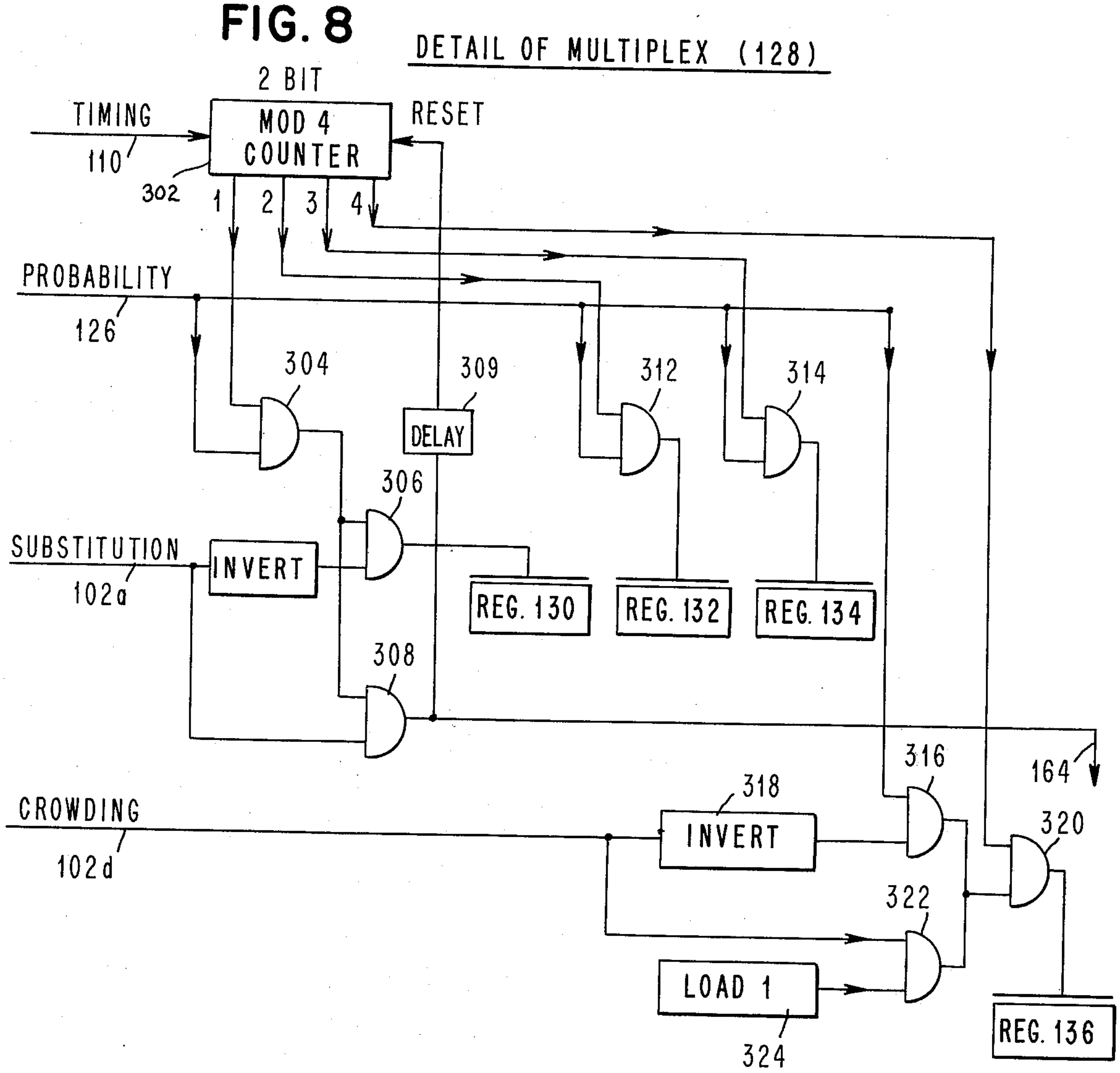
FIG. 8 is a detailed logic diagram of the multiplexor 128.

The multiplex 128 has a data input connected to the probability output line 126 from the conditional probability storage matrix 124. The multiplex 128 operates under the control of the multiplex timing 110 and the flag decoder 100 to sequentially distribute conditional probabilities accessed from the storage matrix 124 into registers 130, 132, 134, 136 or onto line 164, as is described in the multiplex switching Table VI. A detailed illustration of the circuitry for the multiplex 128 is shown in FIG. 8.

A first multiplier 138 having an input connected to the output of register 130 and register 132, multiplies a first received conditional probability by a second received conditional probability accessed from the conditional probability storage matrix 124. The multiplier 138 outputs the first probability product on line 142 to the comparator 146.

The multiplier 140 has inputs connected to registers 134 and 136, for multiplying a third received conditional probability by a fourth received conditional probability accessed from the conditional probability storage matrix 124. The second probability product calculated thereby is outputted on line 144 to the comparator 146.

The comparator 146 compares the relative magnitudes of the first probablity product and the second probability product outputted on lines 142 and 144. If the first probability product is greater than the second probability product, a signal is outputted from the comparator 146 on output line 158 to the gate 148 and to the shift command 162. Alternately, if the second probability product is greater than the first probability product, the comparator 146 outputs on its output line 160 a signal to the gate 150 and to the shift command 162.

The shift command 162 has a control input line 102 connected to the flag decoder 100 and an output line 80 connected to the shift control 20. A detailed illustration of the shift command 162 is shown in FIG. 9 and the operation of the shift command 162 and shift control 20 is illustrated in Table VII. The output line 80 is composed of four lines which direct the shift control 20 to shift to the left registers 14 and 26 as follows: line 80*a* one cell each; line 80*b* two cells each; line 80*c* two cells and one cell respectively; and line 80*d* one cell and two cells respectively.

TABLE VII

Shift Control

| FLAG | LARGER PRODUCT (MULTIPLIER) | POSITIONS SHIFTED IN OCR WORD S/R (14) | POSITIONS SHIFTED IN DICTIONARY S/R (34) |
|---|---|---|---|
| Substitution | (na) | 1 | 1 |
| Segmentation: | | | |
| Splitting | (138) | 1 | 1 |
| | (140) | 1 | 1 |
| Concatenation | (138) | 1 | 1 |
| | (140) | 1 | 2 |

TABLE VII-continued

| FLAG | Shift Control LARGER PRODUCT (MULTIPLIER) | POSITIONS SHIFTED IN OCR WORD S/R (14) | POSITIONS SHIFTED IN DICTIONARY S/R (34) |
|---|---|---|---|
| Crowding | (138) | 1 | 1 |
| | (140) | 2 | 2 |

If the flag decoder 100 determines that the error propensity flag for the character stored in the $L_1$ cell of the dictionary word shift register 26 shows a propensity to simple character substitution, the operation is in accordance with Table VI*a*. The multiplexor 94 signalled over line 102*a* by the flag decoder 100 and receiving a single timing pulse over line 110, switches the contents of the $K_1$ cell of the OCR word shift register 14 over line 114 to the address register 116. Simultaneously, the mutiplexor 96 signalled over line 102*a* by the flag decoder 100 and receiving a single timing signal over line 110, switches the contents of the $L_1$ cell in the dictionary word shift register 26 over the line 88 and over the line 120 to the address register 122. Then the conditional probability $P(K_1|L_1)$ is accessed from the initial probability storage matrix 124 and outputted over the probability output line 126 to the multiplexor 128. The multiplexor 128, signalled over line 102*a* by flag decoder 100 and receiving a single timing signal over line 110, switches the first type conditional probability input over line 126 to the output line 164, bypassing the comparator 146.

If, instead, the error propensity flag stored in association with the character stored in the $L_1$ cell of the dictionary word shift register 26 indicates a propensity to character splitting, then the operation is in accord with Table VI*b*. The multiplexor 94, signalled over line 102*b* by the flag decoder 100 and receiving four timing signals over line 110 from multiplex timing 108, will switch the sequence of four characters or character combinations from the cells $K_1$, $K_2$ and $K_3$ of the OCR word shift register 14, to the address register 116. Simultaneously, the multiplexor 96 will switch a sequence of four characters or character combinations from the cells $L_1$, $L_2$ and $L_3$ to the address register 122. In response to the first timing pulse from multiplex timing 108, the first character switched by the multiplexor 94 is the contents of the $K_1$ cell and the first character switched by the multiplexor 96 is the contents of the $L_1$ cell. The conditional probability $P(K_1|L_1)$ is accessed from the conditional probability storage matrix 124 and outputted over probability line 126 to the multiplexor 128. The multiplexor 128, under the control of the flag decoder 100 has a signal on the input line 102*b* indicating a splitting propensity and in response to the first timing pulse from multiplier timing 108, switches the conditional probability input on line 126 to the register 130, for eventual processing by the comparator 146. In response to the second timing pulse for multiplex timing 108, the second character switched by the multiplexor 94 is the contents of the $K_2$ cell and the second character switched by the multiplexor 96 is the contents of the $L_2$ cell. The conditional probability $P(K_2|L_2)$ is accessed from the conditional probability storage matrix 124 and outputted over the probability line 126 to the multiplexor 128. The multiplexor 128, under the control of the flag decoder 100, has a signal on the input line 102*b* indicating a splitting propensity and in response to the second timing pulse from multiplex timing 108, switches the second conditional probability input on line 126 to the register 132, for eventual processing by the comparator 146. In response to the third timing pulse from the multiplex timing 108, the third character combination switched by the multiplexor 94 is the contents of the $K_1$ cell and the $K_2$ cell and the third character switched by the multiplexor 96 is the contents of the $L_1$ cell. The conditional probability $P(K_1K_2|L_1)$ is accessed from the conditional probability storage matrix 124 and outputted over probability line 126 to the multiplexor 128. The multiplexor 128, under control of the flag decoder 100, has a signal on the input line 102*b* indicating a splitting propensity and in response to the third timing pulse from multiplex timing 108, switches the third conditional probability input on line 126 to the register 134, for eventual processing by the comparator 146. In response to the fourth timing pulse for multiplex timing 108, the fourth character switched by the multiplexor 94 is the contents of the $K_3$ cell and the fourth character switched by the multiplexor 96 is the contents of the $L_2$ cell. The conditional probability $P(K_3|L_2)$ is accessed from the conditional probability storage matrix 124 and outputted over probability line 126 of the flag decoder 100, has a signal on the input line 102*b* indicating a splitting propensity and in response to the fourth timing pulse from multiplex timing 108, switches the fourth conditional probability input on line 126 to the register 136, for eventual processing by the comparator 146.

If, instead, the error propensity flag stored in association with the character stored in the $L_1$ cell of the dictionary word shift register 26, indicates a propensity to character concatenation, then the operation is in accord with Table VI*c*. The multiplexor 94, signalled over line 102*c* by the flag decoder 100 and receiving four timing signals over line 110 from the multiplex timing 108, will switch the sequence of four characters or character combinations from the cells $K_1$, $K_2$ and $K_3$ of the OCR word shift register 14, to the address register 116. Simultaneously, the multiplexor 96, signalled over line 102*c* by the flag decoder 100 and receiving four timing signals over line 110 from the multiplex timing 108, will shift the sequence of four characters or character combinations from the cells $L_1$, $L_2$ and $L_3$ to the address register 122. In response to the first timing pulse from the multiplex timing 108, the first character switched by the multiplexor 94 is the contents of the $K_1$ cell and the first character switched by the multiplexor 96 is the contents of the $L_1$ cell. The conditional probability $P(K_1|L_1)$ is accessed from the conditional probability storage matrix 124 and outputted over probability line 126 to the multiplexor 128. The multiplexor 128, under the control of the flag decoder, has a signal on the input line 102*c* indicating a concatenation propensity and in response to the first timing pulse from multiplex timing 108, switches the first conditional probability input on line 126 to the register 130, for eventual processing by the comparator 146. In response to the second timing pulse from the multiplex timing 108, the second character switched by the multiplexor 94 is the contents of the $K_2$ cell and the second character switched by the multiplexor 96 is the contents of the $L_2$ cell. The second conditional probability $P(K_2|L_2)$ is accessed from the conditional probability storage matrix 124 and outputted over probability line 126 to the multiplexor 128. The multiplexor 128, under control of the flag decoder 100, has a signal on input line 102*c* indicating a concatenation propensity and in response to the second timing pulse from multiplex timing 108, switches the second conditional probability input on line 126 to the register 132, for eventual processing by the comparator 146. In response to the third timing pulse from multiplex timing 108, the third character switched by the multiplexor 94 is the contents of the $L_1$ cell and the $L_2$ cell. The conditional probability $P(K_1|L_1, L_2)$ is accessed from the conditional probability storage matrix 124 and outputted over probability line 126 to the multiplexor 128. The multiplexor 128, under the control of the flag decoder 100, has a signal on input line 102*c* indicating a concatenation propensity and in response to the third timing pulse for multiplex timing 108, switches the third conditional probability input on line 126 to the register 134, for eventual processing by the comparator 146. A response to the fourth timing pulse from the multiplex timing 108, the fourth character switched by the multiplexor 94 is the contents of the $K_2$ cell and the fourth character switched by the multiplexor 96 is the contents of the $L_3$ cell. The conditional probability $P(K_2|L_3)$ is accessed from the conditional probability storage matrix 124 and outputted over probability line 126 to the multiplexor 128. The multiplexor 128, under the control of the flag decoder 100, has a signal on the input line 102*c* indicating a concatenation propensity and in response to the fourth timing pulse from multiplex timing 108, switches the fourth conditional probability input on line 126 to the register 136, for eventual processing by the comparator 146.

If, instead, the error propensity flags stored in association with the character stored in the $L_1$ cell of the dictionary word shift register 26, indicates a propensity to character crowding, then the operation is in accord with Table VI*d*. The multiplexor 94, signals over line 102*d* by the flag decoder 100 and receiving four timing signals over line 110 from the multiplex timing 108, will switch the sequence of four characters or character combinations from the cells $K_1$ and $K_2$ of the OCR shift register 14 to the address register 116. Simultaneously, the multiplexor 96, signalled over line 103*d* by the flag decoder 100 and receiving four timing signals over line 110 from multiplex timing 108, will switch a sequence of four characters or character combinations from the cells $L_1$ and $L_2$ to the address register 122. In response to the first timing pulse from multiplex timing 108, the first character switched by the multiplexor 94 is the contents of the $K_1$ cell and the first character switched by the multiplexor 96 is the contents of the $L_1$ cell. The conditional probability $P(K_1|L_2)$ is accessed from the conditional probability storage matrix 124 and outputted over probability line 126 to the multiplexor 128. The multiplexor 128, under control of the flag decoder 100, has a signal on the input line 102*d* indicating a crowding propensity and in response to the first timing pulse from multiplex timing 108, switches the conditional probability input on line 126 to the register 130, for eventual processing by the comparator 146. In response to the second timing pulse from the multiplex timing 108, the second character switched by the multiplexor 94 is the contents of the $K_2$ cell and the second character switched by the multiplexor 96 is the contents of the $L_2$ cell. The conditional probability $P(K_2|L_2)$ is accessed from the conditional probability storage matrix 124 and outputted over probability line 126 to the multiplexor 128. The multiplexor 128, under the control of the flag decoder 100, has a signal on the input line 102*d* indicating a crowding propensity and in response to the second timing pulse from the multiplex timing 108, switches the second conditional probability input on line 126 on the register 132 for eventual processing by the comparator 146. In response to the third timing pulse from the multiplex timing 108, the third character combination switched by the multiplexor 94 is the contents of the $K_1$ cell and the $K_2$ cell and the third character combinations switched by the multiplexor 96 is the contents of the $L_1$ cell and the contents of the $L_2$ cell. The conditional probability $P(K_1k_2|L_1L_2)$ is accessed from the conditional probability storage matrix 124 and outputted over probability line 126 to the multiplexor 128. The multiplexor 128, under the control of the flag decoder 100, has a signal on input line 102*d* indicating a crowding propensity and in response to the third timing pulse from multiplex timing 108, switches the third conditional probability input on line 126 to the register 134, for eventual processing by the comparator 146. In response to the fourth timing pulse from multiplex timing 108, no characters are switched by the multiplexor 94 and no characters are switched by the multiplexor 96. The multiplexor 128, under the control of the flag decoder 100, has a signal on the input line 102*d* indicating a crowding propensity and in response to the fourth timing pulse from multiplex timing 108, loads the value 1 which is stored in the storage register 324, into the register 136, for eventual processing by the comparator 146.

The contents of the register 130 is multiplied times the contents of the register 132 by the multiplier means 138 and the product is output on line 142 to the comparator 146. The contents of the register 134 is multiplied times the contents of the register 136 by the multiplier means 140 and the product is output on line 144 to the comparator 146. The product output by the first multiplier means 138 is the first probability product and the product output by the second multiplier means 140 is the second probability product. The relative magnitudes of the first probability product and the second probability product are compared in the comparator 146. If the first probability product on line 142 is larger than the second probability product on line 144, the comparator 146 outputs the gating signal on line 158 enabling the gate 148 so as to pass the contents of register 130 on line 149 to the line 152 and then to line 156. The comparator's signal on line 158 is input to the shift command 162. If the second probability product on line 144 is larger than the first probability product on line 142, the comparator 146 outputs a gating signal on line 160 enabling the gate 150 so as to pass the contents of register 134 on line 151 to the line 156. The comparator's output signal on line 160 is input to the shift command 162. The first probability product represents the probability that simple character substitutions will occur between the characters stored in the $L_1$ cell and the $K_1$ cell and the characters stored in the $L_2$ cell and the $K_2$ cell. The second probability product represents the probability that a segmentation error through character splitting, concatenation, or crowding has occurred between the characters in the dictionary word shift register 26 and the OCR word shift register 14. If the first probability product is larger than the second probability product, then the word stored in the OCR word shift register 14 and the word stored in the dictionary word shift register 26 can be simultaneously shifted by the same amount in processing the next set of letters therein. However, if the second probability product is larger than the first probability product, then some form of character segmentation has taken place which may require the differential shifting of the word stored in the OCR word shift register 14 with respect to that for the word stored in the dictionary word shift register 26, before further processing of subsequent letters in the word can be commenced. This differential shifting decision is accomplished by the shift command 162.

This shift command 162, a detailed diagram of which is shown in FIG. 9, receives control inputs over line 102 from the flag decoder 100. Line 102*a* indicates a substitution propensity, line 102*b* indicates a splitting propensity, line 102*c* indicates a concatenation propensity, and line 102*d* indicates a crowding propensity. The shift command 162 receives over line 158 a gating signal from the comparator 146 indicating that the first probability product is greater or receives over the line 160 a gating signal from the comparator 146 indicating that the second probability product is greater. The shift command 162, employing the logic shown in FIG. 9, outputs a shift command signal over line 80 to the shift control 20. Shift control 20 controls the shifting of the contents of the OCR word shift register 14 over line 22 and controls the shifting of the contents of the dictionary word shift register 26 and the flag bit shift register 34 over line 24. When the flag decoder 100 indicates over line 102*a* that the character in cell $L_1$ has a propensity for simple substitution, the shift command 162 outputs on line 80*a* a signal to the shift control 20 to shift both the OCR shift register 14 and the dictionary word shift register 26 by one cell. When the flag decoder 100 indicates over line 102*b* that the character in cell $L_1$ has a splitting propensity, the shift command 162 will output on line 80*a* a signal to the shift control 20 to shift both shift register 14 and shift register 26 by one cell when the first probability product is greater than the second probability product. When the flag decoder 100 indicates over line 102*b* that the character in the $L_1$ cell has a splitting propensity, the shift command 162 will output over line 80*c*, a signal to the shift control 20 to shift the OCR word shift register 14 by two cells and to shift the dictionary word shift register 26 by one cell if the second probability product is greater. When the flag decoder 100 indicates over line 102*c* that the character pairs stored in cells $L_1$ and $L_2$ have a concatenation propensity, the first command 162 will output a signal on line 80*a* to the shift control 20 to shift both the shift register 14 and the shift register 26 by one cell when the first probability product is greater than the second probability product. When flag decoder 100 signals over line 102*c* that the character pair stored in cells $L_1$ and $L_2$ have a concatenation propensity, the shift command 162 will output on line 80*d* a signal to the shift control 20 to shift the OCR word register 14 by one cell and the dictionary word shift register 26 by two cells when the second probability product is greater than the first probability product. When the flag decoder 100 indicates over line 102*d* that the character pair in cells $L_1$ and $L_2$ have a crowding propensity, the shift command 162 will output on line 80*a* to the shift control 20 a signal commanding the shift register 14 and the shift register 26 to both shift by one cell when the first probability product is greater than the second probability product. When the flag decoder 100 signals on line 102*d* that the character pair stored in cells $L_1$ and $L_2$ have a crowding propensity, then the shift command 162 will output on line 80*b* a command to the shift control 20 shift both the OCR word shift register 14 and the dictionary word shift register 26 by two cells when the second probability product is greater than the first probability product.

The conditional probability for a simple substitution outputted by the multiplexor 128 onto the line 164 and the conditional probabilities outputted by register 130 for a simple substitution and register 134 for segmentation, are directed along line 156 to a running product calculating means comprising the multiplier 58 and the product register 56 and the clear and store 54. One object of the apparatus shown in FIG. 3 is to find that dictionary word stored in the dictionary storage 28 which has the highest running product when compared with the OCR word stored in the OCR word shift register 14. As each new dictionary word is outputted from the dictionary store over line 30 to the dictionary word shift register 26, the dictionary store transmits a signal over line 55 to the clear in store 54 to clear the contents of the product register A56 and store the value one therein. As each conditional probability value is received over line 156 in the multiplier 58, that probability is multiplied times the contents of the product register (A)56 and the product thereof is stored in the product register (A)56. Thus, as the dictionary word stored in the dictionary word shift register 26 is compared with the OCR word stored in the OCR word shift register 14, a running product of the probabilities that the OCR word was misread given that the dictionary word was actually scanned, is calculated and stored in the product register 56. After the dictionary word stored in the dictionary word shift register 26 has been completely processed, the contents of the product register 56 will contain the total probability product for the comparison of the dictionary word with the OCR word. If the total probability product stored in register 56 has a magnitude greater than those for total probability products previously calculated for dictionary words compared to the OCR word presently stored in shift register 14, the total probability product in product register 56 is transferred by means of gate 64 to the highest product register (B)66. The comparator 62 maintains a running comparison of the magnitude of the running product being calculated and stored in the product register (A)56 with the highest product register (B)66. The magnitude of the contents of the product register (A) 56 starts with a value of one which is inserted by the clear and store 54 at the beginning of the comparison for each dictionary word loaded into shift register 26. The magnitude of each probability inputted over line 156 to the multiplier 58 is less than one and thus the magnitude of the running product being calculated and stored in the product register (A)56 becomes monotonically smaller as the comparison of the dictionary word to the OCR word continues. If the comparator 62 determines that the magnitude of the running product stored in the product register (A)56 is smaller than the contents of the highest product register (B)66, the comparator 62 outputs on the word abort line 78 a signal to the dictionary store 28 to transmit the next dictionary word from the dictionary store over line 30 to the dictionary word shift register 26, thereby terminating the comparison of the existing dictionary words with the OCR word. The OCR word shift register 15 is simultaneously signalled to recirculate the OCR word to its initial position so that the next comparison may commence. As each dictionary word is outputted from the dictionary store 28 over line 30 to the dictionary word shift register 26, dictionary word is also transmitted over line 40 to the word register 38. The comparator 62 maintains a gating signal on line 70 so long as the running product stored in the product register (A)56 remains greater than the contents of the highest product register (B)66. When the last letter in the dictionary word stored in the dictionary word shift register 26 has been compared with corresponding letter in the OCR word stored in the OCR word shift register 14, the shift control 20 outputs on line 74 an end of word signal which is transmitted to the gate 72. If the contents of the product register (A)56 is still greater than the contents of the highest product register (B)66, then the gate 72 is enabled and the gating signal from the comparator 62 on line 70 is transmitted to and enables the gate 64. Gate 64 then transmits the total probability product stored in the product register (A)56 to the highest product register (B)66. Simultaneously the gating pulse from gate 72 is transmitted to gate 42 over line 76 and enables gate 42 thereby transmitting the dictionary word stored in the word register 38 to the best word register 44. The end of word signal on line 74 from the shift control 20 is also transmitted to the dictionary store 28, thereby causing the dictionary store to transmit to the dictionary word shift register 26 the next dictionary word. After all the dictionary words stored in the dictionary store 28 have been compared to the OCR word stored in the OCR word shift register 14, an end of dictionary list signal is outputted on line 48 from the dictionary store 28 to the gate 50, enabling the transmission of dictionary word stored in the best word register 44 out onto line 52 as the most likely alpha field. This alpha field is inputted to the alpha numeric output register 8 for outputting on the output line 10. Thus, the dictionary word stored in dictionary store 28 which was most likely misread by the OCR as the OCR word stored in the OCR word shift register 14, is outputted on line 10.

The detailed figure of the shift control 20 shown in FIG. 4 shows the modulo four counter 204 and the modulo four counter 214 receiving a signal over one of the lines **80*a*, 80*b*, 80*c* or 80*d* from the shift command 162, which places a limiting value of 1 or 2 on the counters 204 or 214 necessary to generate an output for the reset on the flip flop 206 or 216, respectively. In this manner, the counter 204 can be programmed to shift the OCR word shift register 14 by 1 or 2 cell positions and the counter 214 can be programmed to shift the dictionary word shift register 26** by 1 or 2 cell positions.

The clock oscillator **200*a* and 200*b* can be a single oscillator whose output waveform is counted by the counters 204 and 214. A signal on one of the lines 80 from the shift command 162 sets the limit on counter 204, and through the OR gate 202, resets and starts the counter 204 counting the output waveform from the clock oscillator 200*a*. At the same time the flip flop 206 is set and the A output from the flip flop turns on the AND gate 208 thereby transmitting the waveform from the clock oscillator to the decrementing counter 210 and over the output line 22 to the OCR word shift register 14. The decrementing counter 210 has been loaded over line 19 with the OCR character count from the character counter 18. As an example of operation, if the shift command 162 has outputted a signal over line 80*c* to the shift control 20, a limit value of 2 is set in the counter 204. Thus, two timing pulses from the clock oscillator 200*a* will be transmitted through the AND gate 208 to the decrementing counter 210 and over line 22 to the OCR word shift register 14. When the counter 204 reaches the limit of 2 and outputs a pulse to the reset of the flip flop 206, the AND gate 208 is turned off. In this manner the OCR word shift register has been shifted two positions and the decrementing counter has subtracted from the original character count for the OCR word, the value of 2. A similar operation obtains for the counter 214 which shifts the dictionary word shift register 26 and the flag bit shift register 34. When the decrementing counters 210 or 220 have their contents reduced to zero, having fully processed either the OCR word or the dictionary word respectively, a zero output signal is placed on line 74 which signals the dictionary store 28 and 72** as previously discussed.

The detailed figure of the multiplex timing 108 shown in FIG. 7, depicts the modulo 4 counter 294 whose counting limit is selected by the means of a signal over line **102*a*, 102*b*, 102*c* or 102*d* from the flag decoder 100. When the dictionary word shift register 26 shifts a new character into the cell $L_1$, the corresponding flag bit stored in the flag bit shift register 35 is outputted over line 98 to the flag decoder 100. If the flag bit indicates a simple substitution propensity, a signal is outputted from the flag decoder 100 over line 102*a* setting a limit value of one into the counter 294. If the flag bit outputted to the flat decoder indicates a splitting, concatenation or crowding propensity, the flag decoder 100 outputs a signal over one of the lines 102*b*, 102*c* or 102*d*, respectively, setting a limit value of four in the counter 294. The counter 294 is reset and started by means of the OR gate 292 upon receipt of the limit value, and the counter commences to count the oscillator pulses issued from the oscillator 290. Simultaneously the signal from the OR gate 292 sets the flip flop 296 and thereby activates the AND gate 298 so that the oscillator pulses from the oscillator 290 are output on the line 110 as the multiplexed timing pulses to the multiplexor's 94, 96 and 128. If a signal has been received over line 102*b*, a limit of four is set in the counter 294 and the AND gate 298 permits four multiplexed timing pulses to be outputted on line 110 before the counter 294 reaches the limit value of four and resets the flip flop 296 thereby deactivating the AND gate 298**.

The detailed figure of the multiplexor 94 in FIG. 5 shows the modulo 4 counter 230 receiving the timing pulses over line 110 from the multiplexed timing 108. The counter 230 has four output lines, the first labeled 1 connected to the AND gate 232 is on when the counter counts the first timing pulse over line 110. The second output line from counter 230 labeled 2 connected to the AND gate 236 is on only when the counter counts the second timing pulse over line 110. The third output line labeled 3 connected to the AND gate 238 and 240 is on only when the counter 230 counts the third timing pulse over line 110. The fourth output line labeled 4 connected to the AND gate 242 is on only when the counter 230 counts the fourth timing pulse input over line 110. If the error propensity flag corresponding to the character stored in the $L_1$ cell of the dictionary word shift register 26 indicates a simple substitution, the flag decode 100 will output on line **102*a* a substitution signal which is input to the AND gate 258 of the multiplexor 94 in FIG. 5. Since a signal on line 102*a* is input to the multiplexed timing 108** shown in FIG. 7 and sets the limit value of the counter 294 to one, only a single time pulse will be incident over line 110 to the modulo four counter 230 of the multiplexor 94 in FIG. 5. Counter 230 counts the timing pulse over line 110 and turns on the output line labeled 1 connected to the AND gate 232. AND gate 232 thereby gates the contents of the $K_1$ cell on line 82 from the OCR word shift register 14, onto line 114 to the address register 116. Output line labeled 1 from the counter 230 is also connected to the gate 258 and a signal thereon conditions gate 258 in combination with the substitution signal on line 102*a* to transmit a signal through the delay 234 to reset the counter 230. Simultaneously, in the detailed figure of the multiplexor 96 shown in FIG. 6, the modulo four counter 260 receives the first timing pulse over line 110 and turns on the output line labeled 1 connected to the AND gate 262 which gates the contents of the $L_1$ cell over line 88 from the dictionary word shift register 26 onto line 120 to the address register 122. The output line 1 from the counter 260 is also connected to the AND gate 263 which is thereby conditioned to pass the substitution signal on line 102*a* to the delay 264 to reset the counter 260. Thus, the contents of the $K_1$ cell of the OCR word shift register 14 becomes the contents of the address register 116 and the contents of the $L_1$ cell of the dictionary word shift register 26 becomes the contents of the address register 122 for the purpose of accessing the conditional probability for simple substitution $P(k_1|l_1)$. The detailed figure of the multiplex 128 shown in FIG. 8 shows the modulo four counter 302 which receives the timing pulse over line 110 from the multiplex timing 108. Counter 302 has four output lines labeled 1, 2, 3 and 4, each of which is on only when its respective value is counted by the counter 302. The multiplex 128 upon receiving the substitution signal over line 102*a* activates AND gate 308 and deactivates AND gate 306. With a receipt of the first timing pulse over line 110, and AND gate 304 is activated thereby passing the conditional probability product $P(k_1|l_1)$ accessed from the conditional probability storage matrix 124 and input over line 126, through AND gate 304 and through AND gate 304 onto line 164 and sent to the multiplier 58. The output from AND gate 308 serves as the reset signal which is delayed by the delay 309 and resets the counter 302. The operation of the multiplexors 94, 96 and 128 when the error propensity flag associated with the character in the $L_1$ cell indicates splitting, concatenation or crowding, involves the sequential loading of registers 130, 132, 134 and 136 with conditional probabilities accessed from the storage matrix 124, and will be discussed later in connection with the section on operation.

It is recognized that without departing from the spirit and scope of the invention as disclosed in FIG. 3, the dictionary store 28 and the conditional probability storage matrix 124 can each be a part of the same storage means. It is further seen that instead of employing the OCR word shift register 14 and the multiplex 94 in conjunction with the dictionary word shift register 26 and the multiplex 96 to differentially shift the characters in the respective words therein as has been disclosed, that the OCR word and the dictionary word could be respectively stored in two stationary registers, each character position of which was connected to a switching means for switching the selected combination of characters discussed, to the address registers 116 and 122. To implement such a switching means, the characters of the OCR word would be stored in a first stationary register with the characters arranged in the sequence of receipt from the OCR, with a first character at a given end of the OCR word defining a first position of an error word origin. This would correspond to the $K_1$ cell in the OCR word shift register 14. The characters and error propensity indicia of the dictionary word would be stored in a second stationary register with the characters arranged in a sequence to correspond with the sequence of characters in the first stationary register. A first character in the dictionary word would be positioned to correspond with the first character in the OCR word, defining a first position for a reference word origin. This of course corresponds to the cell $L_1$ in the dictionary word shift register 26. When, for example, the error propensity indicium for the character located at the reference word origin in the reference word indicates a character splitting propensity, the following sequence of events would take place in the switching means. A first conditional probability of a simple substitution that given the character located at the reference word origin in the reference word was scanned, that the OCR substituted the character located at the error word origin in the error word. This would correspond to the simple substitution probability $P(K_1|L_1)$ as previously discussed. Then the switching means switches the character next to the character at the reference word origin in the reference word and the character next to the character located at the error word origin in the error word to access the second conditional probability corresponding to $P(K_2|L_2)$ as previously discussed. The switching means would then switch the character located at the reference word origin in the reference word and the character located at the error word origin and the character next to the character located at the error word origin in the error word in order to access a third conditional probability correspondng to $P(K_1K_2|L_1)$ as previously discussed. Finally, the switching means would switch the character next to the character located at the reference word origin in the reference word and the second next character to the character located at the error word origin in the error word so as to access a fourth conditional probability corresponding to $P(K_3|L_2)$ as previously discussed. Such a switching means would select subsequent sets of corresponding characters in the OCR word and the dictionary word for comparison in accordance with the shift commands from the shift command 162. The switching means under the control of a shift command 162, would shift the location of both the error word origin and the reference word origin by a single character position when the comparator indicates simple substitution is more probable and a splitting segmentation. The switching means would shift the error word origin by two character positions and shift the reference word origin by one character position when splitting segmentation appears more probable than simple substitution, in a manner analogous to that for the shift register operation previously discussed. Where the error propensity indicium indicated the propensity to character concatenation, the switching means which shifts the error word origin and the reference word origin by one character position when the probability of simple substitution is greater than that of concatenation segmentation. The switching means would shift the error word origin by one character position and the reference word origin by two character positions when the probability of character concatenation was greater than the probability of simple substitution.

There are about half a dozen horizontal splitting segmentation prone characters which are shown in Table I and about a dozen concatenation segmentation prone character pairs shown in Table II. By themselves they constitute only a small part of the alpha composition of the dictionary words stored in the dictionary storage 28. In the preferred embodiment, unless a flag is encountered associated with the character or character pair, the likelihood factor analysis proceeds as if simple character substitution was the only garbling factor to be considered. Only when a flag is encountered does the operation of the invention incorporate an analysis of possible segmentation occurrences. In the preferred embodiment, the characters and character pairs shown in Tables I and II are specially encoded in the form stored in the dictionary store 28 so that the flag code is a part of the alpha character code. Each alpha character is stored using only five of the eight bits usually used to store a character. The other three bits are then available for designating character segmentation, character pair concatenation and character pair crowding propensities. An alternate embodiment can be employed however so that it is unnecessary to engage in a special coding of the segmentation prone characters stored in the dictionary storage 28. In this alternate embodiment, the flag bit shift register 34 shown in FIG. 3 would be eliminated and in its place is substituted a writable-read only storage having a ROS address register with inputs connected to lines 88 and 90 for the $_1$ and $L_2$ cells of the dictionary word shift register 26. The writable-read only storage would have line 98 as its output line inputting into the flag decode 100. This writable-read only storage would contain the information on splitting segmentation shown in Table I and the information on concatenation segmentation shown in Table II. The dictionary words stored in the dictionary words stored in the dictionary storage 28 could then be coded in conventional fashion. When a dictionary word is loaded into the dictionary word shift register 26, the writable-read only storage would have as its input the contents of the cells $L_1$ and $L_2$, such combination accessing an error propensity indicium indicating whether simple substitution, splitting, concatenation or crowding would be a possible mode for garbling the characters. The error propensity indicium would be outputted on line 98 in a form similar to that outputted by the cell 35 in the flag bit shift register 34 of the preferred embodiment shown in FIG. 3. The ROS address register and the writable-read only storage constitutes a means for generating an error propensity indicium.

OPERATION

The operation of the regional context maximum likelihood OCR error correction apparatus shown in FIG. 3 will be illustrated by processing the word "Wreck" which the OCR misread as "IWn*c". Recall that the asterisk sign indicates a rejected or unrecognized character. Three dictionary words stored in the dictionary storage 28 will be compared with the OCR input word "IWn*c", "Break", "Wreck" and "Freak". The analysis for each of these words is shown in Tables VIII, IX and X respectively. The illustration of the operation begins after the apparatus of FIG. 3 has compared the dictionary word "Break" with the OCR input word "IWn*c". We shall assume that up to this point the dictionary word having the highest total conditional probability product of having been misread by the OCR as the OCR input word "IWn*c" is the word "Break" and that therefore the word "Break" is stored in the best word register 44 and its total conditional probability of 4.4 times $10^{-13}$ as is shown in Table VIII, is stored in the highest product register (B)66. The OCR input word is shifted by means of the shift control 20 so that the first letter to be tested, namely the letter *c* is positioned in the $K_1$ cell. Simultaneously, the dictionary store 28 loads the word "Wreck" into the dictionary word shift register 26 such that the letter *k* is positioned in the $L_1$ cell. Simultaneously, the flag associated with the letter *k* of the dictionary word stored in the cell $L_1$, is loaded by the dictionary store 28 into the cell 35 of the flag bit shift register 34. Table IX shows the relative position of the OCR word, the dictionary word and the flag bits in this stage 1. Table IX shows flag bits for concatenation as the question mark "?", for crowding as the sharp symbol " # ", and for splitting as the exclamation mark "!". It is seen in Table IX that the letter pair *ck* of the word "Wreck" is prone to concatenation error, as can be confirmed by reference to Table II. Table IX further shows that the flag bit for crowding is associated with the character pair *re* in the word "Wreck", as can be confirmed by the reference to FIG. 2. Table IX further shows that the letter "W" in the word "Wreck" is prone to slitting, as can be confirmed by a reference to Table I.

In the first stage shown in Table IX, the flag bit for the first letter *k* for the dictionary word "Wreck" has associated with it the error propensity flag "?" indicating a concatenation propensity. The concatenation propensity flag is located in cell 35 of the flag bit shift register 34 and is detected over line 98 by the flag bit decoder 100, which generates an output signal on line 102*c* indicating a concatenation propensity. The signal on line 102*c* causes the multiplex timer shown in FIG. 7 to set a limit equal to four for the counter 294 and resets and starts the counter 294. The signal on line 102*c* also sets the flip flop 296 thereby enabling the gate 298 permitting the pulses issuing from the clock oscillator 290 to be output on line 110 to accomplish the multiplex timing. Since the limit of four has been set for counter 294, four successive timing pulses will be emitted by the multiplex timer 108 before the counter 294 outputs a reset pulse to the flip flop 296 thereby disabling the AND gate 298 and stopping the issuance of timing pulses on line 110. Selected conditional probabilities are accessed from matrix 124 as follows. The signal on line 102*c* in conjunction with the first timing pulse from the multiplex timer 108, causes the multiplexor 94 of FIG. 5 to connect the $k_1$ cell line 82 to line 114 thereby transferring the letter *c* from the $K_1$ cell to the address register 116. The first timing pulse from the multiplex timer 108 causes the multiplexor 96 of FIG. 6 to connect the $L_1$ cell by means of line 88 to line 120 thereby transferring the contents of the $L_1$ cell which is the letter *k* to the address register 122. Thus, the conditional probability $P(c/k)$ which equals $6.7 \times 10^{-3}$ as is shown in Table IX, is accessed from the conditional probability storage matrix 124 and outputted over line 126 to the multiplexor 128. The multiplexor 128 of FIG. 8 in response to this first timing pulse over line 110, causes this first conditional probability to be transferred from line 126 through the AND gate 304 and the AND gate 306 and loaded into register 130. In response to the second timing pulse from the multiplex timing 108, the multiplexor 94 connects the $K_2$ cell via line 84 to line 114 thereby loading the reject symbol "*" from the OCR input word "IWn*c" into the address register 116. Simultaneously, the second timing pulse from the multiplexor 108 causes the contents of the $L_2$ cell to be connected via line 90 to line 120 thereby transferring the letter *c* from the dictionary word "Wreck" to the address register 122. Then the conditional probability $P(*/c)$ which equals $2.4 \times 10^{-2}$ as is shown in Table IX, is accessed from the conditional probability storage matrix 124 outputted over line 126 to the multiplexor 128. The multiplexor 128 in response to the second timing pulse over line 110 causes the second conditional probability over line 126 to be transferred via the AND gate 312 to register 132. In response to the third timing pulse over line 110 and the concatenation signal on line 102*c*, the multiplexor 94 connects the contents of the $K_1$ cell over line 82 via the AND gate 248 to the AND gate 238 to lines 114 thereby loading the letter *c* from the OCR word into the address register 116. Simultaneously, the third timing pulse from the multiplex timing 108 in conjunction with the signal for concatenation over line 102*c* causes the loading of the contents of the $L_1$ cell via line 88 through the AND gate 276 and the AND gate 270 onto the line 118 thereby transferring the contents of the $L_1$ cell which is the letter *k* to the address register 122. Simultaneously the contents of the $L_2$ cell is transferred via line 90 through the AND gate 278 and the AND gate 268 onto line 120 thereby transferring the letter *c* from the dictionary word to the address register 122. Thus, the conditional probability $P(c/ck)$ which equals $1.9 \times 10^{-2}$ as is shown in Table IX, is accessed from the conditional probability storage matrix 124 and output on line 126 to the multiplexor 128. The multiplexor 128 in response to the third timing pulse from the multiplex timing 108 transfers this third probability on line 126 via the AND gate 314 to load the register 134. In response to the fourth timing pulse from the multiplex timing 108, and the concatenation signal on line 102*c*, the multiplexor 94 transfers the contents of cell $K_2$ via line 84 through AND gate 256 and AND gate 242 to line 114 thereby transferring the "*" from the OCR word "IWn*c" stored in the OCR shift register 14 to the address register 116. Simultaneously, in response to the fourth timing pulse from the multiplex timing 108 and the concatenation signal over line 102*c*, the multiplexor 96 transfers the contents of the $L_3$ cell over line 92 through AND gate 286 and AND gate 272 to the line 120 thereby transferring the letter *e* from the dictionary word "Wreck" to the address register 122. The conditional probability $P(*/e)$ which equals $2.8 \times 10^{-2}$ as is shown in Table IX, is accessed from the conditional probability storage matrix 124 and transferred over line 126 to the multiplexor 128. In response to the fourth timing pulse from the multiplex timing 108, the multiplexor 128 transfers the forth probability on line 126 by means of the AND gate 316 and the AND gate 320 and loads it in the register 136. Probability products are now calculated from the conditional probabilities and their respective magnitudes compared. The multiplier 138 multiplies the contents of register 130 and register 132 to obtain a first probability $1.6 \times 10^{-4}$. Simultaneously, the multiplier 140 multiplies the contents of the register 134 and the register 136 and obtains a second probability product $5.3 \times 10^{-4}$. The products generated by the multiplier 138 and 140 are compared by the comparator 146. The comparator determines that the probability product from the multiplier 140 is larger than that for the multiplier 138. This indicates that a character concatenation error was more likely than a simple substitution error for the characters occupying the $K_1$ and $K_2$ cells of the OCR word and the $L_1$, $L_2$ and $L_3$ cells of the dictionary word.

The conditional probability contained in the larger probability product is now multiplied in the dictionary word. The comparator therefore activates line 150 enabling the gate 150 so that the contents $P(c|ck)$ of the register 134 is transferred over lines 151 and 153 to line 156 and thus entered into the multiplier 58. This conditional probability $P(c|ck)$ is multiplied times the contents of the product register (A) 56, which is one, and the running product which is $5.3 \times 10^{-4}$ is stored in the product register 56. The comparator 62 compares the magnitude of the contents of product register A with the contents of the highest product register (B) 66 and determines that A is greater than B. Thus no signal is output on the word abort line 78. The line 70 is conditioned on, but the gate 72 is not enabled by the shift control 20 over the end line 74 and therefore the gate 64 is not enabled at this time.

A shift command is issued to differentially shift the contents of the OCR word S/R 14 and that of the dictionary word S/R 26 and flag bit S/R 34. The comparator 146 activating line 160 causes the shift command 162 of FIG. 9 to enable the AND gate 338 shown in FIG. 9, in conjunction with the concatenation signal on line 102*c*, to output a signal on line 80*d* which is the shift command transferred to a shift control 20. Shift control 20 is instructed to shift the OCR shift register 14 by one position and the dictionary word shift register 26 and the flag bit shift register 34 by two positions. The result of this differential shifting is shown in Table IX, stage 2. Since four timing pulses have been issued by the multiplex timing 108, the modulo four counter 230 in multiplexor 94, the modulo four counter 260 in multiplexor 96 and modulo four counter 302 of the multiplexor 128, are automatically reset to zero and are ready for the analysis of the next set of characters.

In the second stage of the analysis for comparing the dictionary word "Wreck" with the OCR word "IWN*c", the alignment of the characters is such that the dictionary word letter *e* in the $L_1$ cell corresponds to the asterisk "*" of the OCR word in the $K_1$ cell and the dictionary word character *r* in the $L_2$ cell corresponds to the character *n* in the OCR word in the $K_2$ cell. The dictionary word character pair *re* has a crowding flag associated therewith in the flag bit shift register cell 35. This crowding propensity flag is transferred via line 98 to the flag decoder 100 which issues a crowding signal over line 102*d*. In response to crowding signal on line 102*d*, the multiplex timing 108 shown in FIG. 7 sets a limit of four on the counter 294 and resets and starts the counter 294 and sets the flip flop 296 thus enabling the AND gate 298 to transfer four clock pulses from the clock oscillator 290 over the line 110.

Selected conditional probabilities are accessed as follows. The first and second timing pulses issuing from the multiplex timing 108 cause the same sequence of events to occur in the multiplexor 94, multiplexor 96, and multiplexor 128 as was described for the concatenation operation next preceeding. Thus, the conditional probability $P(*|e)$ which equals $2.8 \times 10^{-2}$ as is shown in Table IX, is stored in register 130 and the conditional probability $P(n|r)$ which equals $5.9 \times 10^{-3}$ as is shown in Table IX, is stored in register 132. In response to the third timing pulse issuing from multiplex timing 108, and the crowding signal on line 102*d*, the multiplexor 94 of FIG. 5 transfers the contents of the $K_1$ cell over line 82 by means of the AND gate 250 and the AND gate 240 to the line 112 to the load address register 116. Simultaneously the multiplexor 94 transfers the contents of the $K_2$ cell over line 84 by means of AND gate 252 and AND gate 238 to line 114 thereby loading the letter *n* into the address register 116. The character pair *n is now in the address register 116. In response to the third timing pulse from the multiplex timing 108 and in conjunction with the crowding signal on line 102***d*, the multiplexor 96 of FIG. 6 transfers the contents of the $L_1$ cell over line 88 by means of the AND gates 280 and 270 to the line 118 and transfers the contents of the $L_2$ cell via line 90 by means of the AND gates 282 and 268 to the line 120 thereby transferring the characters *r* and *e* from cells $L_2$ and $L_1$ respectively to the address register 122. The conditional probability $P(n^*|re)$ which equals $5.6 \times 10^{-4}$ as is shown in Table IX is accessed from the conditional probability storage matrix 124 and output on line 126 to the multiplexor 128. In response to the third timing pulse on line 110, the multiplexor 128 of FIG. 8 transfers the third probability on line 126 by means of AND gate 314 to register 134. In response to the fourth timing pulse in the multiplexor timing 108, the multiplexor 94 transfers nothing from the OCR word shift register, the multiplexor 96 transfers nothing from the dictionary word shift register 26. The multiplexor 128 of FIG. 8, in response to the crowding signal on line 102*d* causes the value one stored in the register 324 to be loaded by means of the AND gate 322 and the AND gate 320 into the register 136.

Probability products are now calculated and compared. The multiplier 138 now multiplies the contents of register 130 times the contents of register 132 and generates the product $1.6 \times 10^{-4}$. The multiplier 140 multiplies the contents of register 134 times the contents of register 136 and generates the product $5.6 \times 10^{-4}$. The comparator 146 compares the relative magnitudes of these products and determines that the contents of multiplier 140 is larger than that of multiplier 138. This indicates that the probability that a character crowding error has occurred is greater than the probability of a simple substitution for the characters stored in the $K_1$ and $K_2$ cells and the $L_1$ and $L_2$ cells.

The conditional probability contained in the larger product is passed on. The comparator 146 activates line 160 thereby enabling the gate 150 so that contents $P(n^*|re)$ of the register 134 is transferred over lines 151 and 153 to line 156 and thus to the multiplier 58. The multiplier 58 multiplies the conditional probability $P(n^*|re)$ times the contents of product register A 56 and stores the contents in product register A 56. New running product has the magnitude of $3.0 \times 10^{-7}$ which the comparator 62 determines is still larger than the contents of the highest product register 66 which is $4.4 \times 10^{-13}$, and therefore the word abort line 78 is not activated. Although line 70 is activated, the gate 72 remains disabled since the shift control has not yet come to the end of the dictionary word or the OCR word as would be indicated on output line 74. Thus, gates 64 and 42 are not yet enabled.

A shift command is now issued. The comparator 146 activating line 160 in conjunction with the crowding signal on line 102*d* causes the shift command 162 of FIG. 9 to output a signal on line 80*b*. The signal on line 80*b* is the shift command to the shift control 20 causing the shift control to shift the OCR word shift register by two cells and the dictionary word shift register in flag bit shift register by two cells. Thus in the third stage of analysis as shown in Table IX, stage three has the letter W of the dictionary word matched with the letter W of the OCR word.

The third stage of the comparative analysis of the dictionary word "Wreck" and the OCR word "IWn*c" now commences. An error propensity flag indicating a splitting propensity, is associated with the letter W stored in the $L_1$ cell. The character splitting propensity flag is transferred from cell 35 of the flag bit shift register 34 over line 98 to the flag decoder 100 which issues an output signal over line 102*b*. A signal on line 102*b* indicating a splitting propensity, sets a limit of four in the corner 294 of the multiplex timing 108 shown in FIG. 7, resets and starts the counter 294, and sets the flip flop 296 thereby enabling the AND gate 298 to transfer four timing pulses from the clock oscillator 290 to the line 110.

Selected conditional probabilities are accessed as follows. The first and second timing pulses issuing from the multiplex timing 108 causes the consecutive transfer of the contents of cells $K_1$ and $L_1$ and $K_2$ and $L_2$ as obtained for the concatenation analysis previously discussed. Thus, the conditional probability P(W|W) which equals 0.90 as is shown in Table IX, is loaded into register 130 and the conditional probability P(I|__) which equals $0.15 \times 10^{-3}$ is loaded in register 132. In response to the third timing pulse issuing from multiplex timing 108 and the splitting signal on line 102*b*, the multiplexor 94 of FIG. 5 transfers the contents of the $K_1$ cell over line 82 by means of the AND gate 244 and the AND gate 240 to line 112 and transfers the contents of the $K_2$ cell over line 84 by means of AND gate 246 and AND gate 238 to line 114. Thus, the characters IW are loaded into the address register 116. Simultaneously in response to the third timing pulse issuing from multiplex timing 108 and the splitting signal on line 102*b*, the contents of the $L_1$ cell is transferred by means of multiplexor 96 of FIG. 6, over line 88 by means of AND gate 274 and AND gate 268 to line 120 thereby loading the character W into the address register 122. In response to the third timing pulse over line 110, the multiplexor 128 of FIG. 8 transfers this third probability from line 126 by means of AND gate 314 to the register 134. In response to the fourth timing pulse and the splitting error signal over line 102*b*, the multiplexor 94 transfers the contents of the $K_3$ cell (which is a blank) over line 86 by means of the AND gate 254 and the AND gate 242 to line 114. In response to the fourth timing pulse and splitting error signal over line 102*b* the multiplexor 96 transfers the contents of the $L_2$ cell (which is blank) by means of AND gate 284 and AND gate 272 to line 120. These blanks are loaded in the address register 116 and the address register 122. Then the conditional probability P(__|__) which equals 0.99 as is shown in Table IX, is accessed from the conditional probability storage matrix 124 and outputted on line 126 to the multiplexor 128. The multiplexor 128 in response to the fourth timing signal 110 transfers this fourth probability on line 126 by means of AND gates 316 and 320 to the register 136.

Probability products are now calculated and compared. The multiplier 138 multiplies the contents of the register 130 times the contents of register 132 obtains a product $1.3 \times 10^{-3}$. The multiplier 140 multiplies the contents of the register 134 times the contents of the register 136 and obtains the product $3.5 \times 10^{-3}$. The comparator 146 determines that the contents of the multiplier 140 is greater which indicates that the probability of the character W splitting into the characters I and W is greater than the probability of the simple substitution of the letter W into the letter W and the blank into the I.

The conditional probability contained in the larger product is passed on. Thus the comparator 146 activates line 160, thereby enabling gate 150 to transfer the contents P(IW|W) of the register 134 over lines 151 and 153 to line 156 and thus to the multiplier 58. Multiplier 58 multiplies the contents of the product register 56 (A) times conditional probability P(IW|W) transferred from the register 134 and obtains a new running product having a magnitude of $1.1 \times 10^{-9}$. The comparator 62 determines that the contents of the product register 56 (A) is larger than the contents of the highest product register 66 (B) which is $4.4 \times 10^{-13}$ and thus no word abort signal is output on line 78. Line 70 is activated.

A shift command is now issued. The comparator 146 having activated line 160 in conjunction with the splitting error signal on line 102*b* causes the AND gate 336 of the shift command 162, to be enabled thereby outputting a signal on line 80*c*. This commands the shift control 20 to differentially shift the OCR word shift register by two positions and the dictionary word shift register and the flag bit shift register 34 by one position respectively.

A new "best word" is recognized. Decrementing counter 220 of the shift control 20 shown in FIG. 4 indicates that the last letter of the dictionary word has been reached and therefore a signal is output on line 74 indicating the end of the word has been reached. This signal enables gate 72 which thereby enables gate 64 permitting the transfer of the contents of the product register (A) 56 to the highest product register (B) 66. Simultaneously, the gate 42 is activated thereby transferring the contents of the word register which is the word "Wreck" to the best word register 44.

The system has now determined a new best word "Wreck" which is stored in register 44 and which has a corresponding total conditional probability product $1.1 \times 10^{-9}$ which is stored in register 66. Since the shift control has determined that the end of the word has been reached, the OCR word "IWn*c" is now shifted back to its initial position so that the *c* occupies the $K_1$ cell. Simultaneously the dictionary store loads the next word "Freak" into the dictionary word shift register 26 and the corresponding flag bits into the flag bit shift register 34, as is shown in Table X, stage 1.

The comparison of the word "Freak" with the OCR word "IWn*c" will be briefly described to illustrate the operation of the apparatus of FIG. 3 for simple substitution. The flag bits for simple substitution, in this case no flag bit at all, is stored in cell 35 of the flag bit shift register 34. This indication of the simple substitution error causes the flag decoder 100 to issue simple substitution signal on line 102*a*. Simple substitution signal on line 102*a* sets a limit of one in the counter 294 of multiplexor 108 and thus only a single timing pulse is issued over the line 110. The multiplexor 94 in response to this first timing pulse, connects cell $K_1$ with line 114 loading the letter *c* into the address register 116. The counter 230 is then reset. Similarly, the multiplexor 96 connects the contents of the $L_1$ cell with line 120 thereby loading a *k* into the address register 122 and then the counter 260 is reset. In response to the first timing pulse on the line 110 the substitution signal on line 102*a*, the multiplexor 128 transfers the conditional probability $P(c|k)$ which equals $6.7 \times 10^{-3}$ as is shown in Table X, from line 126 via AND gates 304 and 308 to line 164 which connects with line 156 thereby directly inputting the probability to the multiplier 58, bypassing the registers 130–136. The calculation of the running product commences as previously described. The shift command 162, upo receipt of the substitution signal 102*a*, issues a signal on line 80*a* causing the shift control 20 to shift the OCR word shift register 14 and the dictionary word shift register and flag bit shift registers by a single cell. The comparison of the dictionary word "Freak" with the OCR word "IWn*c" continues as is shown in Table X and results in a total probability product of $1.5 \times 10^{-12}$. This total product when compared in the comparator 62 with the contents of the highest product register 66 which is $1.1 \times 10^{-9}$, causes a word abort signal to be output on line 78, stopping further processing of the dictionary word "Freak" and causing the resetting of the OCR word shift register 14 and the loading of the next word in the dictionary store 28 into the dictionary word shift register 26.

After all the words stored in the dictionary store 28 have been compared with the OCR word "IWn*c" the dictionary store 28 outputs on line 48 an end of dictionary list signal which enables gate 50 thereby connecting the contents of the best word register 44 with the output line 10. Since the dictionary word "Wreck" was stored as the best word in register 44, the system outputs the word "Wreck" as the best estimate of the word which was actually scanned by the OCR when it output the word "IWn*c".

The regional context maximum likelihood error correction apparatus shown in FIG. 3 can be applied to post-processing the phoneme-character recognition stream output from a speech analyzer. Speech analyzers, such as is disclosed in U.S. Pat. No. 3,646,576 to Griggs, analyze continuous human speech into component phoneme-character units. Researchers report that a problem in the recognition to continuous speech is the accurate segmentation of the speech signal into phoneme units. The subject regional context maximum likelihood error correction apparatus can be used to correct segmentation errors in the phoneme-character recognition stream output from a speech analyzer. In the system shown in FIG. 3, input line 2, is the phoneme-character output line from a speech analyzer, carrying the phoneme-character recognition stream. Dictionary store 28 contains a vocabulary of valid spoken word expressions, each comprised of its component phoneme-characters. The segmentation errors which occur in conventional speech analyzers are similar to the segmentation errors in optical character recognition machines discussed above, namely splitting, concatenation and crowding. The spoken word expressions stored in dictionary store 28 have selected phoneme-characters which are flagged for segmentation, concatenation or crowding misread propensity of the speech analyzer. The conditional probability storage matrix 124 contains the conditional probabilities for phoneme-character combinations which have the propensity for splitting, concatenation or crowding segmentation errors. The propensities are a characteristic of the speech analyzer. The operation of the regional context maximum likelihood error correction apparatus for post-processing the phoneme-character recognition stream from a speech analyzer, is similar to that discussed above for application of the apparatus to optical character recognition. The spoken word expression in the output recognition stream from the speech analyzer is input over line 2 and loaded into shift register 14. A dictionary spoken word is loaded into the dictionary word shift register 26 from the dictionary store 28. The phoneme-characters of the input word and the dictionary word are aligned on one end. When a splitting propensity, for example, is flagged for a phoneme-character, in the dictionary spoken word expression, conditional probability values are accessed from the conditional probability storage matrix 124. A calculation is then performed of the probability that the first phoneme-character of the dictionary word was split by the speech analyzer into the first and second phoneme-character of the spoken word expression in the output recognition stream. This regional context probability is compared with the probability of a simple substitution error for the phoneme-characters. If the probability of segmentation is larger, the phoneme-characters in shift register 14 are shifted one space with respect to the phoneme-characters in dictionary word shift register 26 so that subsequent phoneme-character pairs to be compared are properly matched. The greater calculated probability is combined in a running product in register 56. The spoken word expression in the dictionary storage 28 having the largest running product, is output by the system over line 52 as the most likely correct form of the garbled word input from the speech analyzer.

The regional context maximum likelihood error correction apparatus shown in FIG. 3 can be applied to postprocessing the character stream output from a keyboard. Keyboard data entry devices such as is disclosed in U.S. Pat. No. 3,490,004 to Ross, output alpha-numberic character streams in response to manual keyboard entries by a typist. Typewriter keyboard error characteristics have been extensively studied and quantified. Table XI shows a confusion matrix resulting from an examination of slightly over 1,000,000 key strokes. Examination of the events in Table XI shows that the error patterns on keyboard substitution misstroke errors nominally fall into three main categories:

1. Adjacent keys (key juxtaposition
2. Visually confusable characters (e.g., I; L; *m; n;* etc.)
3. Same finger position on other hand.

These error mechanisms underlie a stable time invariant process which can be meaningfully quantified in confusion matrix format. Character substitution due to misstroke is similar to simple substitution errors in OCR outputs, and appears to be the most common keyboard error type. Character transposition error relates to the reversal of the correct sequence of occurrence of two otherwise correct characters. The spelling "recieve" is an example of transposition error. The error mechanism which controls character addition and deletion on keyboard appears to be strongly correlated to the digram being typed. If the digram is normally part of a very common trigram, inadvertently the trigram may be typed resulting in the addition of the spurious character. For example, the typing of the digram *th* often results in spurious addition of *e* yielding *the* when only *th* was called for. Conversely, character deletion seems to be highly correlated to the typing of an infrequent trigram which contains a common digram. In transcription, the trigram may be aliased as its shorter, more common digram consistuent.

Conditional probabilities can be compiled for each of these keyboard error modes and stored in the conditional probability storage matrix 124. In this manner, the subject regional context maximum likelihood error correction apparatus can be used to correct character substitutions, transpositions, additions and omissions inadvertently typed and output from a keyboard. In the system shown in FIG. 3, input line 2, is the alpha-numeric character data output line from a keyboard, carrying the alpha-numeric character stream. Dictionary store 28 contains a vocabulary of valid keyboard words, each comprised of its component alpha-numeric characters. The character addition, omission, and transposition errors which occur in conventional keyboard outputs are similar to the segmentation errors in optical character recognition machines discussed above, namely splitting, concatenation and crowding, respectively. The keyboard words stored in dictionary store 28 have selected characters which are flagged for character substitution, transposition, addition or omission mistyping propensity of the typist and the keyboard. The conditional probability storage matrix 124 contains the conditional probabilities for character combinations which have the propensity for character substitution, transposition, addition and omission errors. The propensities are a characteristic of the keyboard and of the average prediction of humans to execute common typing errors. The operation of the regional context maximum likelihood error correction apparatus for post-processing the character output stream from a keyboard, is similar to that discussed above for application of the apparatus to optical character recognition. The keyboard word in the output recognition stream from the keyboard is input over line 2 and loaded into shift register 14. A dictionary keyboard word is loaded into the dictionary word shift register 26 from the dictionary store 28. The characters of the input word and the dictionary word are aligned on one end. When a character addition propensity, for example, is flagged for a character, in the dictionary keyboard word, conditional probability values are accessed from the conditional probability storage matrix 124. A calculation is then performed of the probability that the first character of the dictionary word was duplicated by the typist using the keyboard into the first and second characters of the keyboard word in the keyboard character output stream. This regional context probability is compared with the probability of a simple substitution error for the keyboard characters. If the probability of character addition is larger, the characters in shift register 14 are shifted one space with respect to the characters in dictionary word shift register 26 so that subsequent character pairs to be compared are properly matched. The greater calculated probability is combined in a running product in register 56. The valid keyboard word in the dictionary storage 28 having the largest running product, is output by the stream over line 52 as the most likely correct form of the mistyped word input from the keyboard.

It should be understood by those skilled in the art that the optical character recognition application of the disclosed regional context maximum likelihood error correction apparatus includes the correction of substitution and segmentation errors in reading numeric characters. In addition, words containing either mechanically printed or hand written characters can be processed by the disclosed system, depending upon the characteristics of the OCR. Reference to Table XII*a* and Table XII*b* will illustrate typical substitution confusion matrices for hand written and machine written numeric character data scanned by an OCR. The disclosed RCML system will perform post-processing on hand or machine written numeric characters utilizing confusion matrices such as these. In addition, segmentation error correction will be effected on numeric characters by appropriately flagging problem characters such as the 11 combination being read as a 4 or a 6 being read as a 1 and a 0.

While the invention has been particularly shown and described with reference to the preferred embodiments thereof, it will be understood by those skilled in the art that the foregoing and other changes in form and detail may be made therein without departing from the spirit and scope of the invention.

TABLE VIII

"Break"

(1) Simple Substitution

| | | | | | |
|---|---|---|---|---|---|
| OCR | I̲ | W̲ | n | * | C |
| DICT | B̲ | r | e | a | k |
| FLAG | | # | | | |

$P(c|k) = 6.7 \times 10^{-3}$ (2) Simple Substitution

| | | | | |
|---|---|---|---|---|
| OCR | I̲ | W̲ | n | * |
| DICT | B̲ | r | e | a |
| | | # | | |

$P(*|a) = 1.1 \times 10^{-2}$

Running Product = 7.3 ×]10$^{-5}$ (3) Crowding

| | | | |
|---|---|---|---|
| OCR | I̲ | W̲ | n |
| DICT | B̲ | r | e |
| | | # | |

| | | |
|---|---|---|
| $P(n|e)$ | $1.0 \times 10^{-3}$ | |
| $P(\underline{W}|r)$ | $2.0 \times 10^{-4}$ | $X = 2 \times 10^{-7}$ |
| $P(\underline{W}n|re)$ | $3 \times 10^{-5}$ | |

(4) Simple Substitution

| | |
|---|---|
| OCR | I̲ |
| DICT | B̲ |

$P(\underline{I}|\underline{B}) = 2.0 \times 10^{-4}$

Total Product = Running Product = $4.4 \times 10^{-13}$

TABLE IX

"Wreck"

(1) Concatenation

TABLE IX-continued

"Wreck"

| | | | | | |
|---|---|---|---|---|---|
| OCR | I̲ | W̲ | n | * | c |
| DICT | W̲ | r | e | c | k |
| FLAG | "!" | # | | | "?" |

| | |
|---|---|
| $P(c|k) = 6.7 \times 10^{-3}$ | |
| $P(*|c) = 2.4 \times 10^{-2}$ | $X = 1.6 \times 10^{-4}$ |
| $P(c|ck) = 1.9 \times 10^{-2}$ | |
| $P(*|e) = 2.8 \times 10^{-2}$ | $X = 5.3 \times 10^{-4}$ |
| | Running Point = $5.3 \times 10^{-4}$ |

(2) Crowding

| | | | | |
|---|---|---|---|---|
| OCR | I | W̲ | n | * |
| DICT | | W̲ | r | e |
| | | "?" | # | |

| | |
|---|---|
| $P(*|e) = 2.8 \times 10^{-2}$ | |
| $P(n|r) = 5.9 \times 10^{-3}$ | $X = 1.6 \times 10^{-4}$ |
| $P(n*|re) = 5.6 \times 10^{-4}$ | |
| | Running Point = $3.0 \times 10^{-7}$ |

(3) Splitting

| | | |
|---|---|---|
| OCR | I | W̲ |
| DICT | | W̲ |
| | | "?" |

| | |
|---|---|
| $P(\underline{W}|\underline{W}) = .90$ | |
| $P(\underline{I}|) = .15 \times 10^{-3}$ | $X = 1.3 \times 10^{-3}$ |
| $P(\underline{IW}|\underline{W}) = 3.5 \times 10^{-3}$ | |
| $P(|) = 0.00$ | $X = 3.5 \times 10^{-3}$ |
| | Total Product = Running Product = $1.1 \times 10^{-9}$ |

TABLE X

"Freak"

(1) Simple Substitution

| | | | | | |
|---|---|---|---|---|---|
| OCR | I̲ | W̲ | n | * | C |
| DICT | F̲ | r | e | a | k |
| | | # | | | |

$P(c|k) = 6.7 \times 10^{-3}$ (2) Simple Substitution

| | | | | |
|---|---|---|---|---|
| OCR | I̲ | W̲ | n | * |
| DICT | F̲ | r | e | a |
| | | # | | |

$P(*|a) = 1.1 \times 10^{-2}$

Running Product = $7.3 \times 10^{-5}$ (3) Crowding

| | | | |
|---|---|---|---|
| OCR | I̲ | W̲ | n |
| DICT | F̲ | r | e |
| | | # | |

| | |
|---|---|
| $P(n|e) = 1.0 \times 10^{-3}$ | |
| $P(\underline{W}|r) = 2.0 \times 10^{-4}$ | $X = 2 \times 10^{-7}$ |
| $P(\underline{W}n|re) = 3 \times 10^{-5}$ | |
| | Running Product = $2.2 \times 10^{-9}$ |

(4) Simple Substitution

| | |
|---|---|
| OCR | I̲ |
| DICT | F̲ |

$P(\underline{I}|\underline{F}) = 7.0 \times 10^{-4}$

Total Product = Running Product = $1.5 \times 10^{-12}$

TABLE XI

Keyboard Confusion Matrix
SUBSTITUTED KEY

| INTENDED KEY | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| A | | | 4 | | | | | | | | | | | | 3 | | 2 | | 2 | | | | | 2 | 2 | |
| B | | | 1 | | | 2 | 3 | | | | | | | | | 1 | | | | | | | | | | |
| C | | | | 4 | | | | | 1 | | | | | | | | | | | 2 | | | 1 | | | 1 |
| D | | | 2 | | | 2 | 1 | 1 | | | 1 | 2 | | | | 2 | | | 3 | 7 | | | 1 | 1 | | |
| E | 2 | | | | | | | 2 | 4 | 6 | | | | | | 1 | | | 5 | 6 | | | | 6 | 1 | |
| F | | 2 | | | 2 | 1 | | 1 | | | | | | | | | | | 2 | | | | | | | |
| G | | 2 | | | 1 | | 1 | | | | | | | | | | | 1 | | 2 | | | | | | |
| H | | 1 | | | | | | | | | 1 | | 1 | | | | | | | | 4 | | | | | |
| I | | | | | | | | 1 | | | | | 2 | | | 6 | 1 | | | | | 3 | | | | |
| J | | | | | | | | | | | | | | | | | | | | | | | | | | |
| K | | | 3 | | | | | 1 | | | | | 2 | | | | | | | | | | | | | |
| L | | | | | 1 | | | | | 1 | | | | | | 2 | | | | | | | | | | |
| M | 1 | 4 | | | 1 | | | | | | | | | | 7 | 3 | | | 1 | | 1 | 1 | | | | |
| N | | 4 | | | 1 | | 1 | 2 | | | | | | 1 | | | | | 2 | | | | | | | |
| O | 1 | | | | | 3 | | | 2 | 5 | | | 3 | | | | 4 | | 1 | | | | 1 | | | |
| P | | | | | | | | | | | | | | | | | | | | 2 | | | | | | |
| Q | | | | | | | | 4 | | | | | | | | | | | | | | | | | | |

TABLE XI-continued

Keyboard Confusion Matrix
SUBSTITUTED KEY

| | | | | | | | | | | | | | | | | | | | | | | | | | | |
|---|---|---|---|---|---|---|---|---|---|---|---|---|---|---|---|---|---|---|---|---|---|---|---|---|---|---|
| R | 1 | | 2 | | | 1 | 5 | 1 | | | 1 | | | | | | | | | 2 | 4 | | | | | |
| S | 2 | | 2 | | | 4 | 1 | | 2 | | 1 | | | 1 | 1 | | | | | | 1 | | | 5 | 1 | |
| T | | 2 | | | | | 1 | 3 | | | | 1 | | | | | | | 6 | 1 | | | | | | |
| U | | | | | | 2 | 1 | | | 5 | | | | | | | | | 1 | 1 | | | | | | 1 |
| V | 3 | | 1 | | | | | | | | | | | | | | | | | | | | | | | |
| W | | | | | | 4 | | | 1 | | | | | | | | | | | | 2 | | | | | |
| X | | | | | | | | | | | | | | | | | | | | | | | | | | |
| Y | | | | | | 1 | | | 6 | 1 | | | | 1 | | | | | | | 2 | | | 1 | | |
| Z | | | | | | | | | | | | | | | | | | | | | | | | | | |
| — | | | | | | | | | | | | | | | | | | | | | | | | | | |
| , | | | | | | | | | | | | | 1 | 1 | | | | | | | | | | | | |
| . | | | | | | | | | | | | | | | | | | | | | | | | | | |
| + | | | | | | | | | | | | | | | | | | | | | | | | 2 | | |

| INTENDED KEY | | — | , | . | + | ; | ( | TOTAL |
|---|---|---|---|---|---|---|---|---|
| | A | | | | | | | 17 |
| | B | | | | | | | 7 |
| | C | | | | | | | 9 |
| | D | | | | | | | 23 |
| | E | | | | | | | 33 |
| | F | | | | | | | 8 |
| | G | | | | | | | 6 |
| | H | | | | | | | 7 |
| | I | | | | | | | 13 |
| | J | | | | | | | 0 |
| | K | | | | | | | 6 |
| | L | | | | | | | 4 |
| | M | | | 1 | | | | 20 |
| | N | | | 2 | | | | 13 |
| | O | | | | 1 | | | 21 |
| | P | | | | | | | 2 |
| | Q | | | | 1 | | | 5 |
| | R | | 1 | | | | 1 | 19 |
| | S | | | | | | | 21 |
| | T | | | | | | | 14 |
| | U | | | | | | | 11 |
| | V | | | | | | | 4 |
| | W | | 2 | | | | 1 | 10 |
| | X | | | | | | | 0 |
| | Y | | 1 | | | | 1 | 14 |
| | Z | | | | | | | 0 |
| | — | | | | | | | 0 |
| | , | | 13 | | | | | 13 |
| | . | 5 | | | | | | 7 |
| | + | | 2 | | | | | 4 |

TABLE XII(a)

Numeric Machine Print Substitution Matrix

| ID | LOGIC 0 | SUBSTITUTIONS 1 | 2 | 3 | 4 | 5 | 6 | 7 | 8 | 9 | * | TOTALS | P/C |
|---|---|---|---|---|---|---|---|---|---|---|---|---|---|
| 0 | 0 | 41 | 13 | 5 | 8 | 6 | 11 | 17 | 7 | 14 | 23 | 145 | 1.95 |
| 1 | 16 | 0 | 5 | 4 | 1 | 3 | 4 | 5 | 2 | 1 | 22 | 63 | 2.33 |
| 2 | 13 | 9 | 0 | 5 | 1 | 6 | 3 | 16 | 6 | 3 | 32 | 94 | 3.79 |
| 3 | 14 | 9 | 2 | 0 | 1 | 5 | 2 | 3 | 4 | 1 | 14 | 55 | 3.02 |
| 4 | 12 | 23 | 2 | 3 | 0 | 4 | 3 | 4 | 3 | 6 | 25 | 85 | 4.99 |
| 5 | 16 | 11 | 10 | 1 | 5 | 0 | 5 | 3 | 6 | 5 | 23 | 85 | 3.39 |
| 6 | 19 | 17 | 4 | 1 | 6 | 2 | 0 | 1 | 3 | 3 | 26 | 82 | 4.72 |
| 7 | 5 | 8 | 8 | 0 | 3 | 0 | 3 | 0 | 0 | 5 | 21 | 53 | 3.20 |
| 8 | 10 | 4 | 2 | 3 | 0 | 2 | 1 | 0 | 0 | 5 | 15 | 42 | 2.58 |
| 9 | 27 | 6 | 2 | 1 | 3 | 1 | 1 | 6 | 6 | 0 | 22 | 75 | 4.69 |
| A | 2 | 9 | 5 | 6 | 1 | 6 | 2 | 9 | 3 | 7 | 0 | 50 | 1.04 |
| TOT | 134 | 137 | 53 | 29 | 29 | 35 | 35 | 64 | 40 | 50 | 223 | 829 | 2.76 |
| P/C | 0.59 | 0.50 | 0.19 | 0.10 | 0.10 | 0.12 | 0.12 | 0.22 | 0.14 | 0.17 | 0.88 | | |

PERFORMANCE — CHARACTER

| ID | PATTERNS | P/C | ACCEPTS | P/C | REJECTS(T) | P/C | REJECTS(D) | P/C | SUB-INS | P/C |
|---|---|---|---|---|---|---|---|---|---|---|
| 0 | 7414 | 24.71 | 6932 | 93.49 | 337 | 4.54 | 0 | 0.00 | 134 | |
| 1 | 2695 | 8.98 | 2431 | 90.20 | 201 | 7.45 | 0 | 0.00 | 137 | |
| 2 | 2480 | 8.26 | 2145 | 86.49 | 241 | 9.71 | 0 | 0.00 | 53 | |
| 3 | 1816 | 6.05 | 1686 | 92.84 | 75 | 4.12 | 0 | 0.00 | 29 | |
| 4 | 1702 | 5.67 | 1414 | 83.07 | 203 | 11.92 | 0 | 0.00 | 29 | |
| 5 | 2501 | 8.33 | 2230 | 89.16 | 186 | 7.43 | 0 | 0.00 | 35 | |
| 6 | 1737 | 5.79 | 1477 | 85.03 | 178 | 10.24 | 0 | 0.00 | 35 | |
| 7 | 1653 | 5.51 | 1523 | 92.13 | 77 | 4.65 | 0 | 0.00 | 64 | |
| 8 | 1622 | 5.40 | 1496 | 92.23 | 84 | 5.17 | 0 | 0.00 | 40 | |
| 9 | 1598 | 5.32 | 1441 | 90.17 | 82 | 5.13 | 0 | 0.00 | 50 | |
| * | 4782 | 15.94 | 4622 | 96.65 | 110 | 2.30 | 0 | 0.00 | 223 | |
| TOTAL | 30000 | 100.00 | 27397 | 91.32 | 1774 | 5.91 | 0 | 0.00 | 829 | 2.76 |

PERFORMANCE — DOCUMENT

-continued

| TOTAL | P/C | ACCEPTS | P/C | REJECTS | P/C | HOZ | P/C | SUBS | P/C |
|---|---|---|---|---|---|---|---|---|---|
| 5861 | 100.00 | 4451 | 75.94 | 1256 | 21.42 | 0 | 0.00 | 154 | 2.62 |

MAIN VARIABLES

| | | |
|---|---|---|
| THETA= 300 | DELTA= 0 | MEASUREMENTS=258 (INCLUDING 319) |

TABLE XII(b)

Numeric Handprint Substitution Matrix
SUBSTITUTIONS

| ID | 0 | 1 | 2 | 3 | 4 | 5 | 6 | 7 | 8 | 9 | TOTALS | P/C |
|---|---|---|---|---|---|---|---|---|---|---|---|---|
| 0 | 0 | 7 | 7 | 1 | 11 | 16 | 6 | 4 | 3 | 8 | 63 | 0.70 |
| 1 | 26 | 0 | 15 | 3 | 10 | 1 | 6 | 9 | 0 | 0 | 70 | 1.82 |
| 2 | 41 | 7 | 0 | 13 | 6 | 9 | 1 | 32 | 5 | 3 | 117 | 4.44 |
| 3 | 7 | 0 | 23 | 0 | 1 | 19 | 0 | 3 | 1 | 0 | 54 | 2.58 |
| 4 | 19 | 9 | 1 | 0 | 0 | 7 | 2 | 4 | 2 | 6 | 50 | 2.42 |
| 5 | 23 | 2 | 8 | 6 | 5 | 0 | 3 | 1 | 2 | 1 | 51 | 1.60 |
| 6 | 39 | 67 | 2 | 0 | 8 | 14 | 0 | 4 | 0 | 0 | 134 | 6.90 |
| 7 | 11 | 16 | 17 | 3 | 2 | 6 | 0 | 0 | 2 | 1 | 58 | 3.04 |
| 8 | 36 | 4 | 9 | 6 | 9 | 24 | 2 | 1 | 0 | 6 | 97 | 5.89 |
| 9 | 12 | 5 | 2 | 1 | 7 | 5 | 0 | 8 | 3 | 0 | 43 | 2.71 |
| TOT | 214 | 117 | 84 | 33 | 59 | 101 | 20 | 66 | 18 | 25 | 737 | 2.47 |
| P/C | 1.02 | 0.45 | 0.30 | 0.11 | 0.21 | 0.37 | 0.07 | 0.23 | 0.06 | 0.08 | | |

PERFORMANCE — CHARACTER

| ID | PATTERNS | P/C | ACCEPTS | P/C | REJECTS(T) | P/C | REJECTS(D) | P/C | SUB-INS | P/C |
|---|---|---|---|---|---|---|---|---|---|---|
| 0 | 8900 | 29.89 | 8580 | 96.40 | 257 | 2.88 | 0 | 0.00 | 214 | |
| 1 | 3842 | 12.90 | 3472 | 90.36 | 300 | 7.80 | 0 | 0.00 | 117 | |
| 2 | 2631 | 8.83 | 2227 | 84.64 | 287 | 10.90 | 0 | 0.00 | 84 | |
| 3 | 2088 | 7.01 | 1897 | 90.85 | 137 | 6.56 | 0 | 0.00 | 33 | |
| 4 | 2061 | 6.92 | 1880 | 91.21 | 131 | 6.35 | 0 | 0.00 | 59 | |
| 5 | 3170 | 10.64 | 2874 | 93.81 | 145 | 4.57 | 0 | 0.00 | 101 | |
| 6 | 1941 | 6.52 | 1600 | 82.43 | 207 | 10.66 | 0 | 0.00 | 20 | |
| 7 | 1905 | 6.39 | 1695 | 88.97 | 152 | 7.97 | 0 | 0.00 | 66 | |
| 8 | 1646 | 5.52 | 1342 | 81.53 | 207 | 12.57 | 0 | 0.00 | 18 | |
| 9 | 1582 | 5.31 | 1397 | 88.30 | 142 | 8.97 | 0 | 0.00 | 25 | |
| TOTAL | 29766 | 100.00 | 27064 | 90.92 | 1965 | 6.60 | 0 | 0.00 | 737 | 2.47 |

PERFORMANCE — DOCUMENTS

| TOTAL | P/C | ACCEPTS | P/C | REJECTS | P/C | HOZ | P/C | SUBS | P/C |
|---|---|---|---|---|---|---|---|---|---|
| 7875 | 100.00 | 5741 | 72.90 | 1706 | 21.66 | 17 | 0.21 | 428 | 5.43 |

MAIN VARIABLES

| | | |
|---|---|---|
| THETA= 300 | DELTA= 0 | MEASUREMENTS=293 (INCLUDING 319) |

We claim:

1. A data processing system for selecting the correct form of an input error word garbled by an OCR splitting error, the correct form of the error word being a member of a predetermined class of reference words, each comprising a plurality of characters, comprising:

a storage means for storing said predetermined class of reference words, selected characters composing the reference words having stored in said storage means an error propensity indicium for indicating the propensity of the character to being misread through a splitting error, said storage means storing a first type conditional probability that a first character can be output by said OCR through character substitution, given that a second character was actually scanned, and a second type conditional probability that a pair of adjacent characters can be output by said OCR through character splitting, given that a third character was actually scanned;

a first register means connected to an input line for storing the characters of said error word arranged in the sequence of receipt from said OCR, with a first character at a given end of said error word defining a first position for an error word origin;

a second register means connected to said storage means for storing the characters of a first reference word from said predetermined class in said storage means, arranged in a sequence to correspond with said sequence of characters in said first register means, with a first character in said reference word corresponding to said first character in said error word, defining a first position for a reference word origin;

decoding means connected to said second register for decoding the error propensity indicium corresponding to the character located at said reference word origin in said reference word;

accessing means connected to said storage means for accessing from said storage means, when said decoded indicium indicates a character splitting propensity, a first one of said first type conditional probability that given the character located at said reference word origin in said reference word was scanned, that the OCR substituted the character located at said error word origin in said error word;

said accessing means accessing from said storage means when said decoded indicium indicates a error splitting propensity, a second one of said first type conditional probability that given the character next to the character at said reference word origin in said reference word was scanned, that the OCR substituted the character next to the character located at said error word origin in said error word;

multiplying means connected to said storage means for multiplying said first one and said second one of said first conditional probabilities, as a first product;

said accessing means accessing from said storage means when said decoded indicium indicates a character splitting propensity, a first one of said second type conditional probability that given the character located at said reference word origin in said reference word was scanned, that the OCR split it into the character located at said error word origin and the character next to the character located at said error word origin in said error word;

said accessing means accessing from said storage means when said decoded indicium indicates a character splitting propensity, a third one of said first type conditional probabilities that given the character next to the character located at said reference word origin in said reference word was scanned, that the OCR substituted the second next character to the character located at said error word origin in said error word;

said multiplying means multiplying said first one of said second type probability and said third one of said first type conditional probability as a second product;

comparison means connected to said multiplying means for comparing the relative magnitudes of said first and said second product;

a running product calculating means connected to said storage means for multiplying a running product times said first one of said first type conditional probabilities if said first product is greater than said second product or said first one of said second type conditional probabilities if said second product is greater than said first product;

a shifting means connected to said comparison means for shifting the location of both said error word origin and said reference word origin by one character position when said first probability product is greater than said second probability product;

said shifting means shifting said error word origin by two character positions and shifting said reference word origin by one character position when said second probability product is greater than said first probability product;

whereby the reference word stored in said storage means having the highest conditional probability of having been misread as the error word stored in said first register, can be determined.

2. The data processing system of claim 1, which further comprises:

said error propensity indicia being stored in said storage means in association with said selected characters composing said reference words.

3. The data processing system of claim 1, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

4. A data processing system for selecting the correct form of an input error word garbled by an OCR concatenation error, the correct form of the error word being a member of the predetermined class of reference words, each comprising a plurality of characters, comprising:

a storage means for storing said predetermined class of reference words in a storage means, selected characters composing the words in said class having stored in said storage means an error propensity indicium for indicating the propensity of the character to be misread through a concatenation error;

said storage means storing a first type conditional probability that a first character can be output by said OCR through character substitution, given that a second character was actually scanned, and a second type conditional probability that a first character can be output by said OCR through character concatenation, given that a pair of adjacent characters were actually scanned;

a first register means connected to an input line for storing the characters of said error word in a first register, arranged in a sequence of receipt from said OCR, with a first character at a given end of said error word defining a first position for an error word origin;

a second register means connected to said storage means for storing the characters of a first reference word from said predetermined class in said storage means, arranged in a sequence to correspond with said sequence of characters in said first register means, with a first character in said reference word corresponding to said first character in said error word, defining a first position for a reference word origin;

decoding means connected to said second register for decoding the error propensity indicium corresponding to the character located at said reference word origin in said first reference word;

accessing means connected to said storage means for accessing from said storage means when said decoded indicium indicates a character concatenation propensity, a first one of said first type conditional probability that given the character located at said first reference word origin of said reference word was scanned, that the OCR substituted the character located at said error word origin in said error word;

said accessing means accessing from said storage means when said decoded indicium indicates a character concatenation propensity, a second one of said first type conditional probability that given the character next to the character located at said reference word origin in said reference word was scanned, that the OCR substituted the character next to the character located at said error word origin in said error word;

multiplying means connected to said storage means for multiplying said first one and said second one of said first type conditional probabilities as a first product;

said accessing means accessing from said storage means when said decoded indicium indicates a character concatenation propensity, a first one of said second type conditional probability that given the character located at said reference word origin and the character next to the character located at said reference word origin in said reference word were scanned, that the OCR concatenated them into the character located at said error word origin in said error word;

said accessing means accessing from said storage means when said decoded indicium indicates a character concatenation propensity, a third one of said first type conditional probabilities that given the character second next to the character located at said reference word origin and said reference word was scanned, that the OCR substituted the character next to the character located at said error word origin in said error word;

said multiplying means multiplying said first one of said second type conditional probability and said third one of said first type conditional probability as a second product;

comparison means connected to said multiplying means for comparing the relative magnitude of said first and said second product;

a running product calculating means connected to said storage means for multiplying a running product times said first one of said first type conditional probabilities if said first product is greater than said second product or said first one of said second type conditional probabilities if said second product is greater than said first product;

a shifting means connected to said comparison means for shifting said error word origin and said reference word origin by one character position when said first probability product is greater than said second probability product;

said shifting means shifting the error word origin by one character position and the reference word origin by two character positions when said second probability product is greater than said first probability product;

whereby the reference word having the greatest total conditional probability that the error word was output by the OCR given that the reference word was scanned, can be determined.

5. The data processing system of claim 4, which further comprises:

said error propensity indicia being stored in said storage means in association with said selected characters composing said reference words.

6. The data processing system of claim 4, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

7. A data processing system for selecting the correct form of an input error word garbled by an OCR crowding error, the correct form of the error word being a member of a predetermined class of reference words, each comprising a plurality of characters, comprising:

a storage means for storing said predetermined class of reference words in a storage means, selected characters composing the reference word having stored in said storage means an error propensity indicium for indicating the propensity of the character to being misread through a crowding error;

said storage means storing a first type conditional probability that a first character can be output by said OCR through character substitution, given that a second character was actually scanned, and a second type conditional probability that a first pair of adjacent characters can be output by said OCR through character crowding, given that a second pair of adjacent characters was actually scanned;

a first register means connected to an input line for storing the characters of said error word arranged in the sequence of receipt from said OCR, with a first character at a given end of said error word defining a first position for an error word origin;

a second register means connected to said storage means for storing the characters and error propensity indicium of a first reference word from said predetermined class in said storage means, arranged in a sequence to correspond to said sequence of characters in said first register means, with a first character in said reference word corresponding to said first character in said error word, defining a first position for a reference word origin;

decoding means connected to said second register for decoding the error propensity indicium corresponding to the character stored at said reference word origin in said reference word;

accessing means connected to said storage means for accessing from said storage means when said decoded indicium indicates a character pair crowding propensity, a first one of said first type conditional probability than given the character located at said reference word origin in said refernce word was scanned, that the OCR substituted the character located at said error word origin in said error word;

said accessing means accessing from said storage means when said decoded indicium indicates a character pair crowding propensity, a second one of said first type conditional probability that given the character next to the character at said reference word origin and said reference word was scanned, that the OCR substituted the character next to the character located at said error word origin in said error word;

multiplying means connected to said storage means for multiplying said first one and said second one of said first type conditional probabilities as a first product;

said accessing means accessing from said storage means when said decoded indicium indicates a character pair crowding propensity, a first one of said second type conditional probability that the character located at said reference word origin and the character located next to the character located at said reference word origin in said reference word was scanned, that the OCR executed a crowding error and output the character located at said error word origin and the character next to the character located at said error word origin in said error word;

comparison means connected to said multiplying means for comparing the relative magnitudes of said first product and said second type conditional probability accessed from said storage means;

a running product calculating means connected to said storage means, for multiplying a running product times said first one of said first type conditional probabilities if said first product is greater than said second type conditional probability accessed or said first one of said second type conditional probability if said second type conditional probability is greater than said first product;

a shifting means connected to said comparison means for shifting the location of both said error word origin and said reference word origin by one character position when said first probability product is greater than said second type conditional probability;

a shifting means shifting both said error word origin and said reference word origin by two character positions when said second type conditional probability is greater than said first probability product;

whereby the reference word stored in said storage means having the highest conditional probability of having been misread as the error word stored in said first register, can be determined.

8. The data processing system of claim 7, which further comprises:

said error propensity indicia being stored in said storage means in association with said selected characters composing said reference words.

9. The data processing system of claim 7, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

10. An information processing system for selecting the correct form of a garbled input word misread by an optical character reader so as to incorrectly segment the characters in the word, the correct form of the input word being a member of a predetermined class of words, each comprising a plurality of characters, comprising:

a first shift register having an input connected to the output of said optical character reader, for storing the characters of said input OCR word in an arrangement ordered in the sequence in which the characters are received, said first shift register having three adjacent storage cells $K_1$, $K_2$, and $K_3$, with the end character of the input word initially stored in cell $K_1$;

a first bulk storage means for storing said predetermined class of words as a dictionary, selected characters composing selected ones of said dictionary words having stored in association therewith an error propensity indicium for indicating the propensity of the character to being misread by said OCR through character splitting error mode;

a second shift register having an input connected to the output of said first storage means, for storing characters of a dictionary word input from said first storage means, in an arrangement ordered in the sequence in which the characters are received, said second shift register having three adjacent storage cells $L_1$, $L_2$, and $L_3$, with the end character of the dictionary word initially stored in cell $L_1$;

said first storage means sequentially loading words from said predetermined class of dictionary words, into said second register;

a switching means having a first input connected to the output of cells $K_1$, $K_2$, and $K_3$ of said first shift register, for selectively switching OCR word characters stored therein to the output of said switching means, a second input connected to the output of cells $L_1$, $L_2$, and $L_3$ of said second shift register, for selectively switching the dictionary word characters stored therein to the output of said switching means, and a third control input connected to said second shift register for controlling said selective switching of said OCR word characters and said dictionary word characters by means of the error indicium associated with the dictionary word characters stored in cell $L_1$;

a second bulk storage means with an input connected to the output of said switching means, for storing a first type conditional probability $P(K_n|L_m)$ that the OCR word character stored in cell $K_n$ of said first shift register was misread by character substitution given that the dictionary word character stored in cell $L_m$ of said second shift register was actually scanned, for $n=1$, $m=1$, $n=2$, $m=2$, and for $n=3$, $m=2$ and a second type conditional probability $P(K_1 K_2|L_1)$ that the OCR word characters stored in cells $K_1$ and $K_2$ of said first shift register were misread by character splitting, given that the dictionary word character stored in cell $L_1$ of said second shift register was actually scanned, said probabilities being accessed by said component OCR word characters and dictionary word characters which are selectively switched to the output of said switching means under the control of said error indicium associated with the dictionary word character stored in cell $L_1$ of said second shift register;

a first multiplier means having an input connected to the output of said second storage means, for multiplying a first received conditional probability by a second received conditional probability accessed from said second storage means and outputting a first probability product, and for multiplying a third received conditional probability by a fourth received conditional probability accessed from said second storage means and outputting a second probability product;

said switching means operating when the error indicium stored in the $L_1$ cell of said second shift register indicates a propensity to character splitting for the characters stored in the $L_1$ cell, to access the first type conditional probability $P(K_1|L_1)$ and $P(K_2|L_2)$ from said second storage means for transmission to said first multiplier means as said first received conditional probabilities, for calculation of said first probability product, and to access the second type conditional probability $P(K_1|L_1)$ and the first type conditional probability $P(K_3|L_2)$ from said second storage means for transmission to said first multiplier means as said third received and said fourth received conditional probabilities for the calculation of said second probability product;

a first comparator having an input connected to said first multiplier means for comparing the magnitude of said first probability product with that for said second probability product;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said second storage means and a second control input connected to said first comparator, for accepting said first received conditional probability if said first product is larger or said third received conditional probability if said second product is larger as determined by said first comparator, and multiplying by the running product of all of said conditional probabilities calculated for the dictionary word presently stored in said second shift register;

said shift control means shifting the contents of both said first and said second shift registers by one cell when said first probability product is greater than said second probability product;

said shift control means shifting the contents of said first shift register by two cells and the contents of said second shift register by one cell when said second probability product is greater than said first probability product and the error indicium associated with the character in the $L_1$ cell of said second shift register indicates a character splitting propensity;

a second comparator means having an input connected to said second multiplier means and an output connected to said first storage means, for selecting the dictionary word stored in said first storage means having the largest running product when matched with the OCR word stored in said first shift register;

said first storage means outputting on an output line said dictionary word indicated by said second comparator means, as the most likely correct form for said garbled input OCR word.

11. An information processing system for selecting the correct form of a garbled input word misread by an optical character reader so as to incorrectly segment the characters in the word, the correct form of the input word being a member of a predetermined class of words, each comprising a plurality of characters, comprising:

a first shift register having an input connected to the output of said optical character reader, for storing the characters of said input OCR word in an arrangment ordered in the sequence in which the characters are received, said first shift register having three adjacent storage cells $K_1$, $K_2$ and $K_3$, with the end character of the input word initially stored in cell $K_1$;

a first bulk storage means for storing said predetermined class of words as a dictionary, selected characters composing selected ones of said dictionary words having stored in association therewith an error propensity indicium for indicating the propensity of the character to being misread by said OCR through a character pair concatenation error mode;

a second shift register having an input connected to the output of said first storage means, for storing characters of a dictionary word input from said first storage means, in an arrangement ordered in the sequence in which the characters are received, said second shift register having three adjacent storage cells $L_1$, $L_2$, and $L_3$, with the end character of the dictionary word initially stored in cell $L_1$;

said first storage means sequentially loading words from said predetermined class of dictionary words, into said second register;

a switching means having a first input connected to the output of cells $K_1$, $K_2$ and $K_3$ of said first shift register, for selectively switching OCR word characters stored therein to the output of said switching means, a second input connected to the output of cells $L_1$, $L_2$, and $L_3$ of said second shift register, for selectively switching the dictionary word characters stored therein to the output of said switching means, and a third control input connected to said second shift register for controlling said selective switching of said OCR word characters and said dictionary word characters by means of the error indicium associated with the dictionary word characters stored in cells $L_1$ and $L_2$;

a second bulk storage means with an input connected to the output of said switching means, for storing a first type conditional probability $P(K_n|L_m)$ that the OCR word character stored in cell $K_n$ of said first shift register was misread by character substitution given that the dictionary word character stored in cell $L_m$ of said second shift register was actually scanned, for $n=1$, $m=1$, $n=2$, $m=2$, and for $n=2$, $m=3$, and a second type of conditional probability $P(K_1|L_1L_2)$ that the OCR word character stored in cell $K_1$ of said first shift register was misread by character concatenation, given that the dictionary word characters stored in cells $L_1$ and $L_2$ of said second shift register was actually scanned, said probabilities being accessed by said component OCR word characters and dictionary word characters which are selectively switched to the output of said switching means under the control of said error indicium associated with the dictionary word characters stored in cells $L_1$ and $L_2$ of said second shift register;

a first multiplier means having an input connected to the output of said second storage means, for multiplying a first received conditional probability by a second received conditional probability accessed from said second storage means and outputting a first probability product, and for multiplying a third received conditional probability by a fourth received conditional probability accessed from said second storage means and outputting a second probability product;

said switching means operating when the error indicium stored in the $L_1$ cell of said second shift register indicates a propensity to character concatenation for the characters stored in the $L_1$ and $L_2$ cells, to access the first type conditional probabilities $P(K_1|L_1)$ and $P(K_2|L_2)$ from said second storage means for transmission to said first multiplier means as said first received and said second received conditional probabilities for calculating said first probability product, and to access the second type conditional probability $P(K_1|L_1L_2)$ and the first type conditional probability $P(K_2|L_3)$ from said second storage means for transmission to said first multiplier means as said third received and fourth received conditional probability for the calculation of said second probability product;

a first comparator having an input connected to said first multiplier means for comparing the magnitude of said first probability product with that for said second probability product;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

A second multiplier means having an input connected to said second storage means and a second control input connected to said first comparator, for accepting said first received conditional probability if said first product is larger or said third received conditional probability if said second product is larger as determined by said first comparator, and multiplying by the running product of all of said conditional probabilities calculated for the dictionary word presently stored in said second shift register;

said shift control means shifting the contents of both said first and said second shift registers by one cell when said first probability product is greater than said second probability product;

said shift control means shifting the contents of said second shift register by two cells and the contents of said first shift register by one cell when said second probability is greater than said first probability product and the error indicium associated with characters in the $L_1$ and $L_2$ cells of said second shift register indicates a character concatenation propensity;

a second comparator means having an input connected to said second multiplier means and an output connected to said first storage means, for selecting the dictionary word stored in said first storage means having the largest running product when matched with the OCR word stored in said first shift register;

said first storage means outputting on an output line said dictionary word indicated by said second comparator means, as the most likely correct form for said garbled input OCR word.

12. An information processing system for selecting the corect form of a garbled input word misread by an optical character reader so as to incorrectly segment the characters in the word, the correct from of the input word being a member of a predetermined class of words, each comprising a plurality of characters, comprising:

a first shift register having an input connected to the output of said optical character reader, for storing the characters of said input OCR word in an arrangement ordered in the sequence in which the characters are received, said first shift register having three adjacent storage cells $K_1$, $K_2$ and $K_3$, with the end character of the input word initially stored in cell $K_1$;

a first bulk storage means for storing said predetermined class of words as a dictionary, selected characters composing selected ones of said dictionary words having stored in association therewith an error propensity indicium for indicating the propensity of the character to being misread by said OCR through a character pair crowding error mode;

a second shift register having an input connected to the output of said first storage means, for storing characters of a dictionary word input from said first storge means, in an arrangement ordered in the sequence in which the characters are received, said second shift register having three adjacent storage cells $L_1$, $L_2$, and $L_3$, with the end character of the dictionary word initially stored in cell $L_1$;

said first storage means initiating the sequential loading of words from said predetermined class of dictionary words, into said second register, upon receipt of a signal over said reset control input indicating the receipt of a new OCR word from said OCR output;

a switching means having a first input connected to the output of cells $K_1$, $K_2$ and $K_3$ of said first shift register, for selectively switching OCR word characters stored therein to the output of said switching means, a second input connected to the output of cells $L_1$, $L_2$ and $L_3$ of said second shift register, for selectively switching the dictionary word characters stored therein to the output of said switching means, and a third control input connected to said second shift register for controlling said selective switching of said OCR word characters and said dictionary word characters by means of the error indicium associated with the dictionary word characters stored in cell $L_1$;

a second bulk storage means with an input connected to the output of said switching means, for storing a first type conditional probability $P(K_n|L_m)$ that the OCR word character stored in cell $K_n$ of said first shift register was misread by character substitution given that the dictionary word character stored in cell $L_m$ of said second shift register was actually scanned, for $n=1$, $m=1$ and $n=2$, $m=2$, and a second type conditional probability $P(K_1\ K_2|L_1L_2)$ that the OCR word characters stored in cells $K_1$ and $K_2$ of said first shift register were misread by character crowding, given that the dictionary word characters stored in cell $L_1$ and $L_2$ of said second shift register were actually scanned, said probabilities being accessed by said component OCR word characters and dictionary word characters which are selectively switched to the output of said switching means under the control of said error indicium associated with the dictionary word characters stored in the cells $L_1$ and $L_2$ of said second shift register;

a first multiplier means having an input connected to the output of said second storage means, for multiplying a first received conditional probability by a second received conditional probability accessed from said second storage means and outputting a probability product;

said switching means operating when the error indicium associated with characters stored in the $L_1$ and $L_2$ cells of said second shift register indicates a propensity to character crowding for the characters stored in the $L_1$ and $L_2$ cells, to access the first type conditional probability $P(K_1|L_1)$ and $P(K_2|L_2)$ from said second storage means for transmission to said first multiplier means as said first received and second received conditional probabilities, for calculation of said probability product, and to access the second type conditional probability $P(K_1K_2|L_1L_2)$ from said second storage means;

a first comparator having an input connected to said first multiplier means and said second storage means for comparing the magnitude of said probability product with that for said accessed second type conditional probability;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said second storage means and a second control input connected to said first comparator, for accepting said first received conditional probability if said first product is larger or said second type conditional probability if said second product is larger, as determined by said first comparator, and multiplying by the running product of all of said conditional probabilities calculated for the dictionary word presently stored in said second shift register;

said shift control means shifting the contents of both said first and second shift registers by one cell when said first probability product is greater than said second probability product;

said shift control means shifting the contents of said first shift register by two cells and the contents of said second shift register by two cells when said second probability product is greater than said first probability product and the error indicium stored in the $L_1$ cell of said second shift register indicates a character crowding propensity;

a second comparator means having an input connected to said second multiplier means and an output connected to said first storage means, for selecting the dictionary word stored in said first storage means having the largest running product when matched with the OCR word stored in said first shift register;

said first storage means outputting on an output line said dictionary word indicated by said second comparator means, as the most likely correct form for said garbled input OCR word.

13. An information processing system for selecting the correct form of a garbled input word misread by an optical character reader so as to incorrectly segment the characters in the word, the correct form of the input word being a member of a predetermined class of words, each comprising a plurality of characters, comprising:

a first shift register having an input connected to the output of said optical character reader, for storing the characters of said input OCR word in an arrangement ordered in the sequence in which the characters are received, said first shift register having three adjacent storge cells $K_1$, $K_2$ and $K_3$, with the end character of the input word initially stored in the cell $K_1$;

a first bulk storage means having a reset control input connected to said output of the OCR, for storing said predetermined class of words as a dictionary, selected characters composing selected ones of said dictionary words having stored in association therewith an error propensity indicium for indicating the propensity of the character to being misread by said OCR through an error mode which changes the number of characters in the misread word;

a second shift register having an input connected to the output of said first storage means, for storing characters of a dictionary word input from said first storge means, in an arrangement ordered in the sequence in which the characters are received, said second shift register having three adjacent storage cells $L_1$, $L_2$ and $L_3$, with the end character of the dictionary word initially stored in cell $L_1$;

said first storage means initiating the sequential loading of words from said predetermined class of dictionary words, into said second register, upon receipt of a signal over said reset control input indicating the receipt of a new OCR word from said OCR output;

a switching means having a first input connected to the output of cells $K_1$, $K_2$ and $K_3$ of said first shift register, for selectively switching OCR word characters stored therein to the output of said switching means, a second input connected to the output of cells $L_1$, $L_2$ and $L_3$ of said second shift register, for selectively switching the dictionary word characters stored therein to the output of said switching means, and a third control input connected to said second shift register for controlling said selective switching of said OCR word characters and said dictionary word characters by means of the error indicium associated with the dictionary word characters stored in cell $L_1$;

a second bulk storage means with an input connected to the output of said switching means, for storing a first type conditional probability $P(K_n|L_m)$ that the OCR word character stored in cell $K_n$ of said first shift register was misread by character substitution given that the dictionary word character stored in cell $L_m$ of said second shift register was actually scanned, for $n=1$, $m=1$, $n=2$, $m=2$ and for $n=2$, $m=3$, and for $n=3$, $m=2$, a second type conditional probability $P(K_1K_2|L_1)$ that the OCR word characters stored in cells $K_1$ and $K_2$ of said first shift register were misread by character splitting, given that the dictionary word character stored in cell $L_1$ of said second shift register was actually scanned, and a third type of conditional probability $p(K_1|L_1L_2)$ that the OCR word character stored in cell $K_1$ of said first shift rgister was misread by character concatenation, given that the dictionary word character stored in cells $L_1$, and $L_2$ of said second shift register were actually scanned, said probabilities being accessed by said component OCR word characters and dictionary word characters which are selectively switched to the output of said switching means under the control of said error indicium associated with the dictionary word character stored in cell $L_1$ of said second shift register;

a first multiplier means having an input connected to the output of said second storage means, for multiplying a first received conditional probability by a second received conditional probability accesssed from said second storage means and outputting a first probability product, and for multiplying a third received conditional probability by a fourth received conditional probability accessed from said second storage means and outputting a second probability product;

said switching means operating when the error indicium stored in the $L_1$ cell of said second shift register indicates a propensity to character splitting for the characters stored in the $L_1$ cell, to access the first type conditional probability $P(K_1|L_1)$ and $P(K_2|L_2)$ from said second storage means for transmission to said first multiplier means as said first received and second received conditional probabilities, for calculation of said first probability product, and to access the second type conditional probability $P(K_1K_2|L_1)$ and the first type conditional probability $P(K_3|L_2)$ from said second storage means for transmission to said first multiplier means as said third received and said fourth received conditional probabilities for the calculation of said second probability product;

said switching means operating when the error indicium stored in the $L_1$ cell of said second shift register indicates a propensity to character concatenation for the characters stored in the $L_1$ and $L_2$ cells, to access the first type conditional probabilities $P(K_1|L_1)$ and $P(K_2|L_2)$ from said second storage means for transmission to said first multiplier means as said first received and said second received conditional probabilities for calculating said first probability product, and to access the third type conditional probability $P(K_1|L_1L_2)$ and the first type conditional probability $P(K_2|L_3)$ from said second storage means for transmission to said first multiplier means as said third received and fourth received conditional probability for the calculation of said second probability product, a first comparator having an input connected to said first multiplier means for compring the magnitude of said first probability product with that for said second probability product;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said second storage means and a second control input connected to said first comparator, for accepting said first received conditional probability if said first product is larger or said third received conditional probability if said second product is larger as determined by said first comparator, and multiplying by the running product of all of said conditional probabilities calculated for the dictionary word presently stored in said second shift register;

said shift control means shifting the contents of both said first and said second shift registers by one cell when said first probability product is greater than said second probability product;

said shift control means shifting the contents of said first shift register by two cells and the contents of said second shift register by one cell when said second probability product is greater than said first probability product and the error indicium stored in the $L_1$ cell of said second shift register indicates a character splitting propensity;

said shift control means shifting the contents of said second shift register by two cells and the contents of said first shift register by one cell when said second probability product is greter than said first probability product and the error indicium stored in the $L_1$ cell of said second shift register indicates a character concatenation propensity;

a second comparator means having an input connected to said second multiplier means and an ouput connected to said first storage means, for selecting the dictionary word stored in said first storage means having the largest running product when matched with the OCR word stored in said first shift register;

said first storage means outputting on an output line said dictionary word indicated by said second comparator means, as the most likely correct form for said garbled input OCR word.

14. An information processing system for selecting the correct form of a garbled input word misread by an optical character reader so as to incorrectly segment the characters in the word, the correct form of the input word being a member of a predetermined class of words, each comprising a plurality of characters, comprising:

a first shift register having an input connected to the output of said optical character reader, for storing the characters of said input OCR word in an arrangement ordered in the sequence in which the characters are received, said first shift register having three adjacent storage cells $K_1$, $K_2$ and $K_3$, with the end character of the input word initially stored in cell $K_1$;

a first bulk storage means for storing said predetermined class of words as a dictionary;

a second shift register having an input connected to the output of said first storage means, for storing characters of a dictionary word input from said first storage means, in an arrangement ordered in the sequence in which the characters are received, said second shift register having three adjacent storage cells $L_1$, $L_2$ and $L_3$, with the end character of the dictionary word initially stored in cell $L_1$;

a second bulk storage means with inputs connected to the $L_1$ and $L_2$ cells for storing OCR error propensity indicia for selected characters composing said dictionary words for indicating the propensity of said selected characters to being misread by said OCR through an error mode which changes the number of characters in the misread word;

a switching means having a first input connected to the output of cells $K_1$, $K_2$ and $K_3$ of said first shift register, for selectively switching OCR word characters stored therein to the output of said switching means, a second input connected to the output of cells $L_1$, $L_2$ and $L_3$ of said second shift register, for selectively switching the dictionary word characters stored therein to the output of said switching means, and a third control input connected to the output of said second storage means for controlling said selective switching of said OCR word characters and said dictionary word characters by means of the error indicium accessed from said second storage means for the dictionary word characters stored in cells $L_1$ and $L_2$;

a third bulk storage means with an input connected to the output of said switching means, for storing a first type conditional probability $P(K_n|L_m)$ that the OCR word character stored in cell $K_n$ of said first shift register was misread by character substitution given that the dictionary word character stored in cell $L_m$ of said second shift register was actually scanned, for $n$=1, $m$=1, $n$=2, $m$=2 and for $n$=2, $m$=3 and for $n$=3, $m$=2, a second type conditional probability $P(K_1K_2|L_1)$ that the OCR word characters stored in cells $K_1$ and $K_2$ of said first shift register was misread by character splitting, given that the dictionary word character stored in cell $L_1$ of said second shift register was actually scanned, and a third type of conditional probability $P(K_1|L_1L_2)$ that the OCR word character stored in cell $K_1$ of said first shift register was misread by character concatenation, given that the dictionary word character stored in cells $L_1$ and $L_2$ of said second shift register were actually scanned, said probabilities being accessed by said component OCR word characters and dictionary word characters which are selectively switched to the output of said switching means under the control of said error indicium accessed from said second storage for the dictionary word character stored in cell $L_1$ of said second shift register;

a first multiplier means having an input connected to the output of said third storage means, for multiplying a first received conditional probability by a second received conditional probability accessed from said second storage means and outputting a first probability product, and for multiplying a third received conditional probability by a fourth received conditional probability accessed from said second storage means and outputting a second probability product;

said switching means operating when the error indicium for the character stored in the $L_1$ cell of said second shift register indicates a propensity to character splitting for the characters stored in the $L_1$ cell, to access the first type conditional probability $P(K_1|L_1)$ and $P(K_2|L_2)$ from said third storage means for transmission to said first multiplier means as said first received and second received conditional probabilities, for calculation of said first probability product, and to access the second type conditional probability $P(K_1K_2|L_1)$ and the first type conditional probability $P(K_3|L_2)$ from said third storage means for transmission to said first multiplier means as said third received and said fourth received conditional probabilities for the calculation of said second probability product;

said switching means operating when the error indicium for the characters stored in the $L_1$ and $L_2$ cells of said second shift register indicates a propensity to character concatenation for the characters stored in the $L_1$ and $L_2$ cells, to access the first type conditional probabilities $P(K_1|L_1)$ and $P(K_2|L_2)$ from said third storage means for transmission to said first multiplier means as said first received and said second received conditional probabilities for calculating said first probability product, and to access the third type conditional probability $P(K_1|L_1L_2)$ and the first type conditional probability $P(K_2|L_3)$ from said third storage means for transmissiosn to said first multiplier means as said third storage received and fourth received conditional probability for the calculation of said second probability product;

a first comparator having an input connected to said first multiplier means for comparing the magnitude of said first probability product with that for said second probability product;

a shift control means having a first input connected to said first comparator and a second input connected to said output of said second storage means, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said third storage means and a second control input connected to said first comparator, for accepting said first received conditional probability when said first product is larger or said third received conditional probability when said second product is larger, as determined by said first comparator and mulitplying by the running product of all of said probability products calculated for the dictionary word presently stored in said second shift register;

said shift control means shifting the contents of both said first and said second shift registers by one cell when said first probability product is greater than said second probability product;

said shift control means shifting the contents of said first shift register by two cells and the contents of said second shift register by one cell when said second probability product is greater than said first probability product and the error indicium for the character stored in the $L_1$ cell of said second shift register indicates a character splitting propensity;

said shift control means shifting the contents of said second shift register by two cells and the contents of said first shift register by one cell when said second probability product is greater than said first probability product and the error indicium for the character stored in the $L_1$ and $L_2$ cells of said second shift register indicates a character concatenation propensity;

a second comparator means having an input connected to said second multiplier means and an output connected to said first storage means, for selecting the dictionary word stored in said first storage means having the largest running product when matched with the OCR word stored in said first shift register;

said first storage means outputting on an output line said dictionary word indicated by said second comparator means, as the most likely correct form for said garbled input OCR word.

15. In a system for recognizing speech, a data processing system for selecting the correct form of an input error word garbled by a speech analyzer splitting error, the correct form of the error word being a member of a predetermined class of reference words, each comprising a plurality of phoneme-characters, comprising:

a storage means for storing said predetermined class of reference words, selected phoneme-characters composing the reference words having stored in said storage means an error propensity indicium for indicating the propensity of the phoneme-character to being misread through a splitting error;

said storage means storing a first type conditional probability that a first phoneme-character can be output by said speech analyzer through phoneme-character substitution, given that a second phoneme-character was actually spoken and a second type conditional probability that a pair of adjacent phoneme-characters can be output by said speech analyzer through phoneme-character splitting, given that a third phoneme-character was actually spoken;

a first register means connected to an input line from said speech analyzer for storing the phoneme-characters of said error word arranged in the sequence of receipt from said speech analyzer, with a first phoneme-character at a given end of said error word defining a first position for an error word origin;

a second register means connected to said storage means for storing the phoneme-characters of a first reference word from said predetermined class in said storage means, arranged in a sequence to correspond with said sequence of phoneme-characters in said first register means, with a first phoneme-character in said reference word corresponding to said first phoneme-character in said error word, defining a first position for a reference word origin;

decoding means connected to said second register for decoding the error propensity indicium corresponding to the phoneme-character located at said reference word origin in said reference word;

accessing means connected to said storage means for accessing from said storage means, when said decoded indicium indicates a phoneme-character splitting propensity, a first one of said first type conditional probability that given the phoneme-character located at said reference word origin in said reference word was spoken, that the speech analyzer substituted the phoneme-character located at said error word origin in said error word;

said accessing means accessing from said storage means when said decoding indicium indicates an error splitting propensity, a second one of said first type conditional probability that given the phoneme-character next to the phoneme-character at said reference word origin in said reference word was spoken, that the speech analyzer substituted the phoneme-character next to the phoneme-character located at said error word origin in said error word;

multiplying means connected to said storage means for multiplying said first one and said second one of said first conditional probabilities, as a first product;

said accessing means accessing from said storage means when said decoding indicium indicates a phoneme-character splitting propensity, a first one of said second type conditional probability that given the phoneme-character located at said reference word origin in said reference word was spoken, that the speech analyzer split it into the phoneme-character located at said error word origin and the phoneme-character next to the phoneme-character located at said error word origin in said error word;

said accessing means accessing from said storage means when said decoding indicium indicates a phoneme-character splitting propensity, a third one of said first type conditional probabilities that given the phoneme-character next to the phoneme-character located at said reference word origin in said reference word was spoken, that the speech analyzer substituted the second next phoneme-character to the phoneme-character located at said error word origin in said error word;

said multiplying means multiplying said first one of said second type conditional probability and said third one of said first type conditional probability as a second product;

comparison means connected to said multiplying means for comparing the relative magnitudes of said first and said second product;

a running product calculating means connected to said storage means for multiplying a running product times said first one of said first type conditional probabilities if said first product is greater than said second product or said first one of said second type conditional probabilities if said second product is greater than said first product;

a shift means connected to said comparison means for shifting the location of both said error word origin and said reference word origin by one phoneme-character position when said first probability product is greater than said second probability product;

said shifting means shifting said error word origin by two phoneme-character positions and shifting said reference word origin by one phoneme-character position when said second probability product is greater than said first probability product;

whereby the reference word stored in said storage means having the highest conditional probability of having been misread as the error word stored in said first register, can be determined.

16. In a system for recognizing speech, the data processing system of claim 15, which further comprises:

said error propensity indicia being stored in said storage means in association with said selected character composing said reference words and being loaded into said second register means in conjunction with the characters of the reference word loaded therein.

17. In a system for recognizing speech, the data processing system of claim 5, which further comprises:

said error propensity indicia being stored in said storage means in association with selected phoneme-characters in tabular form, separate from said reference words;

said decoding means having a data connection with said storage means, for accessing an error propensity indicium corresponding to the phoneme-character located at said reference word origin for the reference word stored in said second register means.

18. In a system for recognizing speech, a data processing system for selecting the correct form of an input error word garbled by a speech analyzer concatenation error, the correct form of the error word being a member of the predetermined class of reference words, each comprising a plurality of phoneme-characters, comprising:

a storage means for storing said predetermined class of reference words in a storage means, selected phoneme-characters composing the words in said class having stored in said storage means an error propensity indicium for indicating the propensity of the phonema-character to be misread through a concatenation error;

said storage means storing a first type conditional probability that a first phoneme-character can be output by said speech analyzer through phoneme-character substitution, given that a second phoneme-character was actually spoken, and a second type conditional probability that a first phoneme-character can be output by said speech analyzer through phoneme-character concatenation, given that a pair of adjacent phoneme-characters were actually spoken;

a first register means connected to an input line from said speech analyzer for storing the phoneme-characters of said error word in a first register, arranged in a sequence of receipt from said speech analyzer, with a first phoneme-character at a given end of said error word defining a first position for an error word origin;

a second register means connected to said storage means for storing the phoneme-characters of a first reference word from said predetermined class in said storage means, arranged in a sequence to correspond with said sequence of phoneme-characters in said first register means, with a first phoneme-character in said reference word corresponding to said first phoneme-character in said error word, defining a first position for a reference word origin;

decoding means connected to said second register for decoding the error propensity indicium corresponding to the phoneme-character located at said reference word origin in said first reference word;

accessing means connected to said storage means for accessing from said storage means when said decoded indicium indicates a phoneme-character concatenation propensity, a first one of said first type conditional probability that given the phoneme-character located at said first reference word origin of said reference word was spoken, that the speech analyzer substituted the phoneme-character located at said error word origin in said error word;

said accessing means accessing from said storage means when said decoded indicium indicates a phoneme-character concatenation propensity, a second one of said first type conditional probability that given the phoneme-character next to the phoneme-character located at said reference word origin in said reference word was spoken, that the speech analyzer substituted the phoneme-character next to the phoneme-character located at said error word origin in said error word;

multiplying means connected to said storage means for multiplying said first one and said second one of said first type conditional probabilities as a first product;

said accessing means accessing from said storage means when said decoded indicium indicates a phoneme-character concatenation propensity, a first one of said second type conditional probability that given the phoneme-character located at said reference word origin and the phoneme-character next to the phoneme-character located at said reference word origin in said reference word were spoken, that the speech analyzer concatenated them into the phoneme-character located at said error word origin in said error word;

said accessing means accessing from said storage means when said decoded indicium indicates a phoneme-character concatenation propensity, a third one of said first type conditional probabilities that given the phoneme-character second next to the phoneme-character located at said reference word as spoken, that the speech analyzer substituted the phoneme-character next to the phoneme-character located at said error word origin in said error word;

said multiplying means multiplying said first one of said second type conditional probability and said third one of said first type conditional probability as a second product;

comparison means connected to said multiplying means for comparing the relative magnitude of said first and said second product;

a running product calculating means connected to said storage means for multiplying a running product times said first one of said first type conditional probabilities if said first product is greater than said second product or said first one of said second type conditional probabilities if said second product is greater than said first product;

a shifting means connected to said comparison means for shifting said error word origin and said reference word origin by one phoneme-character position when said first probability product is greater than said second probability product;

said shifting means shifting the error word origin by one phoneme-character position and the reference word origin by two phoneme-character positions when said second probability product is greater than said first probability product;

whereby the reference word having the greatest total conditional probability that the error word was output by the speech analyzer given that the reference word was spoken, can be determined.

19. In a system for recognizing speech, the data processing system of claim 18, which further comprises:

said error propensity indicia being stored in said storage means in association with said selected characters composing said reference words and being loaded into said second register means in conjunction with the characters of the reference word loaded therein.

20. In a system for recognizing speech, the data processing system of claim 18, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

21. In a system for recognizing speech, a data processing system for selecting the correct form of an input error word garbled by a speech analyzer crowding error, the correct form of the error word being a member of a predetermined class of reference words, each comprising a plurality of phoneme-characters, comprising:

a storage means for storing said predetermined class of reference words in a storage means, selected phoneme-characters composing the reference word having stored in said storage means an error propensity indicium for indicating the propensity of the phoneme-character to being misread through a crowded error;

said storage means storing a first type conditional probability that a first phoneme-character can be output by said speech analyzer through phoneme-character substitution, given that a second phoneme-character was actually spoken, and a second type conditional probability that a first pair of adjacent phoneme-characters can be output by said speech analyser through phoneme-character crowding, given that a second pair of adjacent phoneme-characters was actually spoken;

a first register means connected to an input line from said speech analyzeer for storing the phoneme-characters of said error word arranged in the sequence of receipt from said speech analyzer, with a first phoneme-character at a given end of said error word defining a first position for an error word origin;

a second register means connected to said storage means for storing the phoneme-characters of a first reference word from said predetermined class in said storage means, arranged in a sequence to correspond to said sequence of phoneme-characters in said first register means, with a first phoneme-character in said reference word corresponding to said first phoneme-character in said error word, defining a first position for a reference word origin;

decoding means connected to said second register for decoding the error propensity indicium corresponding to the phoneme-character stored at said reference word origin in said reference word;

accessing means connected to said storage means for accessing from said storage means when said decoded indicium indicates a phoneme-character pair crowding propensity, a first one of said first type conditional probability than given the phoneme-character located at said reference word origin in said reference word was spoken, that the speech analyzer substituted the phoneme-character located at said error word origin in said error word;

said accessing means accessing from said storage means when said decoded indicium indicates a phoneme-character pair crowding propensity, a second one of said first type conditional probability that given the phoneme-character next to the phoneme-character at said reference word origin and said reference word was spoken, that the speech analyzer substituted the phoneme-character next to the phoneme-character located at said error word origin in said error word;

multiplying means connected to said storage means for multiplying said first one and said second one of said first type conditional probabilities as a first product;

said accessing means accessing from said storage means when said decoded indicium indicates a phoneme-character pair crowding propensity, a first one of said second type conditional probability that the phoneme-character located at said reference word origin and the phoneme-character located next to the phoneme-character located at said reference word origin in said reference word was spoken, that the speech analyzer executed a crowding error and output the phoneme-character located at said error word origin and the phoneme-character next to the phoneme-character located at said error word origin in said error word;

comparison means connected to said multiplying means for comparing the relative magnitudes of said first product and said second type conditional probability accessed from said storage means;

a running product calculating means connected to said storage means, for multiplying a running product times said first one of said first type conditional probabilities if said first product is greater than said second type conditional probability accessed or said first one of said second type conditional probability if said second type conditional probability is greater than said first product;

a shifting means connected to said comparison means for shifting the location of both said error word origin and said reference word origin by one phoneme-character position when said first probability product is greater than said second type conditional probability;

a shifting means shifting both said error word origin and said reference word origin by two phoneme-character positions when said second type conditional probability is greater than said first probability product;

whereby the reference word stored in said storage means having the highest conditional probability of having been misread as the error word stored in said first register, can be determined.

22. In a system for recognizing speech, the data processing system of claim 21, which further comprises:

said error propensity indicia being stored in said storage means in association with said selected characters composing said reference words and being loaded into said second register means in conjunction with the characters of the reference word loaded therein.

23. The data processing system of claim 21, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

24. A data processing system for selecting the correct form of an input error word mistyped on a keyboard by an operator as a character addition error, the correct form of the error word being a member of a predetermined class of reference words, each comprising a plurality of characters, comprising:

a storage means for storing said predetermined class of reference words, selected characters composing the reference words having stored in said storage means an error propensity indicium for indicating the propensity of the character to being mistyped by an operator through a character addition error, said storage means storing a first type conditional probability that a first character can be output by operator mis-stroke on a keyboard through character substitution, given that a second character was to be typed, and a second type conditional probability that a pair of adjacent characters can be output by the operator on a keyboard through character additions, given that a third character was intended to be typed;

a first register means connected to an input line for storing the characters of said error word arranged in the sequence of receipt from said keyboard, with a first character at a given end of said error word defining a first position for an error word origin;

a second register means connected to said storage means for storing the characters of a first reference word from said predetermined class in said storage means, arranged in a sequence to correspond with said sequence of characters in said first register means, with a first character in said reference word corresponding to said first character in said error word, defining a first position for a reference word origin;

decoding means connected to said second register for decoding the error propensity indicium corresponding to the character located at said reference word origin in said reference word;

accessing means connected to said storage means for accessing from said storage means, when said decoded indicium indicates a character addition propensity, a first one of said first type conditional probability that given the character located at said reference word origin in said reference word was to be typed, that the keyboard operator substituted the character located at said error word origin in said error word;

said accessing means accessing from said storage means when said decoded indicium indicates a character addition propensity, a second one of said first type conditional probability that given the character next to the character at said reference word origin in said reference word was to be typed, that the keyboard operator substituted the character next to the character located at said error word origin in said error word;

multiplying means connected to said storage means for multiplying said first one and said second one of said first conditional probabilities, as a first product;

said accessing means accessing from said storage means when said decoded indicium indicates a character addition propensity, a first one of said second type conditional probability that given the character located at said reference word origin in said reference word was to be typed, that the keyboard operator augmented it into the character located at said error word origin and the character next to the character located at said error word origin in said error word;

said accessing means accessing from said storage means when said decoded indicium indicates a character addition propensity, a third one of said first type conditional probabilities that given the character next to the character located at said reference word origin in said reference word was to be typed, that the keyboard operator substituted the second next character to the character located at said error word origin in said error word;

said multiplying means multiplying said first one of said second type conditional probability and said third one of said first type conditional probability as a second product;

comparison means connected to said multiplying means for comparing the relative magnitudes of said first and said second product;

a running product calculating means connected to said storage means for multiplying a running product times said first one of said first type conditional probabilities if said first product is greater than said second product or said first one of said second type conditional probabilities if said second product is greater than said first product;

a shifting means connected to said comparison means for shifting the location of both said error word origin and said reference word origin by one character position when said first probability product is greater than said second probability product;

said shifting means shifting said error word origin by two character positions and shifting said reference word origin by one character position when said second probability product is greater than said first probability product;

whereby the reference word stored in said storage means having the highest conditional probability of having been mistyped as the error word stored in said first register, can be determined.

25. The data processing system of claim 24, which further comprises:

said error propensity indicia being stored in said storage means in association with said selected characters composing said reference words.

26. The data processing system of claim 24 which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

27. A data procesing system for selecting the correct form of an input error word operator mistyped on a keyboard as a character omission error, the correct form of the error word being a member of the predetermined class of reference words, each comprising a plurality of characters, comprising:

a storage means for storing said predetermined class of reference words in a storage means, selected characters composing the words in said class having stored in said storage means an error propensity indicium for indicating the propensity of the character to be operator mistyped through a character omission error;

said storage means storing a first type conditional probability that a first character can be output by said keyboard through character substitution, given that a second character was to be typed, and a second type conditional probability that a first character can be output by said keyboard operator through character omission, given that a pair of adjacent characters were to be typed;

a first register means connected to an input line for storing the characters of said error word in a first register, arranged in a sequence of receipt from said keyboard, with a first character at a given end of said error word defining a first position for an error word origin;

a second register means connected to said storage means for storing the characters of a first reference word from said predetermined class in said storage means, arranged in a sequence to correspond with said sequence of characters in said first register means, with a first character in said reference word corresponding to said first character in said error word, defining a first position for a reference word origin;

decoding means connected to said second register for decoding the error propensity corresponding to the character located at said reference word origin in said first reference word;

accessing means connected to said storage means for accessing from said storage means when said decoded indicium indicates a character omission propensity, a first one of said first type conditional probability that given the character located at said first reference word origin of said reference word was to be typed, that the keyboard operator substituted the character located at said error word origin in said error word;

said accessing means accessing from said storage means when said decoded indicium indicates a character omission propensity, a second one of said first type conditional probability that given the character next to the character located at said reference word origin in said reference word was to be typed, that the keyboard operator substituted the character next to the character located at said error word origin in said error word;

multiplying means connected to said storage means for multiplying said first one and said second one of said first type conditional probabilities as a first product;

said accessing means accessing from said storage means when said decoded indicium indicates a character omission propensity, a first one of said second type conditional probability that given the character located at said reference word origin and the character next to the character located at said reference word origin in said reference word were to be typed, that the keyboard operator truncated them into the character located at said error word origin in said error word;

said accessing means accessing from said storage means when said decoded indicium indicates a character omission propensity, a third one of said first type conditional probabilities that given the character second next to the character located at said reference word origin and said reference word was to be typed, that the keyboard operator substituted the character next to the character located at said error word origin in said error word;

said multiplying means multiplying said first one of said second type conditional probability and said third one of said first type conditional probability as a second product;

comparison means connected to said multiplying means for comparing the relative magnitude of said first and said second product;

a running product calculating means connected to said storage means for multiplying a running product times said first one of said first type conditional probabilities if said first product is greater than said second product or said first one of said second type conditional probabilities if said second product is greater than said first product;

a shifting means connected to said comparison means for shifting said error word origin and said reference word origin by one character position when said first probability product is greater than said second probability product;

said shifting means shifting the error word origin by one character position and the reference word origin by two character positions when said second probability product is greater than said first probability product;

whereby the reference word having the greatest total conditional probability that the error word was output by the keyboard operator given that the reference word was to be typed, can be determined.

28. The data processing system of claim 27, which further comprises:

said error propensity indicia being stored in said storage means in association with said selected characters composing said reference words.

29. The data processing system of claim 27, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

30. A data processing system for selecting the correct form of an input error word mistyped on a keyboard as a character transposition error, the correct form of the error word being a member of a predetermined class of reference words, each comprising a plurality of characters, comprising:

a storage means for storing said predetermined class of reference words in a storage means, selected characters composing the reference word having stored in said storage means an error propensity indicium for indicating the propensity of the character to being mistyped through a character transposition error;

said storage means storing a first type conditional probability that a first character can be output by said keyboard through character substitution, given that a second character was to be typed, and a second type conditional probability that a first pair of adjacent characters can be output by said keyboard through character transposition, given that a second pair of adjacent characters was to be typed;

a first register means connected to an input line for storing the characters of said error word arranged in the sequence of receipt from said keyboard, with a first character at a given end of said error word defining a first position for an error word origin;

a second register means connected to said storage means for storing the characters and error propensity indicium of a first reference word from said predetermined class in said storage means, arranged in a sequence to correspond to said sequence of characters in said first register means, with a first character in said reference word corresponding to said first character in said error word, defining a first position for a reference word origin;

decoding means connected to said second register for decoding the error propensity indicium corresponding to the character stored at said reference word origin in said reference word;

accessing means connected to said storage means for accessing from said storage means when said decoded indicium indicates a character transposition propensity, a first one of said first type conditional probability that given the character located at said reference word origin in said reference word was to be typed, that the keyboard substituted the character located at said error word origin in said error word;

said accessing means accessing from said storage means when said decoded indicium indicates a character transposition propensity, a second one of said first type conditional probability that given the character next to the character at said reference word origin and said reference word was to be typed, that the keyboard operator substituted the character next to the character located at said error word origin in said error word;

multiplying means connected to said storage means for multiplying said first one and said second one of said first type conditional probabilities as a first product;

said accessing means accessing from said storage means when said decoded indicium indicates a character transposition propensity, a first one of said second type conditional probability that the character located at said reference word origin and the character located next to the character located at said reference word origin in said reference word was to be typed, that the keyboard operator transposed the characters and output the character located at said error word origin and the character next to the character located at said error word origin in said error word;

comparison means connected to said multiplying means for comparing the relative magnitudes of said first product and said second type conditional probability accessed from said storage means;

a running product calculating means connected to said storage means, for multiplying a running product times said first one of said first type conditional probabilities if said first product is greater than said second type conditional probability accessed or said first one of said second type conditional probability if said second type conditional probability is greater than said first product;

a shifting means connected to said comparison means for shifting the location of both said error word origin and said reference word origin by one character position when said first probability product is greater than said second type conditional probability;

a shifting means shifting both said error word origin and said reference word origin by two character positions when said second type conditional probability is greater than said first probability product;

whereby the reference word stored in said storage means having the highest conditional probability of having been mistyped as the error word stored in said first register, can be determined.

31. The data processing system of claim 30, which further comprises:

said error propensity indicia being stored in said storage means in association with said selected characters composing said reference words.

32. The data processing system of claim 30, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

33. A data processing system for selecting the correct form of an input error word mistyped on a keyboard by an operator as a character substitution error, the correct form of the error word being a member of a predetermined class of reference words, each comprising a plurality of characters, comprising:

a storage means for storing said predetermined class of reference words, selected characters composing the reference words having stored in said storage means an error propensity indicium for indicating the propensity of the character to being misread through a character substitution error, said storage means storing a first type conditional probability that a first character can be output by the operator misstroking said keyboard through character substitution, given that a second character was to be typed;

a first register means connected to an input line for storing the characters of said error word arranged in the sequence of receipt from said keyboard with a first character at a given end of said error word defining a first position for an error word origin;

a second register means connected to said storage means for storing the characters of a first reference word from said predetermined class in said storage means, arranged in a sequence to correspond with said sequence of characters in said first register means, with a first character in said reference word corresponding to said fist character in said error word, defining a first position for a reference word origin;

decoding means connected to said second register for decoding the error propensity indicium corresponding to the character located at said reference word origin in said reference word;

accessing means connected to said storage means for accessing from said storage means, when said decoded indicium indicates an operator miskeying character substitution propensity, a first one of said first type conditional probability that given the character located at said reference word origin in said reference word was to be typed, that the keyboard operator substituted by miskeying the character located at said error word origin in said error word;

a running product calculating means connected to said storage means for multiplying a running product times said first one of said first type conditional probabilities;

a shifting means connected to said comparison means for shifting the location of both said error word origin and said reference word origin by one character position;

whereby the reference word stored in said storage means having the highest conditional probability of having been mistyped by the operator as the error word stored in said first register, can be determined.

34. The data processing system of claim 33, which further comprises:

said error propensity indicia being stored in said storage means in association with said selected characters composing said reference words.

35. The data processing system of claim 33, which further comprises:

said error propensity indicia being stored in said storage means in association with selected characters in tabular form, separate from said reference words;

said decoding means having a data connection with said storage means, for accessing an error propensity indicium corresponding to the character located at said reference word origin for the reference word stored in said second register means.

36. An information processing system for selecting the correct form of an input word mistyped by an operator on a keyboard as a character addition error, the correct form of the input word being a member of a predetermined class or words, each comprising a plurality of characters, comprising:

a first shift register having an input connected to the output of said keyboard, for storing the characters of said input word in an arrangement ordered in the sequence in which the characters are received, said first shift register having three adjacent storage cells $K_1$, $K_2$, and $K_3$, with the end character of the input word initially stored in cell $K_1$;

a first bulk storage means for storing said predetermined class of words as a dictionary, selected characters composing selected ones of said dictionary words having stored in association therewith an error propensity indicium for indicating the propensity of the character to being mistyped by an operator on said keyboard through character addition error mode;

a second shift register having an input connected to the output of said first storage means, for storing characters of a dictionary word input from said first storage means, in an arrangement ordered in the sequence in which the characters are received, said second shift register having three adjacent storage cells $L_1$, $L_2$, and $L_3$, with the end character of the dictionary word initially stored in cell $L_1$;

said first storage means sequentially loading words from said predetermined class of dictionary words, into said second register;

a switching means having a first input connected to the output of cells $K_1$, $K_2$, and $K_3$ of said first shift register, for selectively switching input word characters stored therein to the output of said switching means, a second input connected to the output of cells $L_1$, $L_2$, and $L_3$ of said second shift register, for selectively switching the dictionary word characters stored therein to the output of said switching means, and a third control input connected to said second shift register for controlling said selective switching of said input word characters and said dictionary word characters by means of the error indicium associated with the dictionary word characters stored in cell $L_1$;

a second bulk storage means with an input connected to the output of said switching means, for storing a first type conditional probability $P(K_n|L_m)$ that the input word character stored in cell $K_n$ of said first shift register was operator mistyped by character substitution given that the dictionary word character stored in cell $L_m$ of said second shift register was to be typed, for $n=1$, $m=1$, $n=2$, $m=2$, and for $n=3$, $m=2$ and a second type conditional probability $P(K_1 K_2|L_1)$ that the input word characters stored in cells $K_1$ and $K_2$ of said first shift register were operator mistyped by a character addition error, given that the dictionary word character stored in cell $L_1$ of said second shift register was to be typed, said probabilities being accessed by said component input word characters and dictionary word characters which are selectively switched to the output of said switching means under the control of said error indicium associated with the dictionary word character stored in cell $L_1$ of said second shift register;

a first multiplier means having an input connected to the output of said second storage means, for multiplying a first received conditional probability by a second received conditional probability accessed from said second storage means and outputting a first probability product, and for multiplying a third received conditional probability by a fourth received conditional probability accessed from said second storage means and outputting a second probability product;

said switching means operating when the error indicium stored in the $L_1$ cell of said second shift register indicates a propensity to a character addition error for the characters stored in the $L_1$ cell, to access the first type conditional probability $P(K_1|L_1)$ and $P(K_2|L_2)$ from said second storage means for transmission to said first multiplier means as said first received conditional probabilities, for calculation of said first probability product, and to access the second type conditional probability $P(K_1|L_1)$ and the first type conditional probability $P(K_3|L_2)$ from said second storage means for transmission to said first multiplier means as said third received and said fourth received conditional probabilities for the calculation of said second probability product;

a first comparator having an input connected to said first multiplier means for comparing the magnitude of said first probability product with that for said second probability product;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said second storage means and a second control input connected to said first comparator, for accepting said first received conditional probability if said first product is larger or said third received conditional probability if said second product is larger as determined by said first comparator, and multiplying by the running product of all of said conditional probabilities calculated for the dictionary word presently stored in said second shift register;

said shift control means shifting the contents of both said first and said second shift registers by one cell when said first probability product is greater than said second probability product;

said shift control means shifting the contents of said first shift register by two cells and the contents of said second shift register by one cell when said second probability product is greater than said first probability product and the error indicium associated with the character in the $L_1$ cell of said second shift register indicates a character operator addition error propensity;

a second comparator means having an input connected to said second multiplier means and an output connected to said first storage means, for selecting the dictionary word stored in said first storage means having the largest running product when matched with the input word stored in said first shift register;

said first storage means outputting on an output line said dictionary word indicated by said second comparator means, as the most likely correct form for said operator mistyped input word.

37. An information processing system for selecting the correct form of an input word operator mistyped on a keyboard as a character omission error, the correct form of the input word being of a predetermined class of words, each comprising a plurality of characters, comprising:

a first shift register having an input connected to the output of said keyboard, for storing the characters of said input word in an arrangement ordered in the sequence in which the characters are received, said first shift register having three adjacent storage cells $K_1$, $K_2$ and $K_3$, with the end character of the input word initially stored in cell $K_1$;

a first bulk storage means for storing said predetermined class of words as a dictionary, selected characters composing selected ones of said dictionary words having stored in association therewith an error propensity indicium for indicating the propensity of the character to being operator mistyped on said keyboard through a character omission error mode;

a second shift register having an input connected to the output of said first storage means, for storing characters of a dictionary word input from said first storage means, in an arrangement ordered in the sequence in which the characters are received, said second shift register having three adjacent storage cells $L_1$, $L_2$, and $L_3$, with the end character of the dictionary word initially stored in cell $L_1$;

said first storage means sequentially loading words from said predetermined class of dictionary words, into said second register;

a switching means having a first input connected to the output of cells $K_1$, $K_2$ and $K_3$ of said first shift register, for selectively switching input word characters stored therein to the output of said switching means, a second input connected to the output of cells $L_1$, $L_2$, and $L_3$ of said second shift register, for selectively switching the dictionary word characters stored therein to the output of said switching means, and a third control input connected to said second shift register for controlling said selective switching of said imput word characters and said dictionary word characters by means of the error indicium associated with the dictionary word characters stored in cells $L_1$ and $L_2$;

a second bulk storage means with an input connected to the output of said switching means, for storing a first type conditional probability $P(K_n|L_m)$ that the input word character stored in cell $K_n$ of said first shift register was operator mistyped by character substitution given that the dictionary word character stored in cell $L_m$ of said second shift register was to be typed, for $n$=1, $m$=1, $n$=2, $m$=2, and for $n$=2, $m$=3, and a second type of conditional probability $P(K_1|L_1L_2)$ that the input word character stored in cell $K_1$ of said first shift register was mistyped by an operator character omission error, given that the dictionary word characters stored in cells $L_1$ and $L_2$ of said second shift register was to be typed, said probabilities being accessed by said component input word characters and dictionary word characters which are selectively switched to the output of said switching means under the control of said error indicium associated with the dictionary word characters stored in cells $L_1$ and $L_2$ of said second shift register;

a first multiplier means having an input connected to the output of said second storage means, for multiplying a first received conditional probability by a second received conditional probability accessed from said second storage means and outputting a first probability product, and for multiplying a third received conditional probability by a fourth received conditional probability accessed from said second storage means and outputting a second probability product, said switching means operating when the error indicium stored in the $L_1$ cell of said second shift register indicates a propensity for operator character omission error for the characters stored in the $L_1$ and $L_2$ cells, to access the first type conditional probabilities $P(K_1|L_1)$ and $P(K_2|L_2)$ from said second storage means for transmission to said first multiplier means as said first received and said second received conditional probabilities for calculating said first probability product, and to access the second type conditional probability $P(K_1|L_1L_2)$ and the first type conditional probability $P(K_2|L_3)$ from said second storage means for transmission to said first multiplier means as said third received and fourth received conditional probability for the calculation of said second probability product;

a first comparator having an input connected to said first multiplier means for comparing the magnitude of said first probability product with that for said second probability product;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said second storage means and a second control input connected to said first comparator, for accepting said first received conditional probability if said first product is larger or said third received conditional probability if said second product is larger as determined by said first comparator, and multiplying by the running product of all of said conditional probabilities calculated for the dictionary word presently stored in said second shift register;

said shift control means shifting the contents of both said first and said second shift registers by one cell when said first probability product is greater than said second probability product;

said shift control means shifting the contents of said second shift register by two cells and the contents of said first shift register by one cell when said second probability product is greater than said first probability product and the error indicium associated with characters in the $L_1$ and $L_2$ cells of said second shift register indicates a character operator miskeying omission error propensity;

a second comparator means having an input connected to said second multiplier means and an output connected to said first storage means, for selecting the dictionary word stored in said first storage means having the largest running product when matched with the input word stored in said first shift register;

said first storage means outputting on an output line said dictionary word indicated by said second comparator means, as the most likely correct form for said mistyped input word.

38. An information processing system for selecting the correct form of an input word operator mistyped on a keyboard as a character transposition error, the correct form of the input word being a member of a predetermined class of words, each comprising a plurality of characters, comprising:

a first shift register having an input connected to the output of said keyboard, for storing the characters of said input word in an arrangement ordered in the sequence in which the characters are received, said first shift register having three adjacent storage cells $K_1$, $K_2$ and $K_3$, with the end character of the input word initially stored in cell $K_1$;

a first bulk storage means for storing said predetermined class of words as a dictionary, selected characters composing selected ones of said dictionary words having stored in association therewith an error propensity indicium for indicating the propensity of the character to being operator mistyped on said keyboard through a character transposition error mode;

a second shift register having an input connected to the output of said first storage means, for storing characters of a dictionary word input from said first storage means, in an arrangement ordered in the sequence in which the characters are received, said second shift register having three adjacent storage cells $L_1$, $L_2$, and $L_3$, with the end character of the dictionary word initially stored in cell $L_1$;

said first storage means initiating the sequential loading of words from said predetermined class of dictionary words, into said second register, upon receipt of a signal over said reset control input indicating the receipt of a new input word from said keyboard output;

a switching means having a first input connected to the output of cells $K_1$, $K_2$ and $K_3$ of said first shift register, for selectively switching input word characters stored therein to the output of said switching means, a second input connected to the output of cells $L_1$, $L_2$ and $L_3$ of said second shift register, for selectively switching the dictionary word characters stored therein to the output of said switching means, and a third control input connected to said second shift register for controlling said selective switching of said input word characters and said dictionary word characters by means of the error indicium associated with the dictionary word characters stored in cell $L_1$;

a second bulk storage means with an input connected to the output of said switching means, for storing a first type conditional probability $P(K_n|L_m)$ that the input word character stored in cell $K_n$ of said first shift register was operator mistyped by character substitution given that the dictionary word character stored in cell $L_m$ of said second shift register was to be typed, for $n=1$, $m=1$ and $n=2$, $m=2$, and a second type conditional probability $P(K_1 K_2|L_1L_2)$ that the input word characters stored in cells $K_1$ and $K_2$ of said first shift register were operator mistyped by a character transposition error, given that the dictionary word characters stored in cell $L_1$ and $L_2$ of said second shift register were to be typed, said probabilities being accessed by said component input word characters and dictionary word characters which are selectively switched to the output of said switching means under the control of said error indicium associated with the dictionary word characters stored in the cells $L_1$ and $L_2$ of said second shift register;

a first multiplier means having an input connected to the output of said second storage means, for multiplying a first received conditional probability by a second received conditional probability accessed from said second storage means and outputting a probability product;

said switching means operating when the error indicium associated with characters stored in the $L_1$ and $L_2$ cells of said second shift register indicates a propensity for operator transposition error for the characters stored in the $L_1$ and $L_2$ cells, to access the first type conditional probability $P(K_1|L_1)$ and $P(K_2|L_2)$ from said second storage means for transmission to said first multiplier means as said first received and second received conditional probabilities, for calculation of said probability product, and to access the second type conditional probability $P(K_1K_2|L_1L_2)$ from said second storage means;

a first comparator having an input connected to said first multiplier means and said second storage means for comparing the magnitude of said probability product with that for said accessed second type conditional probability;

a shift control means having a first input connected to said first comparator and a second input connected to said $L_1$ cell of said second shift register, a first output connected to a shift input on said first shift register and a second output connected to a shift input on said second shift register, for shifting the contents of said first and said second shift registers in accordance with the relative magnitudes of said first and said second probability product and the value of the error propensity indicium for the character stored in the $L_1$ cell;

a second multiplier means having an input connected to said second storage means and a second control input connected to said first comparator, for accepting said first received conditional probability if said first product is larger or said second type conditional probability if said second product is larger, as determined by said first comparator, and multiplying by the running product of all of said conditional probabilities calculated for the dictionary word presently stored in said second shift register;

said shift control means shifting the contents of both said first and second shift registers by one cell when said first probability product is greater than said second probability product;

said shift control means shifting the contents of said first shift register by two cells and the contents of said second shift register by two cells when said second probability product is greater than said first probability product and the error indicium stored in the $L_1$ cell of said second shift register indicates an operator character transposition error propensity;

a second comparator means having an input connected to said second multiplier means and an output connected to said first storage means, for selecting the dictionary word stored in said first storage means having the largest running product when matched with the input word stored in said first shift register;

said first storage means outputting on an output line said dictionary word indicated by said second comparator means, as the most likely correct form for said operator mistyped input word.

* * * * *

UNITED STATES PATENT AND TRADEMARK OFFICE
CERTIFICATE OF CORRECTION

PATENT NO. : 3,969,700

DATED : July 13, 1976

INVENTOR(S) : Ellen Willis Bollinger et al.

It is certified that error appears in the above-identified patent and that said Letters Patent are hereby corrected as shown below:

Column 7, line 10, Equation (11), "$P_{c(=} | LLi^{L}{}_{i+1})$" should read --$P_c(* | L_i L_{i+1})$ --.

Column 35, line 48, "(key juxtaposition" should be --(key juxtaposition)--.

Column 43, line 24, "type probability" should read --type conditional probability--.

Column 46, line 32, "refernce" (second occurrence) should read --reference--.

Column 51, line 14, "A" Should read --a--; line 32, "probability is" should read --probability product is--; line 49, "corect" should be --correct--.

Column 54, line 50, "$p(K_1 | L_1 L_2)$" should read --$P(K_1 | L_1 L_2)$; line 52, "rgister" should read --register--.

Column 56, line 8, "greter" should read --greater--; line 14, "ouput" should be --output--.

Column 63, line 21, "analyzeer" should read --analyzer--.

Column 67, line 13, "propensity corresponding" should read --propensity indicium corresponding--.

UNITED STATES PATENT AND TRADEMARK OFFICE
CERTIFICATE OF CORRECTION

PATENT NO. : 3,969,700

DATED : July 13, 1976

INVENTOR(S) : Ellen Willis Bollinger et al.

It is certified that error appears in the above-identified patent and that said Letters Patent are hereby corrected as shown below:

Column 70, line 43, "fist" should be --first--.

Column 74, line 3, "imput" should be --input--.

Signed and Sealed this

***Twelfth* Day of *December 1978***

[SEAL]

*Attest:*

RUTH C. MASON
*Attesting Officer*

DONALD W. BANNER
*Commissioner of Patents and Trademarks*